(12) United States Patent
Boesel et al.

(10) Patent No.: US 12,307,613 B2
(45) Date of Patent: May 20, 2025

(54) DEVICES, METHODS, AND GRAPHICAL USER INTERFACES FOR MODIFYING AVATARS IN THREE-DIMENSIONAL ENVIRONMENTS

(71) Applicant: Apple Inc., Cupertino, CA (US)

(72) Inventors: Benjamin H. Boesel, Sunnyvale, CA (US); Rupert Burton, San Francisco, CA (US); Jordan A. Cazamias, San Francisco, CA (US); Shih-Sang Chiu, Menlo Park, CA (US); Jason D. Rickwald, Santa Cruz, CA (US); William A. Sorrentino, III, Mill Valley, CA (US); Nicolas V. Scapel, London (GB); Giancarlo Yerkes, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 178 days.

(21) Appl. No.: 18/125,600

(22) Filed: Mar. 23, 2023

(65) Prior Publication Data
US 2023/0316674 A1    Oct. 5, 2023

Related U.S. Application Data

(60) Provisional application No. 63/327,552, filed on Apr. 5, 2022.

(51) Int. Cl.
G06T 19/00    (2011.01)
G06T 13/40    (2011.01)

(52) U.S. Cl.
CPC ............ *G06T 19/006* (2013.01); *G06T 13/40* (2013.01)

(58) Field of Classification Search
CPC ....... H04N 7/157; G06T 7/246; G06T 19/006; G06T 13/40; G06T 2207/30196; G06T 2207/10028; A63F 13/5258; A63F 13/55; A63F 13/428; A63F 13/211; A63F 13/213; G06F 3/013; G06F 3/012; G06F 3/016; G06F 3/011; G06F 3/017
See application file for complete search history.

(56) References Cited

U.S. PATENT DOCUMENTS

| 9,035,999 B2 | 5/2015 | Carpenter et al. |
| 9,298,257 B2 | 3/2016 | Hwang et al. |
| 9,547,763 B1 | 1/2017 | Avital |

(Continued)

FOREIGN PATENT DOCUMENTS

| EP | 2492873 B1 | 9/2013 |
| EP | 3627450 A1 | 3/2020 |

(Continued)

OTHER PUBLICATIONS

Applicant-Initiated Interview Summary received for U.S. Appl. No. 17/667,350, mailed on Jan. 18, 2024, 4 pages.

(Continued)

*Primary Examiner* — Xilin Guo
(74) *Attorney, Agent, or Firm* — DLA Piper LLP (US)

(57) ABSTRACT

The present disclosure relates to techniques for improving a user experience for modifying display of an avatar in XR environments. In some embodiments, the techniques include modifying a portion of an avatar based on one or more heuristics. In some embodiments, the techniques include modifying a portion of an avatar after tracking is lost.

63 Claims, 22 Drawing Sheets

(56) References Cited

U.S. PATENT DOCUMENTS

| | | | |
|---|---|---|---|
| 9,686,466 | B1 | 6/2017 | Billinghurst et al. |
| 10,135,965 | B2 | 11/2018 | Woolsey et al. |
| 10,176,808 | B1 | 1/2019 | Lovitt et al. |
| 10,235,408 | B1 | 3/2019 | Lao et al. |
| 10,811,055 | B1 | 10/2020 | Kimber et al. |
| 10,861,248 | B2 * | 12/2020 | Scapel .................. G06F 3/0488 |
| 11,282,174 | B1 | 3/2022 | Demaio |
| 2002/0135581 | A1 | 9/2002 | Russell et al. |
| 2007/0003915 | A1 | 1/2007 | Templeman |
| 2009/0254843 | A1 | 10/2009 | Van et al. |
| 2010/0035682 | A1 | 2/2010 | Gentile et al. |
| 2011/0009241 | A1 | 1/2011 | Lane et al. |
| 2011/0025689 | A1 | 2/2011 | Perez et al. |
| 2011/0175809 | A1 | 7/2011 | Markovic et al. |
| 2013/0015946 | A1 | 1/2013 | Lau et al. |
| 2013/0227651 | A1 | 8/2013 | Schultz et al. |
| 2014/0168217 | A1 | 6/2014 | Kim et al. |
| 2014/0267311 | A1 | 9/2014 | Evertt et al. |
| 2014/0270351 | A1 | 9/2014 | Hoof et al. |
| 2016/0110593 | A1 | 4/2016 | Hoof et al. |
| 2018/0365904 | A1 | 12/2018 | Holmes |
| 2019/0080066 | A1 | 3/2019 | Van Os et al. |
| 2019/0088018 | A1 | 3/2019 | Shenton et al. |
| 2019/0094981 | A1 | 3/2019 | Bradski et al. |
| 2019/0096106 | A1 | 3/2019 | Shapiro et al. |
| 2019/0160378 | A1 | 5/2019 | Fajt et al. |
| 2019/0278894 | A1 | 9/2019 | Andalo et al. |
| 2020/0051304 | A1 * | 2/2020 | Choi ..................... G06T 7/246 |
| 2020/0082135 | A1 | 3/2020 | Tagawa et al. |
| 2020/0110864 | A1 | 4/2020 | Casado et al. |
| 2020/0134383 | A1 | 4/2020 | Rhee et al. |
| 2020/0193669 | A1 * | 6/2020 | Churchill ............. G06V 40/164 |
| 2021/0019541 | A1 | 1/2021 | Wang et al. |
| 2021/0089136 | A1 | 3/2021 | Hossain et al. |
| 2021/0097766 | A1 | 4/2021 | Palangie et al. |
| 2021/0110015 | A1 | 4/2021 | McCarty et al. |
| 2021/0312167 | A1 | 10/2021 | Shirai |
| 2021/0382544 | A1 * | 12/2021 | Butcher .................. G06F 3/011 |
| 2021/0407215 | A1 | 12/2021 | Evangelista et al. |
| 2022/0012922 | A1 | 1/2022 | Ishikawa |
| 2022/0020220 | A1 | 1/2022 | Lehman |
| 2022/0083636 | A1 | 3/2022 | Sarkis et al. |
| 2022/0084279 | A1 | 3/2022 | Lindmeier et al. |
| 2022/0105389 | A1 * | 4/2022 | Lianides ............ A63B 24/0075 |
| 2022/0134234 | A1 | 5/2022 | Sachson et al. |
| 2022/0147148 | A1 | 5/2022 | Begley |
| 2022/0262080 | A1 | 8/2022 | Burton et al. |
| 2022/0366626 | A1 | 11/2022 | Miller et al. |
| 2023/0103161 | A1 | 3/2023 | Li et al. |
| 2023/0229283 | A1 | 7/2023 | Long et al. |
| 2024/0077937 | A1 | 3/2024 | Rickwald et al. |

FOREIGN PATENT DOCUMENTS

| | | |
|---|---|---|
| EP | 3537378 B1 | 11/2021 |
| JP | 2008-27086 A | 2/2008 |
| JP | 2012-223357 A | 11/2012 |
| JP | 2016-528571 A | 9/2016 |
| JP | 2020-525868 A | 8/2020 |
| JP | 2020-156919 A | 10/2020 |
| KR | 10-2020-0117685 A | 10/2020 |
| WO | 2015/064144 A1 | 5/2015 |
| WO | 2017/043314 A1 | 3/2017 |
| WO | 2018/226265 A1 | 12/2018 |
| WO | 2020/075308 A1 | 4/2020 |
| WO | 2020/129959 A1 | 6/2020 |

OTHER PUBLICATIONS

Applicant-Initiated Interview Summary received for U.S. Appl. No. 17/667,350, mailed on May 31, 2023, 4 pages.
Applicant-Initiated Interview Summary received for U.S. Appl. No. 17/667,350, mailed on Sep. 20, 2023, 4 pages.
Final Office Action received for U.S. Appl. No. 17/667,350, mailed on Jul. 26, 2023, 19 pages.
Final Office Action received for U.S. Appl. No. 17/667,350, mailed on Mar. 21, 2024, 19 pages.
International Preliminary Report on Patentability received for PCT Patent Application No. PCT/US2022/016451, mailed on Aug. 31, 2023, 13 pages.
International Search Report and Written Opinion received for PCT Patent Application No. PCT/US2023/017484, mailed on Aug. 28, 2023, 28 pages.
International Search Report and Written Opinion received for PCT Patent Application No. PCT/US2023/031979, mailed on Mar. 12, 2024, 16 pages.
Invitation to Pay Additional Fees and Partial International Search Report received for PCT Patent Application No. PCT/US2023/017484, mailed on Jul. 7, 2023, 20 pages.
Invitation to Pay Additional Fees and Partial International Search Report received for PCT Patent Application No. PCT/US2023/031979, mailed on Jan. 19, 2024, 9 pages.
Non-Final Office Action received for U.S. Appl. No. 17/667,350, mailed on Apr. 21, 2023, 16 pages.
Non-Final Office Action received for U.S. Appl. No. 17/667,350, mailed on Oct. 12, 2023, 21 pages.
Non-Final Office Action received for U.S. Appl. No. 17/944,911, mailed on Dec. 26, 2023, 21 pages.
Non-Final Office Action received for U.S. Appl. No. 17/944,911, mailed on Mar. 26, 2024, 11 pages.
Office Action received for Japanese Patent Application No. 2023-548256, mailed on Aug. 5, 2024, 8 pages (4 pages of English Translation and 4 pages of Official Copy).
Applicant-Initiated Interview Summary received for U.S. Appl. No. 18/241,802, mailed on Jul. 17, 2024, 6 pages.
Notice of Allowance received for U.S. Appl. No. 17/667,350, mailed on Jul. 8, 2024, 10 pages.
Notice of Allowance received for U.S. Appl. No. 17/944,911, mailed on Jul. 9, 2024, 10 pages.
Applicant-Initiated Interview Summary received for U.S. Appl. No. 17/667,350, mailed on May 24, 2024, 4 pages.
Non-Final Office Action received for U.S. Appl. No. 18/241,802, mailed on May 17, 2024, 57 pages.
Corrected Notice of Allowance received for U.S. Appl. No. 18/241,802, mailed on Oct. 22, 2024, 9 pages.
International Preliminary Report on Patentability received for PCT Patent Application No. PCT/US2023/017484, mailed on Oct. 17, 2024, 21 pages.
Notice of Allowance received for U.S. Appl. No. 18/241,802, mailed on Oct. 8, 2024, 11 pages.
International Preliminary Report on Patentability received for PCT Patent Application No. PCT/US2022/016451, mailed on Aug. 25, 2022, 9 pages.
International Search Report and Written Opinion received for PCT Patent Application No. PCT/US2022/016451, mailed on Jun. 24, 2022, 18 pages.
International Search Report and Written Opinion received for PCT Patent Application No. PCT/US2022/044194, mailed on Feb. 13, 2023, 18 pages.
Invitation to Pay Additional Fees and Partial International Search Report received for PCT Patent Application No. PCT/US2022/044194, mailed on Dec. 15, 2022, 10 pages.
Invitation to Pay Additional Fees received for PCT Patent Application No. PCT/US2022/016451, mailed on Apr. 28, 2022, 11 pages.
Chan et al., "FrontFace", Facilitating Communication Between HMD Users and Outsiders Using Front-Facing-Screen HMDs, Sep. 4-7, 2017, 5 pages.
Mai et al., "Frontal Screens on Head-Mounted Displays to Increase Awareness of the HMD Users' State in Mixed Presence Collaboration", May 15, 2019, 10 pages.
Mai et al., "TransparentHMD", Revealing the HMD User's Face to Bystanders, Nov. 26-29, 2017, 6 pages.
Rekimoto et al., "Behind-the-Mask", A Face-Through Head-Mounted Display, 18, May 29-Jun. 1, 2018, 5 pages.

(56) References Cited

OTHER PUBLICATIONS

International Preliminary Report on Patentability received for PCT Patent Application No. PCT/US2022/044194, mailed on Apr. 4, 2024, 12 pages.

* cited by examiner

1000

1002
Cause a representation of a first user to be displayed in an extended reality environment, the representation of the first user having one or more features that change appearance in response to detected changes in pose of the first user, wherein the representation of the first user includes a first feature that corresponds to a first portion of the first user and is displayed in the extended reality environment having a first pose.

1004
Receive first data that includes data indicating a change in pose of the first user, wherein the change in pose of the first user includes movement of the first portion of the first user relative to a second portion of the first user.

1006
After receiving the first data and after tracking of the first portion of the first user has failed, cause an appearance of the representation of the first user in the extended reality environment to be updated, wherein causing the appearance of the representation of the first user to be updated includes:

1008
In accordance with a determination that the first portion of the first user is moving in a first movement pattern prior to the tracking of the first portion of the first user failing while the first portion of the first user has a first spatial relationship relative to the second portion of the first user, cause display of the first feature of the representation of the first user at a second position that is based on the first movement pattern, the first spatial relationship, and a first biomechanical relationship between the first portion of the first user and the second portion of the first user.

1010
In accordance with a determination that the first portion of the first user is moving in the first movement pattern prior to the tracking of the first portion of the first user failing while the first portion of the first user has a second spatial relationship relative to the second portion of the first user that is different from the first spatial relationship, cause display of the first feature at a third position that is different from the second position and is based on the first movement pattern, the second spatial relationship, and the first biomechanical relationship.

*FIG. 10*

DEVICES, METHODS, AND GRAPHICAL USER INTERFACES FOR MODIFYING AVATARS IN THREE-DIMENSIONAL ENVIRONMENTS

CROSS-REFERENCE TO RELATED APPLICATIONS

This application claims priority to U.S. Provisional Application No. 63/327,552, filed Apr. 5, 2022, entitled "DEVICES, METHODS, AND GRAPHICAL USER INTERFACES FOR MODIFYING AVATARS IN THREE-DIMENSIONAL ENVIRONMENTS," the entire contents of which are hereby incorporated by reference.

TECHNICAL FIELD

The present disclosure relates generally to computer systems that are in communication with a display generation component that provide computer-generated experiences, including, but not limited to, electronic devices that provide virtual reality and mixed reality experiences that include presenting and modifying user avatars, via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments and/or to modify virtual elements in the environments. Example virtual elements include virtual objects, such as digital images, video, text, icons, user avatars, and control elements such as buttons and other graphics.

SUMMARY

Some methods and interfaces for modifying avatars in extended reality environments are cumbersome, inefficient, and limited. For example, systems that display unnatural and/or jittery movements of avatars, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for modifying avatars in extended reality environments that make interaction with the computer systems more efficient, natural, and intuitive for a user. Such methods and interfaces optionally complement or replace conventional methods for modifying avatars in extended reality environments. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for modifying avatars in extended reality environments. Such methods and interfaces reduce the number, extent, and/or the nature of the inputs from a user and produce a more efficient human-machine interface. For battery-operated computing devices, such methods and interfaces conserve power and increase the time between battery charges. Saving on battery power, and thus weight, improves the ergonomics of the device. Such methods and interfaces also provide more varied, detailed, and/or realistic user experiences while saving storage space for visual and audio components of the user experience sessions. Such methods and interfaces enable real-time communication, allow for the use of fewer and/or less precise sensors resulting in a more compact, lighter, and cheaper device, and enable the device to be used in a variety of lighting conditions. Such methods and interfaces reduce energy usage, thereby reducing heat emitted by the device, which is particularly important for a wearable device where a device well within operational parameters for device components can become uncomfortable for a user to wear if it is producing too much heat.

In accordance with some embodiments, a method is described. The method is performed at a computer system that is in communication with a display generation component. The method comprises: causing a representation of a first user to be displayed, via the display generation component, in an extended reality environment, wherein the representation of the first user includes a representation of at least a respective portion of the first user that is displayed in the extended reality environment having a first pose; receiving first data that includes data indicating a change in pose of the first user from the first pose to a second pose; and in response to receiving the first data, causing an appearance of the representation of the first user in the extended reality environment to be updated, wherein causing the appearance of the representation of the first user in the extended reality environment to be updated includes changing a pose of the representation of the first user based on a change in pose of one or more corresponding portions of the first user, including: in accordance with a determination that the change in pose of a first portion of the first user meets respective criteria based on a first property of the pose of the first portion of the first user meeting a first set of one or more conditions based on the first property, changing an appearance of a portion of the representation of the first user, that corresponds to the first portion of the first user, in a first manner; in accordance with a determination that the change in pose of the first portion of the first user meets the respective criteria based on a second property of the pose of the first portion of the first user meeting a second set of one or more conditions, changing an appearance of the portion of the representation of the first user in the first manner, wherein the second property of the pose of the first portion of the first user is different from the first property of the pose of the first portion of the first user; and in accordance with a determination that the change in pose of the first portion of the first user does not meet the respective criteria, forgoing changing an appearance of the portion of the representation of the first user in the first manner.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: causing a representation of a first user to be displayed, via the display generation component, in an extended reality environment, wherein the representation of the first user includes a representation of at least a respective portion of the first user that is displayed in the extended reality environment having a first pose; receiving first data that includes data indicating a change in pose of the first user from the first pose to a second pose; and in response to receiving the first data, causing an appearance of the representation of the first user in the extended reality environment to be updated, wherein causing the appearance of the representation of the first user in the extended reality environment to be updated includes changing a pose of the representation of the first user based on a change in pose of one or more corresponding portions of the first user, including: in accordance with a determination that the change in pose of a first portion of the first user meets respective criteria based on a first property of the pose of the first portion of the first user meeting a first set of one or more conditions based on the first property, changing an appearance of a portion of the representation of the first user, that corresponds to the first portion of the first user, in a first manner; in accordance with a determination that the change in pose of the first portion of the first user meets the respective criteria based on a second property of the pose of the first portion of the first user meeting a second set of one or more conditions, changing an appearance of the portion of the representation of the first user in the first manner, wherein the second property of the pose of the first portion of the first user is different from the first property of the pose of the first portion of the first user; and in accordance with a determination that the change in pose of the first portion of the first user does not meet the respective criteria, forgoing changing an appearance of the portion of the representation of the first user in the first manner.

In accordance with some embodiments, a transitory computer-readable storage medium is described. The non-transitory computer-readable storage medium stores one or more programs configured to be executed by one or more processors of a computer system that is in communication with a display generation component, the one or more programs including instructions for: causing a representation of a first user to be displayed, via the display generation component, in an extended reality environment, wherein the representation of the first user includes a representation of at least a respective portion of the first user that is displayed in the extended reality environment having a first pose; receiving first data that includes data indicating a change in pose of the first user from the first pose to a second pose; and in response to receiving the first data, causing an appearance of the representation of the first user in the extended reality environment to be updated, wherein causing the appearance of the representation of the first user in the extended reality environment to be updated includes changing a pose of the representation of the first user based on a change in pose of one or more corresponding portions of the first user, including: in accordance with a determination that the change in pose of a first portion of the first user meets respective criteria based on a first property of the pose of the first portion of the first user meeting a first set of one or more conditions based on the first property, changing an appearance of a portion of the representation of the first user, that corresponds to the first portion of the first user, in a first manner; in accordance with a determination that the change in pose of the first portion of the first user meets the respective criteria based on a second property of the pose of the first portion of the first user meeting a second set of one or more conditions, changing an appearance of the portion of the representation of the first user in the first manner, wherein the second property of the pose of the first portion of the first user is different from the first property of the pose of the first portion of the first user; and in accordance with a determination that the change in pose of the first portion of the first user does not meet the respective criteria, forgoing changing an appearance of the portion of the representation of the first user in the first manner.

In accordance with some embodiments, a computer system is described. The computer system is configured to communicate with a display generation component. The computer system comprises: one or more processors; and memory storing one or more programs configured to be executed by the one or more processors, the one or more programs including instructions for: causing a representation of a first user to be displayed, via the display generation component, in an extended reality environment, wherein the representation of the first user includes a representation of at least a respective portion of the first user that is displayed in the extended reality environment having a first pose; receiving first data that includes data indicating a change in pose of the first user from the first pose to a second pose; and in response to receiving the first data, causing an appearance of the representation of the first user in the extended reality environment to be updated, wherein causing the appearance of the representation of the first user in the extended reality environment to be updated includes changing a pose of the representation of the first user based on a change in pose of one or more corresponding portions of the first user, including: in accordance with a determination that the change in pose of a first portion of the first user meets respective criteria based on a first property of the pose of the first portion of the first user meeting a first set of one or more conditions based on the first property, changing an appearance of a portion of the representation of the first user, that corresponds to the first portion of the first user, in a first manner; in accordance with a determination that the change in pose of the first portion of the first user meets the respective criteria based on a second property of the pose of the first portion of the first user meeting a second set of one or more conditions, changing an appearance of the portion of the representation of the first user in the first manner, wherein the second property of the pose of the first portion of the first user is different from the first property of the pose of the first portion of the first user; and in accordance with a determination that the change in pose of the first portion of the first user does not meet the respective criteria, forgoing changing an appearance of the portion of the representation of the first user in the first manner.

In accordance with some embodiments, a computer system is described. The computer system is configured to communicate with a display generation component. The computer system comprises: means for causing a representation of a first user to be displayed, via the display generation component, in an extended reality environment, wherein the representation of the first user includes a representation of at least a respective portion of the first user that is displayed in the extended reality environment having a first pose; means for receiving first data that includes data indicating a change in pose of the first user from the first pose to a second pose; and means for, in response to receiving the first data, causing an appearance of the representation of the first user in the extended reality environment to be updated, wherein causing the appearance of the representation of the first user in the extended reality environment to be updated includes changing a pose of the representation of the first user based on a change in pose of one or more corresponding portions of the first user, including: in accordance with a determination that the change in pose of a first portion of the first user meets respective criteria based on a first property of the pose of the first portion of the first user meeting a first set of one or more conditions based on the first property, changing an appearance of a portion of the representation of the first user, that corresponds to the first portion of the first user, in a first manner; in accordance with a determination that the change in pose of the first portion of the first user meets the respective criteria based on a second property of the pose of the first portion of the first user meeting a second set of one or more conditions, changing an appearance of the portion of the representation of the first user in the first manner, wherein the second property of the pose of the first portion of the first user is different from the first property of the pose of the first portion of the first user; and in accordance with a determination that the change in pose of the first portion of the first user does not meet the respective criteria, forgoing changing an appearance of the portion of the representation of the first user in the first manner.

In accordance with some embodiments, a computer program product is described. The computer program product comprises one or more programs configured to be executed by one or more processors of a computer system that is in communication with a display generation component, the one or more programs including instructions for: causing a representation of a first user to be displayed, via the display generation component, in an extended reality environment, wherein the representation of the first user includes a representation of at least a respective portion of the first user that is displayed in the extended reality environment having a first pose; receiving first data that includes data indicating a change in pose of the first user from the first pose to a second pose; and in response to receiving the first data, causing an appearance of the representation of the first user in the extended reality environment to be updated, wherein causing the appearance of the representation of the first user in the extended reality environment to be updated includes changing a pose of the representation of the first user based on a change in pose of one or more corresponding portions of the first user, including: in accordance with a determination that the change in pose of a first portion of the first user meets respective criteria based on a first property of the pose of the first portion of the first user meeting a first set of one or more conditions based on the first property, changing an appearance of a portion of the representation of the first user, that corresponds to the first portion of the first user, in a first manner; in accordance with a determination that the change in pose of the first portion of the first user meets the respective criteria based on a second property of the pose of the first portion of the first user meeting a second set of one or more conditions, changing an appearance of the portion of the representation of the first user in the first manner, wherein the second property of the pose of the first portion of the first user is different from the first property of the pose of the first portion of the first user; and in accordance with a determination that the change in pose of the first portion of the first user does not meet the respective criteria, forgoing changing an appearance of the portion of the representation of the first user in the first manner.

In accordance with some embodiments, a method is described. The method is performed at a computer system that is in communication with a display generation component. The method comprises: causing a representation of a first user to be displayed in an extended reality environment, via the display generation component, the representation of the first user having one or more features that change appearance in response to detected changes in pose of the first user, wherein the representation of the first user includes a first feature that corresponds to a first portion of the first user and is displayed in the extended reality environment having a first pose; receiving first data that includes data indicating a change in pose of the first user, wherein the change in pose of the first user includes movement of the first portion of the first user relative to a second portion of the first user; and after receiving the first data and after tracking of the first portion of the first user has failed, causing an appearance of the representation of the first user in the extended reality environment to be updated, wherein causing the appearance of the representation of the first user to be updated includes: in accordance with a determination that the first portion of the first user is moving in a first movement pattern prior to the tracking of the first portion of the first user failing while the first portion of the first user has a first spatial relationship relative to the second portion of the first user, causing display of the first feature of the representation of the first user at a second position that is based on the first movement pattern, the first spatial relationship, and a first biomechanical relationship between the first portion of the first user and the second portion of the first user; and in accordance with a determination that the first portion of the first user is moving in the first movement pattern prior to the tracking of the first portion of the first user failing while the first portion of the first user has a second spatial relationship relative to the second portion of the first user that is different from the first spatial relationship, causing display of the first feature at a third position that is different from the second position and is based on the first movement pattern, the second spatial relationship, and the first biomechanical relationship.

In accordance with some embodiments, a non-transitory computer-readable storage medium is described. The non-transitory computer-readable storage medium stores one or more programs configured to be executed by one or more processors of a computer system that is in communication with a display generation component, the one or more programs including instructions for: causing a representation of a first user to be displayed in an extended reality environment, via the display generation component, the representation of the first user having one or more features that change appearance in response to detected changes in pose of the first user, wherein the representation of the first user includes a first feature that corresponds to a first portion of the first user and is displayed in the extended reality environment having a first pose; receiving first data that includes data indicating a change in pose of the first user, wherein the change in pose of the first user includes movement of the first portion of the first user relative to a second portion of the first user; and after receiving the first data and after tracking of the first portion of the first user has failed, causing an appearance of the representation of the first user in the extended reality environment to be updated, wherein causing the appearance of the representation of the first user to be updated includes: in accordance with a determination that the first portion of the first user is moving in a first movement pattern prior to the tracking of the first portion of the first user failing while the first portion of the first user has a first spatial relationship relative to the second portion of the first user, causing display of the first feature of the representation of the first user at a second position that is based on the first movement pattern, the first spatial relationship, and a first biomechanical relationship between the first portion of the first user and the second portion of the first user; and in accordance with a determination that the first portion of the first user is moving in the first movement pattern prior to the tracking of the first portion of the first user failing while the first portion of the first user has a second spatial relationship relative to the second portion of the first user that is different from the first spatial relationship, causing display of the first feature at a third position that is different from the second position and is based on the first movement pattern, the second spatial relationship, and the first biomechanical relationship.

In accordance with some embodiments, a transitory computer-readable storage medium is described. The non-transitory computer-readable storage medium stores one or more programs configured to be executed by one or more processors of a computer system that is in communication with a display generation component, the one or more programs including instructions for: causing a representation of a first user to be displayed in an extended reality environment, via the display generation component, the representation of the first user having one or more features that change appearance in response to detected changes in pose of the first user, wherein the representation of the first user includes a first feature that corresponds to a first portion of the first user and is displayed in the extended reality environment having a first pose; receiving first data that includes data indicating a change in pose of the first user, wherein the change in pose of the first user includes movement of the first portion of the first user relative to a second portion of the first user; and after receiving the first data and after tracking of the first portion of the first user has failed, causing an appearance of the representation of the first user in the extended reality environment to be updated, wherein causing the appearance of the representation of the first user to be updated includes: in accordance with a determination that the first portion of the first user is moving in a first movement pattern prior to the tracking of the first portion of the first user failing while the first portion of the first user has a first spatial relationship relative to the second portion of the first user, causing display of the first feature of the representation of the first user at a second position that is based on the first movement pattern, the first spatial relationship, and a first biomechanical relationship between the first portion of the first user and the second portion of the first user; and in accordance with a determination that the first portion of the first user is moving in the first movement pattern prior to the tracking of the first portion of the first user failing while the first portion of the first user has a second spatial relationship relative to the second portion of the first user that is different from the first spatial relationship, causing display of the first feature at a third position that is different from the second position and is based on the first movement pattern, the second spatial relationship, and the first biomechanical relationship.

In accordance with some embodiments, a computer system is described. The computer system is configured to communicate with a display generation component. The computer system comprises: one or more processors; and memory storing one or more programs configured to be executed by the one or more processors, the one or more programs including instructions for: causing a representation of a first user to be displayed in an extended reality environment, via the display generation component, the representation of the first user having one or more features that change appearance in response to detected changes in pose of the first user, wherein the representation of the first user includes a first feature that corresponds to a first portion of the first user and is displayed in the extended reality environment having a first pose; receiving first data that includes data indicating a change in pose of the first user, wherein the change in pose of the first user includes movement of the first portion of the first user relative to a second portion of the first user; and after receiving the first data and after tracking of the first portion of the first user has failed, causing an appearance of the representation of the first user in the extended reality environment to be updated, wherein causing the appearance of the representation of the first user to be updated includes: in accordance with a determination that the first portion of the first user is moving in a first movement pattern prior to the tracking of the first portion of the first user failing while the first portion of the first user has a first spatial relationship relative to the second portion of the first user, causing display of the first feature of the representation of the first user at a second position that is based on the first movement pattern, the first spatial relationship, and a first biomechanical relationship between the first portion of the first user and the second portion of the first user; and in accordance with a determination that the first portion of the first user is moving in the first movement pattern prior to the tracking of the first portion of the first user failing while the first portion of the first user has a second spatial relationship relative to the second portion of the first user that is different from the first spatial relationship, causing display of the first feature at a third position that is different from the second position and is based on the first movement pattern, the second spatial relationship, and the first biomechanical relationship.

In accordance with some embodiments, a computer system is described. The computer system is configured to communicate with a display generation component. The computer system comprises: means for causing a representation of a first user to be displayed in an extended reality environment, via the display generation component, the representation of the first user having one or more features that change appearance in response to detected changes in pose of the first user, wherein the representation of the first user includes a first feature that corresponds to a first portion of the first user and is displayed in the extended reality environment having a first pose; means for receiving first data that includes data indicating a change in pose of the first user, wherein the change in pose of the first user includes movement of the first portion of the first user relative to a second portion of the first user; and means for, after receiving the first data and after tracking of the first portion of the first user has failed, causing an appearance of the representation of the first user in the extended reality environment to be updated, wherein causing the appearance of the representation of the first user to be updated includes: in accordance with a determination that the first portion of the first user is moving in a first movement pattern prior to the tracking of the first portion of the first user failing while the first portion of the first user has a first spatial relationship relative to the second portion of the first user, causing display of the first feature of the representation of the first user at a second position that is based on the first movement pattern, the first spatial relationship, and a first biomechanical relationship between the first portion of the first user and the second portion of the first user; and in accordance with a determination that the first portion of the first user is moving in the first movement pattern prior to the tracking of the first portion of the first user failing while the first portion of the first user has a second spatial relationship relative to the second portion of the first user that is different from the first spatial relationship, causing display of the first feature at a third position that is different from the second position and is based on the first movement pattern, the second spatial relationship, and the first biomechanical relationship.

In accordance with some embodiments, a computer program product is described. The computer program product comprises one or more programs configured to be executed by one or more processors of a computer system that is in communication with a display generation component, the one or more programs including instructions for: causing a representation of a first user to be displayed in an extended reality environment, via the display generation component, the representation of the first user having one or more features that change appearance in response to detected changes in pose of the first user, wherein the representation of the first user includes a first feature that corresponds to a first portion of the first user and is displayed in the extended reality environment having a first pose; receiving first data that includes data indicating a change in pose of the first user, wherein the change in pose of the first user includes movement of the first portion of the first user relative to a second portion of the first user; and after receiving the first data and after tracking of the first portion of the first user has failed, causing an appearance of the representation of the first user in the extended reality environment to be updated, wherein causing the appearance of the representation of the first user to be updated includes: in accordance with a determination that the first portion of the first user is moving in a first movement pattern prior to the tracking of the first portion of the first user failing while the first portion of the first user has a first spatial relationship relative to the second portion of the first user, causing display of the first feature of the representation of the first user at a second position that is based on the first movement pattern, the first spatial relationship, and a first biomechanical relationship between the first portion of the first user and the second portion of the first user; and in accordance with a determination that the first portion of the first user is moving in the first movement pattern prior to the tracking of the first portion of the first user failing while the first portion of the first user has a second spatial relationship relative to the second portion of the first user that is different from the first spatial relationship, causing display of the first feature at a third position that is different from the second position and is based on the first movement pattern, the second spatial relationship, and the first biomechanical relationship.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 10 is a flow diagram of methods of modifying a portion of an avatar after tracking is lost, in accordance with various embodiments.

DESCRIPTION OF EMBODIMENTS

Figure 1:
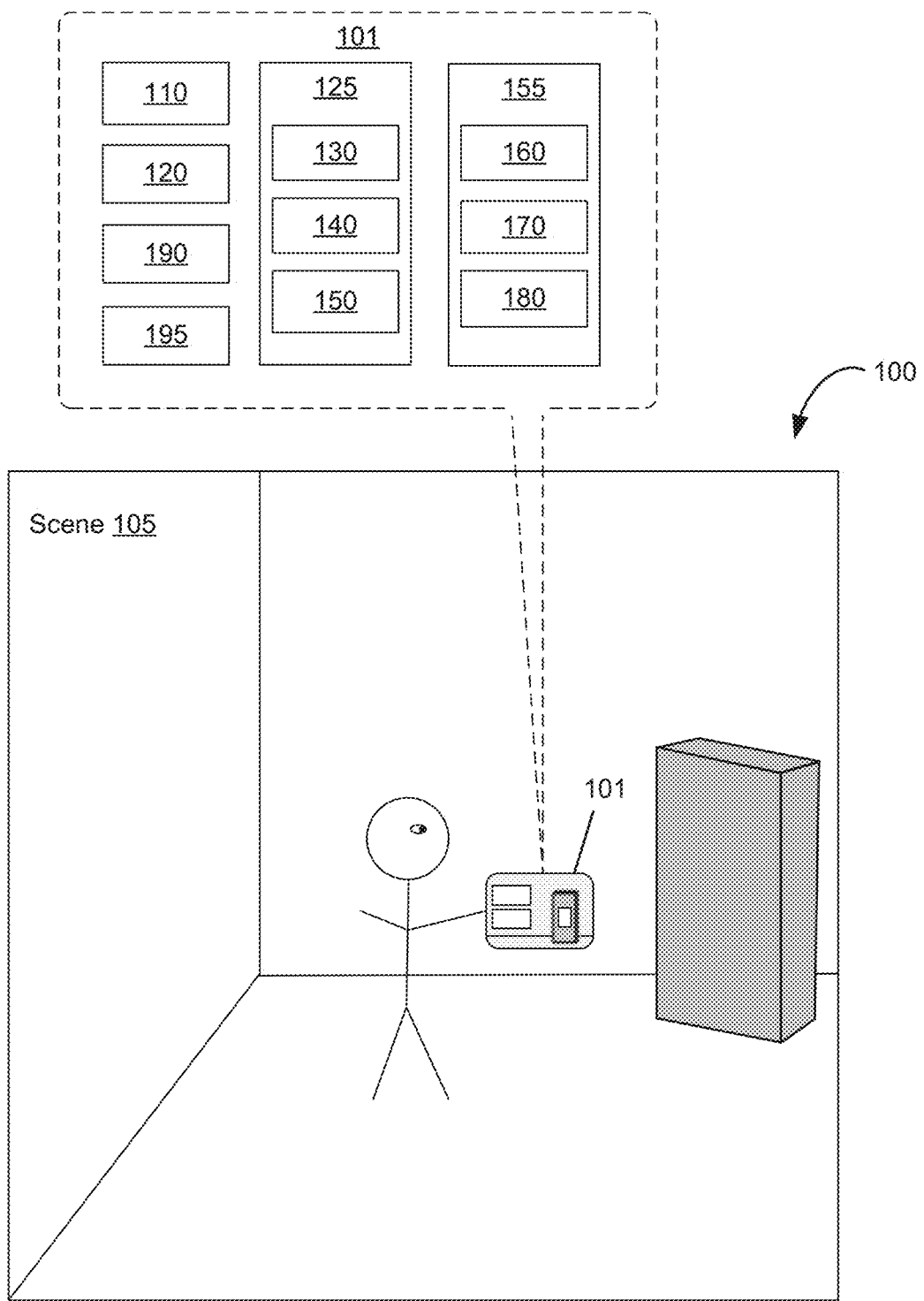
FIG. 1 is a block diagram illustrating an operating environment of a computer system for providing XR experiences in accordance with some embodiments.

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system causes a representation of a first user to be displayed in an extended reality environment. The representation of the first user includes a representation of at least a respective portion of the first user that is displayed in the extended reality environment having a first pose. The computer system receives first data that includes data indicating a change in pose of the first user from the first pose to a second pose. In response to receiving the first data, the computer system causes an appearance of the representation of the first user in the extended reality environment to be updated. Causing the appearance of the representation of the first user in the extended reality environment to be updated includes changing a pose of the representation of the first user based on a change in pose of one or more corresponding portions of the first user, including the following. In accordance with a determination that the change in pose of a first portion of the first user meets respective criteria based on a first property of the pose of the first portion of the first user meeting a first set of one or more conditions based on the first property, changing an appearance of a portion of the representation of the first user, that corresponds to the first portion of the first user, in a first manner. In accordance with a determination that the change in pose of the first portion of the first user meets the respective criteria based on a second property of the pose of the first portion of the first user meeting a second set of one or more conditions, changing an appearance of the portion of the representation of the first user in the first manner, wherein the second property of the pose of the first portion of the first user is different from the first property of the pose of the first portion of the first user. In accordance with a determination that the change in pose of the first portion of the first user does not meet the respective criteria, forgoing changing an appearance of the portion of the representation of the first user in the first manner.

In some embodiments, a computer system causes a representation of a first user to be displayed in an extended reality environment. The representation of the first user has one or more features that change appearance in response to detected changes in pose of the first user. The representation of the first user includes a first feature that corresponds to a first portion of the first user and is displayed in the extended reality environment having a first pose. The computer system receives first data that includes data indicating a change in pose of the first user, wherein the change in pose of the first user includes movement of the first portion of the first user relative to a second portion of the first user. After receiving the first data and after tracking of the first portion of the first user has failed, the computer system causes an appearance of the representation of the first user in the extended reality environment to be updated. Causing the appearance of the representation of the first user to be updated includes the following. In accordance with a determination that the first portion of the first user is moving in a first movement pattern prior to the tracking of the first portion of the first user failing while the first portion of the first user has a first spatial relationship relative to the second portion of the first user, causing display of the first feature of the representation of the first user at a second position that is based on the first movement pattern, the first spatial relationship, and a first biomechanical relationship between the first portion of the first user and the second portion of the first user. In accordance with a determination that the first portion of the first user is moving in the first movement pattern prior to the tracking of the first portion of the first user failing while the first portion of the first user has a second spatial relationship relative to the second portion of the first user that is different from the first spatial relationship, causing display of the first feature at a third position that is different from the second position and is based on the first movement pattern, the second spatial relationship, and the first biomechanical relationship.

FIGS. 1-6 provide a description of example computer systems for providing XR experiences to users. FIGS. 7A-7I illustrate example techniques for modifying a portion of an avatar based on one or more heuristics, in accordance with some embodiments. FIG. 8 is a flow diagram of methods of modifying a portion of an avatar based on one or more heuristics, in accordance with various embodiments. The user interfaces in FIGS. 7A-7I are used to illustrate the processes in FIG. 8. FIGS. 9A-9E illustrate example techniques for modifying a portion of an avatar after tracking is lost, in accordance with some embodiments. FIG. 10 is a flow diagram of methods of modifying a portion of an avatar after tracking is lost, in accordance with various embodiments. The user interfaces in FIGS. 9A-9E are used to illustrate the processes in FIG. 10.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touchscreen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1, those of ordinary skill in the art will appreciate from the present disclosure that various other features have not been illustrated for the sake of brevity and so as not to obscure more pertinent aspects of the example embodiments disclosed herein.

Figure 2:
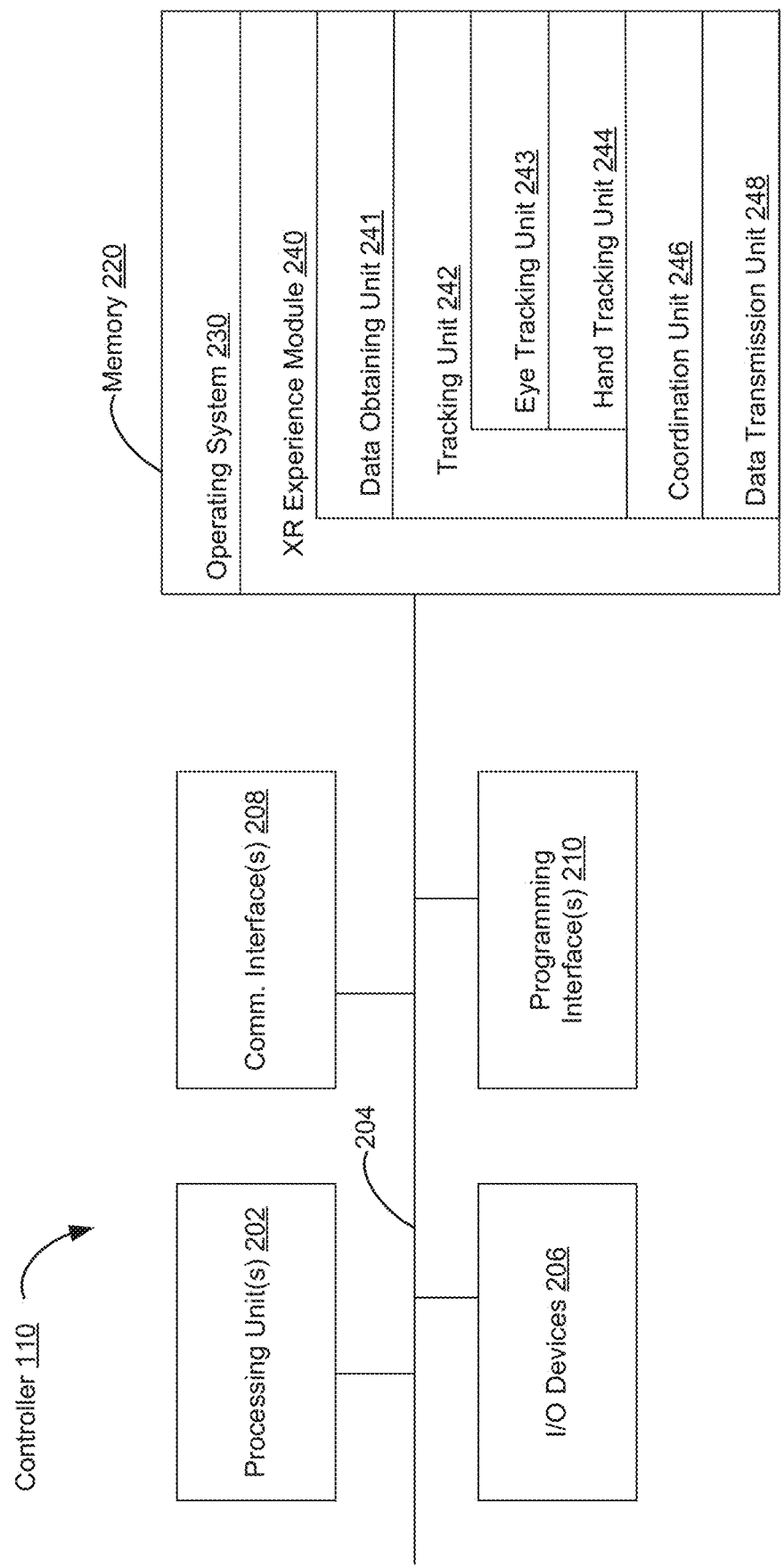
FIG. 2 is a block diagram illustrating a controller of a computer system that is configured to manage and coordinate a XR experience for the user in accordance with some embodiments.

FIG. 2 is a block diagram of an example of the controller 110 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
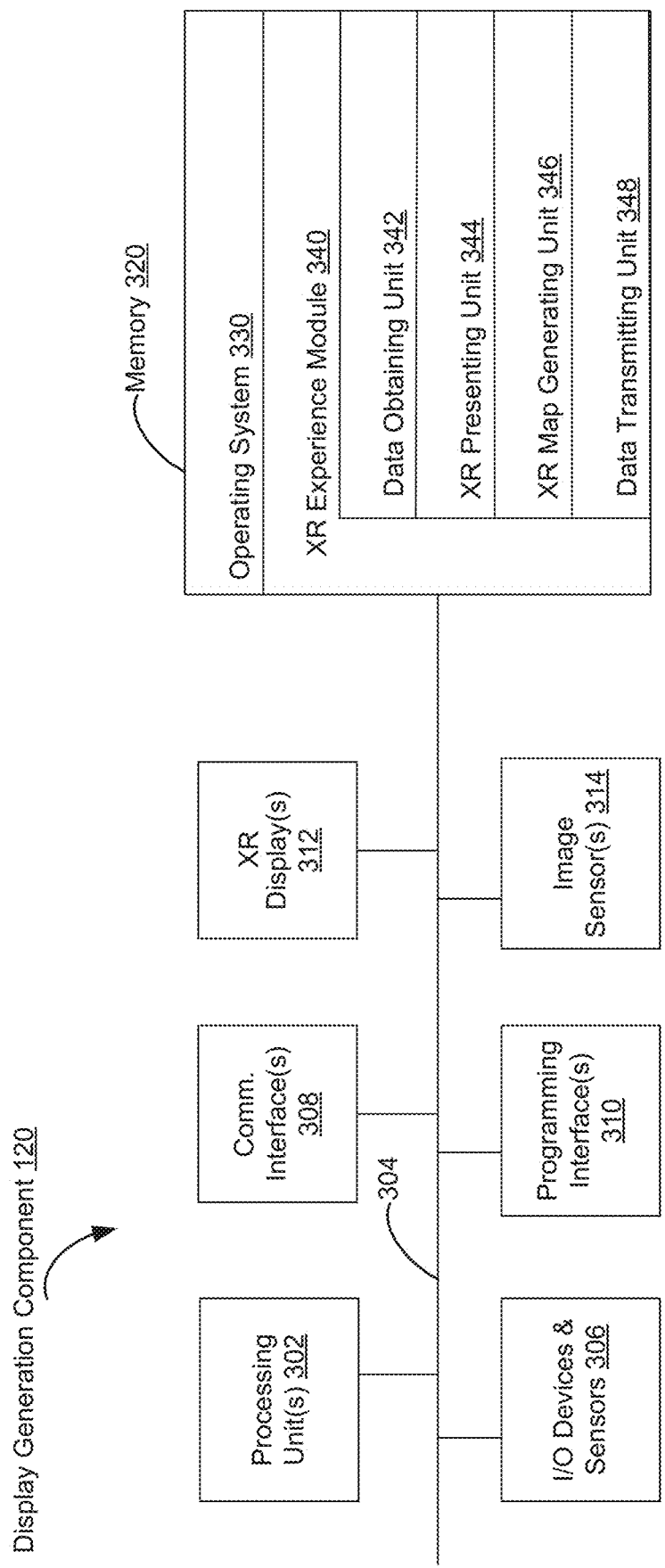
FIG. 3 is a block diagram illustrating a display generation component of a computer system that is configured to provide a visual component of the XR experience to the user in accordance with some embodiments.

FIG. 3 is a block diagram of an example of the display generation component 120 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
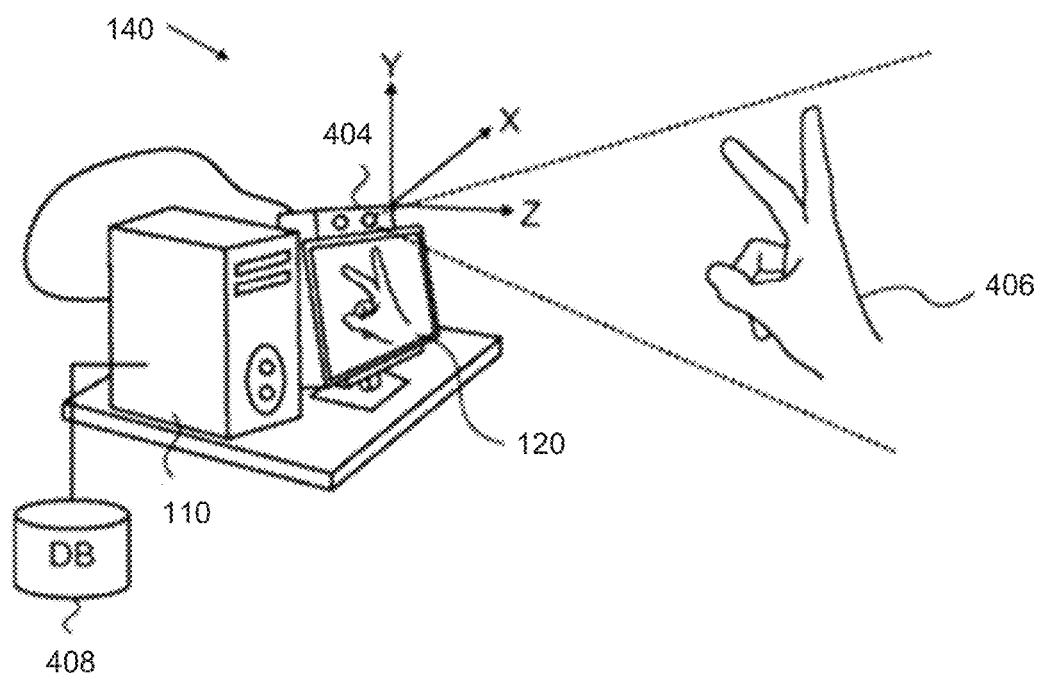
FIG. 4 is a block diagram illustrating a hand tracking unit of a computer system that is configured to capture gesture inputs of the user in accordance with some embodiments.
Figure 4:
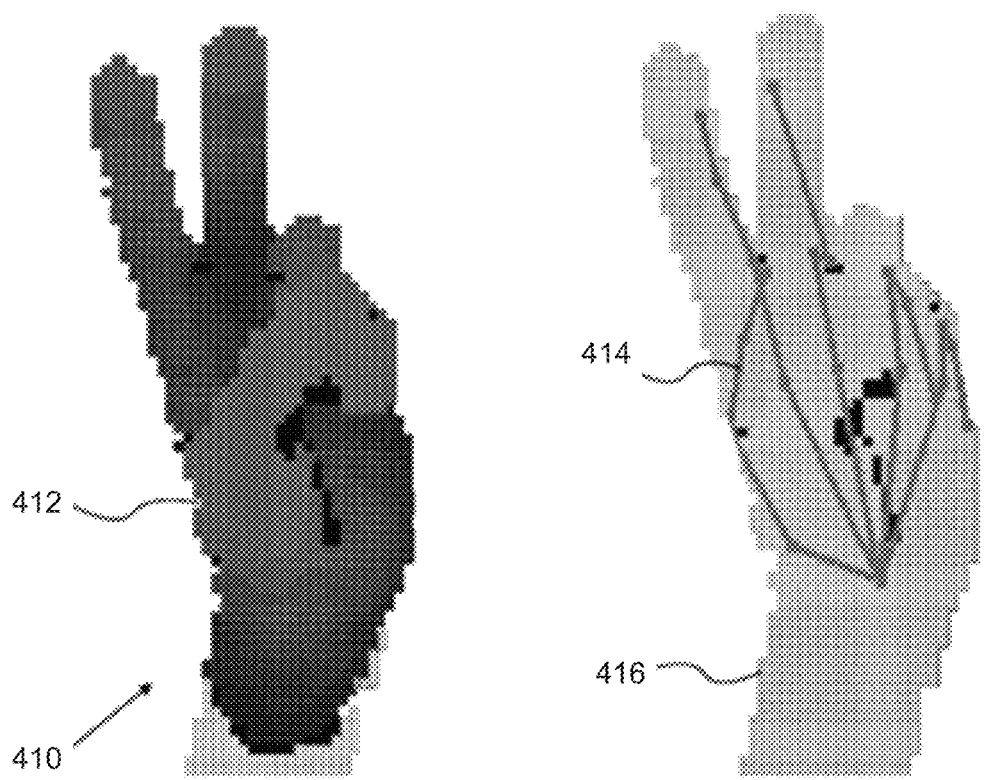

FIG. 4 is a schematic, pictorial illustration of an example embodiment of the hand tracking device 140. In some embodiments, hand tracking device 140 (FIG. 1) is controlled by hand tracking unit 244 (FIG. 2) to track the position/location of one or more portions of the user's hands, and/or motions of one or more portions of the user's hands with respect to the scene 105 of FIG. 1 (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user, user inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, wherein the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in some embodiments.

Figure 5:
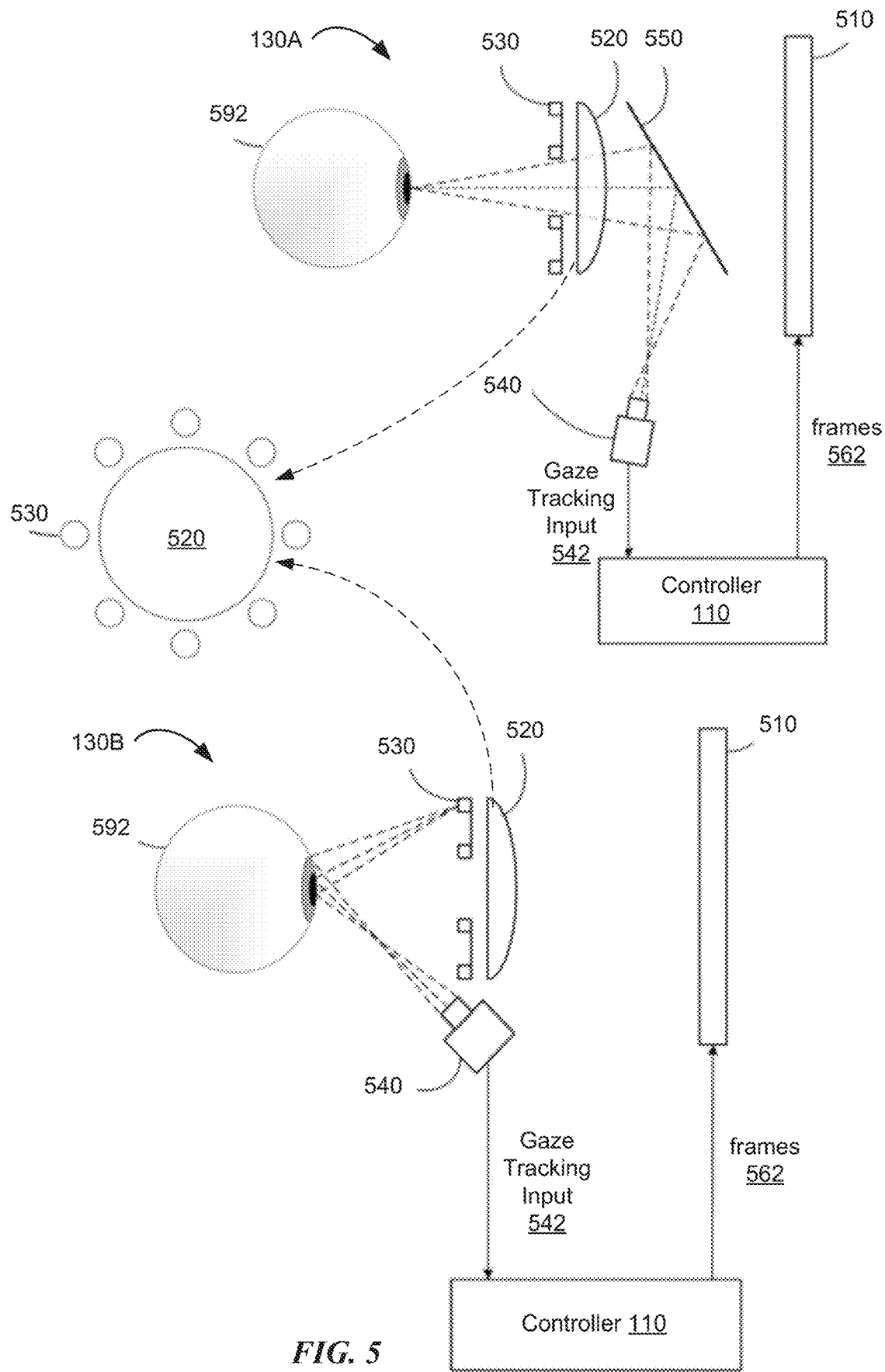
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., light sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight light sources 530 (e.g., LEDs) are arranged around each lens 520 as an example. However, more or fewer light sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
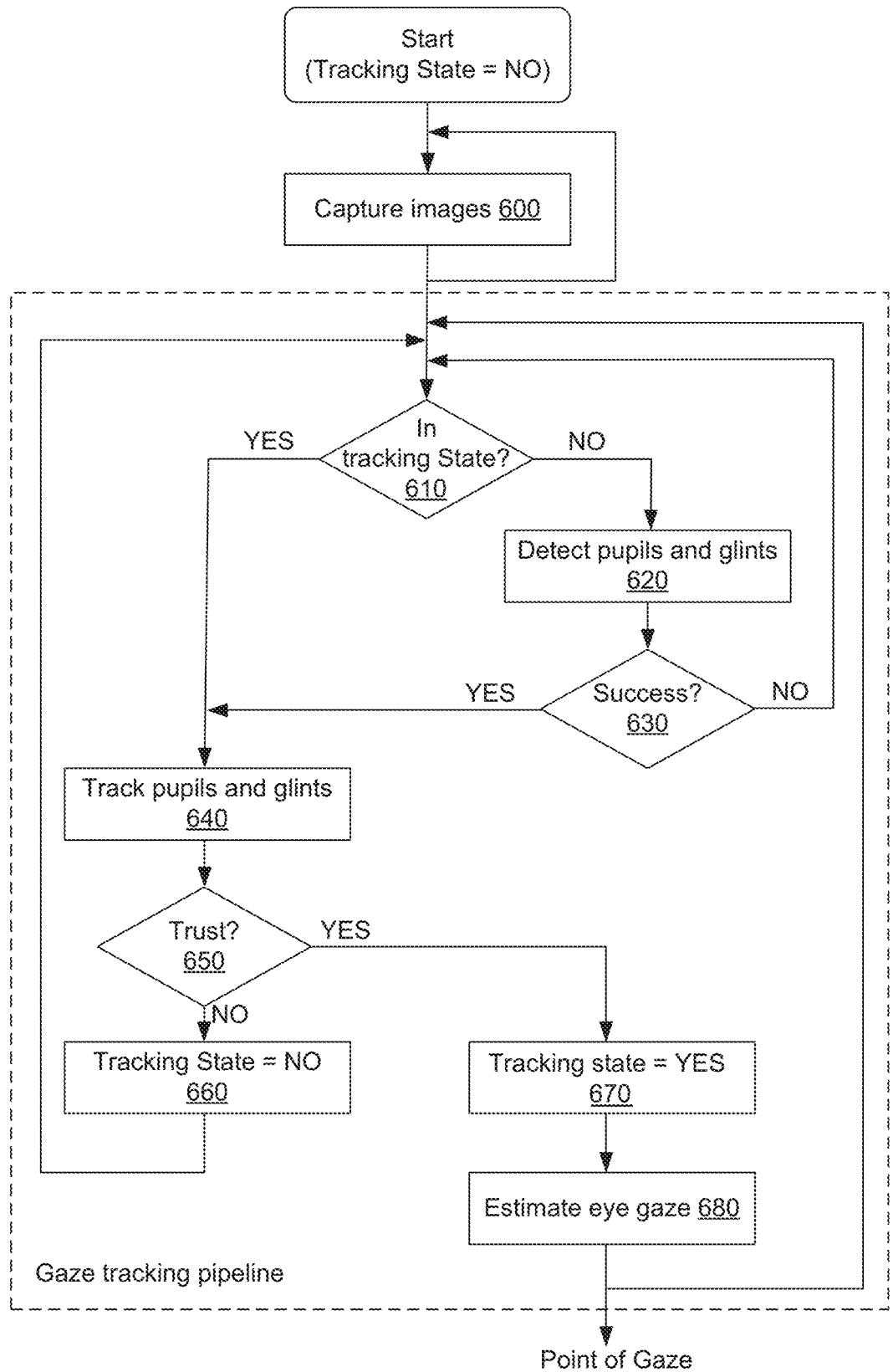
FIG. 6 is a flow diagram illustrating a glint-assisted gaze tracking pipeline in accordance with some embodiments.

FIG. 6 illustrates a glint-assisted gaze tracking pipeline, in some embodiments. In some embodiments, the gaze tracking pipeline is implemented by a glint-assisted gaze tracking system (e.g., eye tracking device 130 as illustrated in FIGS. 1 and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in some embodiments.

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UP") and associated processes that may be implemented on a computer system, such as a portable multifunction device or a head-mounted device, in communication with a display generation component.

FIGS. 7A-7I illustrate examples of modifying a portion of an avatar based on one or more heuristics. FIG. 8 is a flow diagram of an exemplary method 800 for modifying a portion of an avatar based on one or more heuristics. The user interfaces in FIGS. 7A-7I are used to illustrate the processes described below, including the processes in FIG. 8.

FIGS. 7A-7I include a schematic depiction of physical user 701 in physical environment 700 with physical elements such as physical painting 703 and physical device 702. User 701 is using device 702 (e.g., a tablet or smartphone) to participate in a live communication session in an XR environment with one or more remote participants or users. Device 702 is a computer system (similar to computer system 101 in FIG. 1) that includes display 702-1 and one or more cameras 702-2 and/or sensors for detecting movement of user 701 in physical environment 700. Device 702 displays a representation of the XR environment for the communication session using display 702-1. The representation of the XR environment can include one or more displayed virtual avatars representing, in the XR environment, other participants of the live communication session. In some embodiments, the representation of the XR environment includes a self view of user 701 such as a view of the avatar that represents user 701 in the XR environment (for example, shown from the perspective that is viewed by the participants of the live communication session and/or shown from the perspective of user 701). In some embodiments, device 702 includes one or more microphones and speakers for providing audio communication between user 701 and the participants of the live communication session in the XR environment. As described in greater detail below, device 702 detects the location, orientation, and/or movement of portions of user 701 that are within camera field-of-view 704, which is the field-of-view of camera 702-2. The field-of-view is depicted in the figures with center point 704-1, representing the center of field-of-view 704. In some embodiments, device 702 causes the displayed state of an avatar that represents user 701 in the XR environment to be modified based on the changes in the pose of user 701 that are detected in camera field-of-view 704. For example, device 702 detects user 701 quickly nodding their head and sends instructions for causing the avatar, which is displayed at another device (a device of a participant of the live communication session), to be modified based on the movement of user 701 such that the avatar mimics the movements of user 701 by quickly nodding its head.

FIGS. 7A-7I also depict device 705 (e.g., a tablet or smartphone), which represents the device of a participant of the live communication session that is provided in the XR environment. Device 705 is similar to device 702 and includes display 705-1 and one or more cameras 705-2. Device 705 displays XR environment 710 which, in the embodiments depicted in FIGS. 7A-7I, includes a representation of some physical elements and a representation of virtual elements that are displayed during the live communication session. For example, in FIG. 7A, XR environment 710 includes representation 703a of physical painting 703 and virtual avatar 711, which represents user 701 in the live communication session provided in XR environment 710. Device 705 also displays controls 712 for controlling aspects of the live communication session in the XR environment. In some embodiments, XR environment 710 can be a completely virtual embodiment. As user 701 moves in physical environment 700, the movement is captured in field-of-view 704 of camera 702-2, and the display of avatar 711 is modified based on the movement of user 701. For example, as user 701 slowly raises his left hand in physical environment 700, device 702 captures the movement in the field-of-view of camera 702-2, and sends instructions to device 705 (e.g., directly or indirectly) to modify the displayed appearance of avatar 711 based on the movement of user 701. In this example, device 705 displays avatar 711 slowly raising its left hand in the same manner as user 701. In some embodiments, avatar 711 is displayed as a complete representation of user 701, having a complete set of corresponding avatar features such as an avatar head, neck, shoulders, upper arms, elbows, forearms, hands, fingers, a torso, waist, legs, thighs, knees, lower legs, and/or feet. In some embodiments, avatar 711 is displayed as a partial representation of user 701, having a subset of corresponding avatar features such as an avatar head, neck, shoulders, hands, fingers, and, optionally, forearms, with other avatar features omitted.

As described herein, a device (e.g., device 702 and/or device 705) can cause the display of avatar 711 to be modified based on various heuristics associated with detected poses of portions of user 701 in physical environment 700. In some embodiments, the techniques for modifying the display of avatar 711 improve the user experience by providing a more realistic or natural representation of avatar 711 in the XR environment by eliminating unnatural and/or jittery movements and poses of the avatar. In some embodiments, a device modifies the avatar to display more natural poses and movements by recognizing and/or anticipating poses of portions of user 701 that can cause uncertainty in the detected pose and corresponding display of the avatar, and modifying the displayed avatar 711 to eliminate or soften the unnatural and/or jittery movements and poses before the detected pose of the user causes the avatar to exhibit the unnatural and/or jittery movements and poses.

In the embodiments provided herein, the techniques for modifying the portions of the avatar based on one or more heuristics are described with respect to devices 702 and 705, which are depicted as tablet or smartphone computer systems that are used to display an avatar in an XR environment. It should be appreciated, however, that a different type of computer system can be used in lieu of (or in addition to) device 702 and/or device 705. For example, instead of using device 702 and/or device 705, the computer system can be a head-mounted device (HMD) that is worn by user 701 and/or other participants of the live communication session in the XR environment. In such embodiments, the HMD includes a display component that is analogous to display 702-1 and/or display 705-1 and one or more sensors and/or cameras analogous to camera 702-2 and/or camera 705-2. For example, the display can be an opaque display screen with display components and/or a transparent or translucent display through which user 701 may directly view physical environment 700 and upon which virtual elements of the live communication session can be displayed or projected. The HMD may further include speakers and/or other audio output devices integrated into the HMD for providing audio output for the live communication session, and one or more cameras, microphones, and/or other sensors that are used to capture images (e.g., video and/or pictures) of physical environment 700 (e.g., for display at the HMD and/or for detecting input), for detecting poses and/or movement of portions of user 701, and to receive user input in the form of hand gestures, voice gestures, gaze gestures, and/or other input forms described herein. For example, user 701 can be wearing an HMD that includes a display for viewing the XR environment during the live communication session, and cameras and/or sensors for detecting the poses of portions of user 701 (similar to the use of camera 702-2 for detecting the user's poses) for modifying display of the avatar (e.g., avatar 711 representing user 701 in the XR environment). In some embodiments, the point of view of the sensors and/or cameras of the HMD can align substantially with the point of view of user 701, such that the point of view of the respective sensors and/or cameras are considered to be consistent with the user's point of view for purposes of executing the techniques described herein. In some embodiments, a participant of the live communication session in the XR environment can be wearing an HMD that includes a display for displaying the avatar in the XR environment (similar to the display of avatar 711 in environment 710 shown in FIG. 7A), wherein the avatar is modified using the techniques described herein. Accordingly, while the methods for modifying the portions of the avatar based on one or more heuristics are discussed herein with respect to devices 702 and 705, it should be appreciated that the methods can be performed using other computer systems including, for example, an HMD. Similarly, it should be understood that the methods described as being performed by device 702 can likewise be performed using device 705, and vice versa. For example, the embodiments provided herein describe the pose and movements of user 701 as being captured using camera 702-2 of device 702. However, the movements can instead (or additionally) be captured using camera 705-2 of device 705 (for example, if user 701 and the participant are both located in physical environment 700).

FIGS. 7A-7I depict various example embodiments in which device 705 modifies avatar 711 based on heuristics associated with the poses of user 701. In some embodiments, the modification of the avatar includes a change in one or more visual characteristics of a portion of the avatar such as, for example, changing an amount of blurriness, opacity, and/or saturation of a respective feature of the avatar. For example, the avatar can be modified such that an avatar hand fades, blurs, and/or desaturates while the visual characteristics of other portions of the avatar (e.g., the avatar's head, neck, and/or shoulders) are not changed or are changed in a different manner. In some embodiments, changing the visual characteristic causes the respective avatar feature to be deemphasized or displayed less prominently, and reversing the change in the visual characteristic reverses the deemphasizing effect. For example, increasing the amount of blurriness, fading, and/or desaturation causes the respective avatar feature to be deemphasized or to be displayed less prominently, whereas decreasing the amount of blurriness, fading, and/or desaturation, causes the respective avatar feature to be reemphasized (or less deemphasized) or to increase the prominence with which the respective avatar feature is displayed. In some embodiments, the amount of change in the visual characteristic is dynamic and changes based on parameters for displaying or modifying display of a respective avatar feature. In some embodiments, the change in the visual characteristic is a change within a range of values for the respective visual characteristic. For example, in some embodiments, the respective avatar feature is faded by decreasing opacity of the avatar feature from 100% opacity to a lower amount of opacity such as, for example, 10% opacity or 5% opacity or, in some instances 0% opacity, in which case the respective avatar feature is not displayed. In the embodiments described herein, the value of the visual characteristic for an avatar feature is represented by different line types in the figures. For example, a solid line represents a first value for one or more visual characteristics that corresponds to no change in the visual characteristics (e.g., no fading, full saturation, and/or no blurring), a dashed line represents a second value for the one or more visual characteristics that corresponds to a first degree of change that is greater than the solid line (e.g., an increased amount of fading, increased desaturation, and/or increased blurring), and a dotted line represents a third value for the one or more visual characteristics that corresponds to a second degree of change that is greater than the dashed line (e.g., a great amount of fading, a great amount of desaturation, and/or a great amount of blurring, or the feature is not displayed). In some embodiments, the dotted line type indicates that a respective avatar feature is not displayed. It should be appreciated that the different line types are used for illustrative purposes to represent a change in a visual characteristic of the avatar and that the visual characteristic values associated with the different line types are used as examples for illustrating different values for the changed visual characteristics. It should also be appreciated that the visual characteristic values associated with the different line types may not be consistent among each of the example embodiments described herein and that the different line types are provided for illustrative purposes to demonstrate a contrast between different visual characteristic values.

In the embodiments described herein, the changes in the visual characteristic of the avatar are implemented based on heuristics associated with the poses of user 701. In some embodiments, the heuristics are designed to represent user poses and/or movements that may be difficult for a device to accurately recognize, detect, and/or render in the XR environment and/or cause the rendered avatar to exhibit unnatural and/or jittery movements and behavior. Thus, when triggered by one or more of the heuristics, the device modifies one or more visual characteristics of the avatar, so that the avatar is not rendered having unnatural and/or jittery movements and behavior and, instead, is displayed with more natural poses and a modified visual characteristic. In some embodiments, the changed visual characteristics indicate to the viewer of the avatar that there may be uncertainty in determining the pose of a portion of the user in a manner that is less distracting and/or potentially inaccurate manner than displaying the avatar feature without modified visual characteristics, particularly when the respective avatar feature would be displayed moving in an unnatural or otherwise distracting manner. Various examples of the heuristics used to modify the visual characteristics of the avatar are discussed in greater detail below. It should be appreciated that the examples represent non-limiting examples of the heuristics and corresponding modifications to the visual characteristic of the avatar, and the different heuristics and avatar modifications can be combined without departing from the scope of the present disclosure.

Figure 7A:
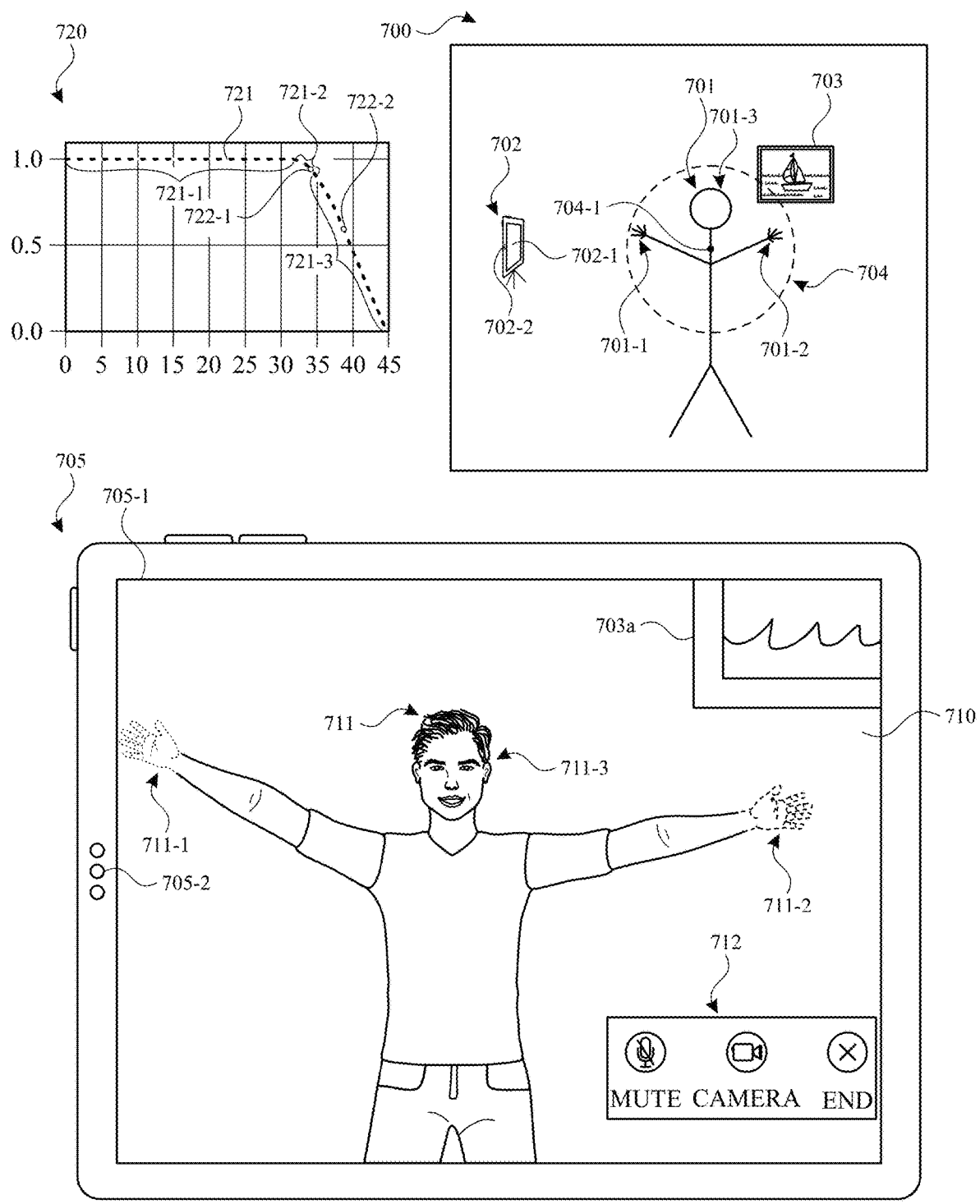
FIGS. 7A-7I illustrate example techniques for modifying a portion of an avatar based on one or more heuristics, in accordance with some embodiments.
Figure 8:
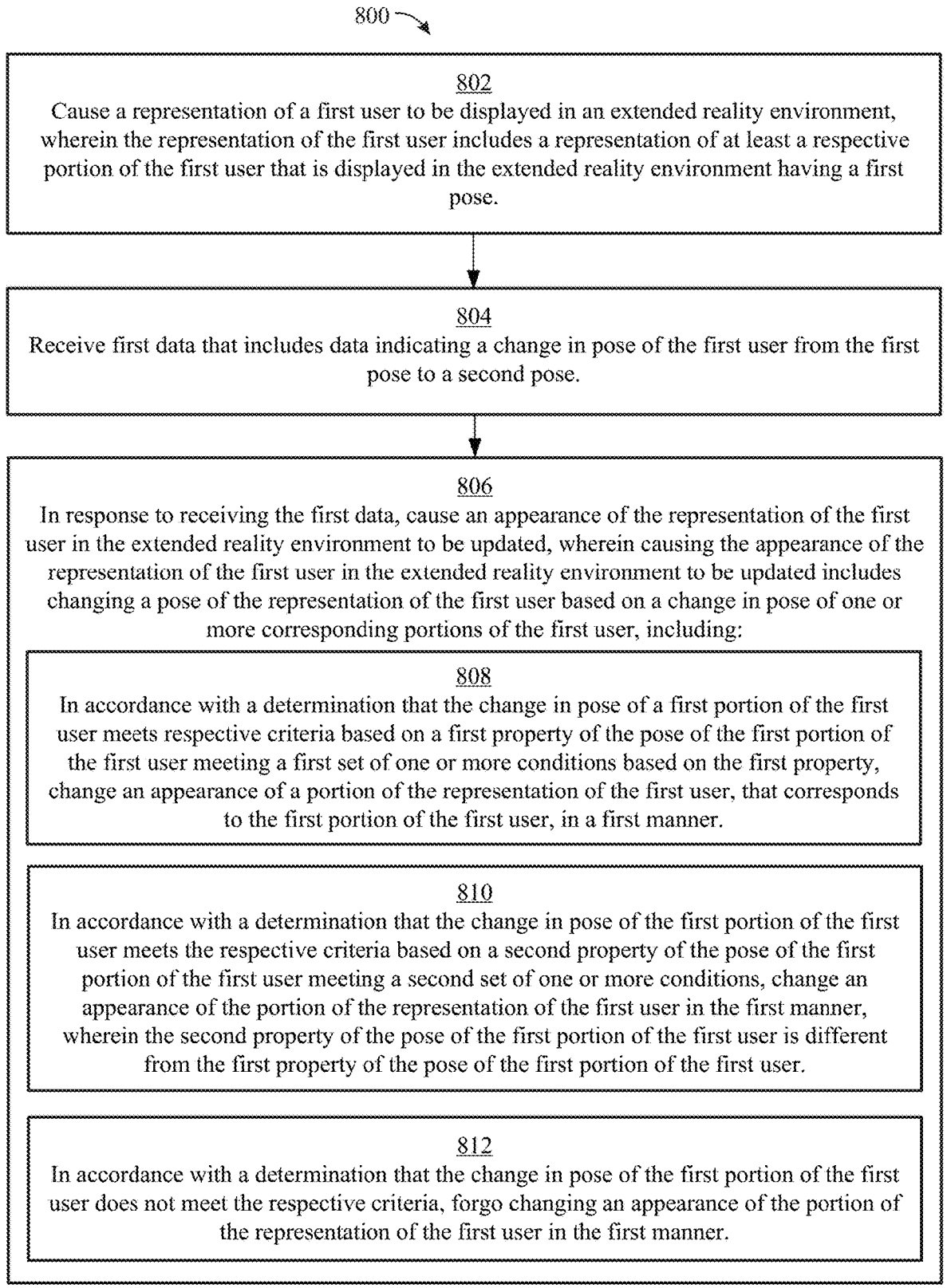
FIG. 8 is a flow diagram of methods of modifying a portion of an avatar based on one or more heuristics, in accordance with various embodiments.

FIG. 7A depicts an embodiment in which device 705 modifies avatar 711 in response to a heuristic that is based on a relative position of a portion of user 701 within camera field-of-view 704. In this embodiment, as portions of user 701 move closer towards the edges of field-of-view 704, device 705 changes one or more visual characteristics of the corresponding avatar features once the respective portions of the user are far enough from center point 704-1 to trigger the change in visual characteristics. For example, in FIG. 7A, user 701 is standing with user hands 701-1 and 701-2 extended outward, with right hand 701-1 positioned closer to the edge of field-of-view 704 than left hand 701-2. User hands 701-1 and 701-2 are at least a threshold distance from center point 704-1 and, therefore, are within a range for causing the corresponding avatar feature (avatar hands 711-1 and 711-2) to have a modified visual characteristic. Because the user's hands are near the edges of the field-of-view 704, the hands have an increased likelihood of moving outside of the camera field-of-view 704, which would cause device 702 to lose tracking of the user's hands and/or cause uncertainty of the poses of the hands, resulting in increased difficulty in rendering the avatar's hands. In some embodiments, device 702, or another device (e.g., a server) modifies avatar 711, with device 705 displaying the modified avatar.

As shown in FIG. 7A, device 705 displays avatar 711 having the same pose as user 701 and modifies avatar hands 711-1 and 711-2 to have a changed visual characteristic that deemphasizes the hands, and/or causes them to be displayed less prominently, such as having increased blurring, fading, and/or desaturation. In this embodiment, user's head 701-3 is not close enough to the edges of field-of-view 704 (or far enough from center point 704-1) to cause a visual characteristic of avatar head 711-3 to be modified, because the user's head is outside of the threshold distance from center point 704-1. As described above, a value of the visual characteristic is represented by different line styles in the figures. In this example, the avatar's left hand 711-2 is indicated to have a change in the visual characteristic as compared to other avatar features such as, for example, avatar head 711-3, because the user's left hand 701-2 is near the edge of field-of-view 704. Accordingly, the avatar's left hand 711-2 is depicted with a dashed line type. The avatar's right hand 711-1 is indicated to have an even greater change in the visual characteristic, as compared to avatar left hand 711-2, because the user's right hand 701-1 is nearer the edge of field-of-view 704 than left hand 701-2. Accordingly, avatar right hand 711-1 is depicted with a dotted line.

FIG. 7A includes graph 720, which, in this example, represents the value of the visual characteristic(s) for the respective avatar features, for the heuristic that is based on the location of the corresponding portions of user 701 in camera field-of-view 704. In the embodiment depicted in FIG. 7A, graph 720 shows the value of the visual characteristics for avatar hands 711-1 and 711-2, based on their position within field-of-view 704. The x-axis represents the distance of a respective portion of user 701 from center point 704-1, and the y-axis represents a value that is indicative of the state of the visual characteristics of the corresponding avatar feature (e.g., avatar hand 711-1, avatar hand 711-2, and/or avatar head 711-3). In some embodiments, the distance is represented as angular distance relative to a line from camera 702-2 to center point 704-1. Graph 720 includes line 721, which represents a value for the visual characteristic for the avatar features at different distances within field-of-view 704 from center point 704-1. In the embodiment in FIG. 7A, line portion 721-1 corresponds to a distance from center point 704-1 that is less than the threshold distance for changing the visual characteristic of the avatar feature (in the example discussed with respect to FIG. 7A, the visual characteristics value for avatar head 711-3 corresponds to a point on line portion 721-1). Thus, when a portion of user 701 is at a distance from center point 704-1 that corresponds to line portion 721-1 (such as user head 701-3), the visual characteristics of the corresponding avatar feature are not modified (e.g., the avatar hands are not blurred, faded, and/or desaturated). Line portions 721-2 and 721-3 correspond to distances from center point 704-1 that are within the threshold distance for changing the visual characteristic of the corresponding avatar feature. Specifically, line portion 721-2 corresponds to distances for which the visual characteristics are changed at a first rate (a more gradual rate), and line portion 721-3 corresponds to distances for which the visual characteristics are changed at a greater rate (a quicker rate of change). When the portion of the user is located within the field-of-view at the distances represented by sections 721-2 and 721-3, the corresponding avatar feature has a changed visual characteristic. For example, point 722-1 represents the visual characteristic value for avatar hand 711-2 (shown having a dashed line in FIG. 7A), and point 722-2 represents the visual characteristic value for avatar hand 711-1 (shown having a dotted line in FIG. 7A). Accordingly, as a portion of user 701 moves towards the edge of field-of-view 704, the visual characteristics of the corresponding avatar feature do not change until the feature reaches a threshold distance (e.g., represented by the transition from line section 721-1 to line section 721-2). Once the portion of the user reaches the threshold distance, the visual characteristics of the corresponding avatar feature gradually changes (to deemphasize the avatar feature) as the portion of the user continues to move towards the edge of field-of-view 704 for a first range of distances from the center point 704-1 (represented by the values in line section 721-2), then changes more quickly for a second range of distances from the center point 704-1 (represented by the values in line section 721-3). In some embodiments, as the portion of the user moves away from the edges of camera field-of-view 704, the modifications to the visual characteristics of the corresponding avatar feature are reversed.

Figure 7B:
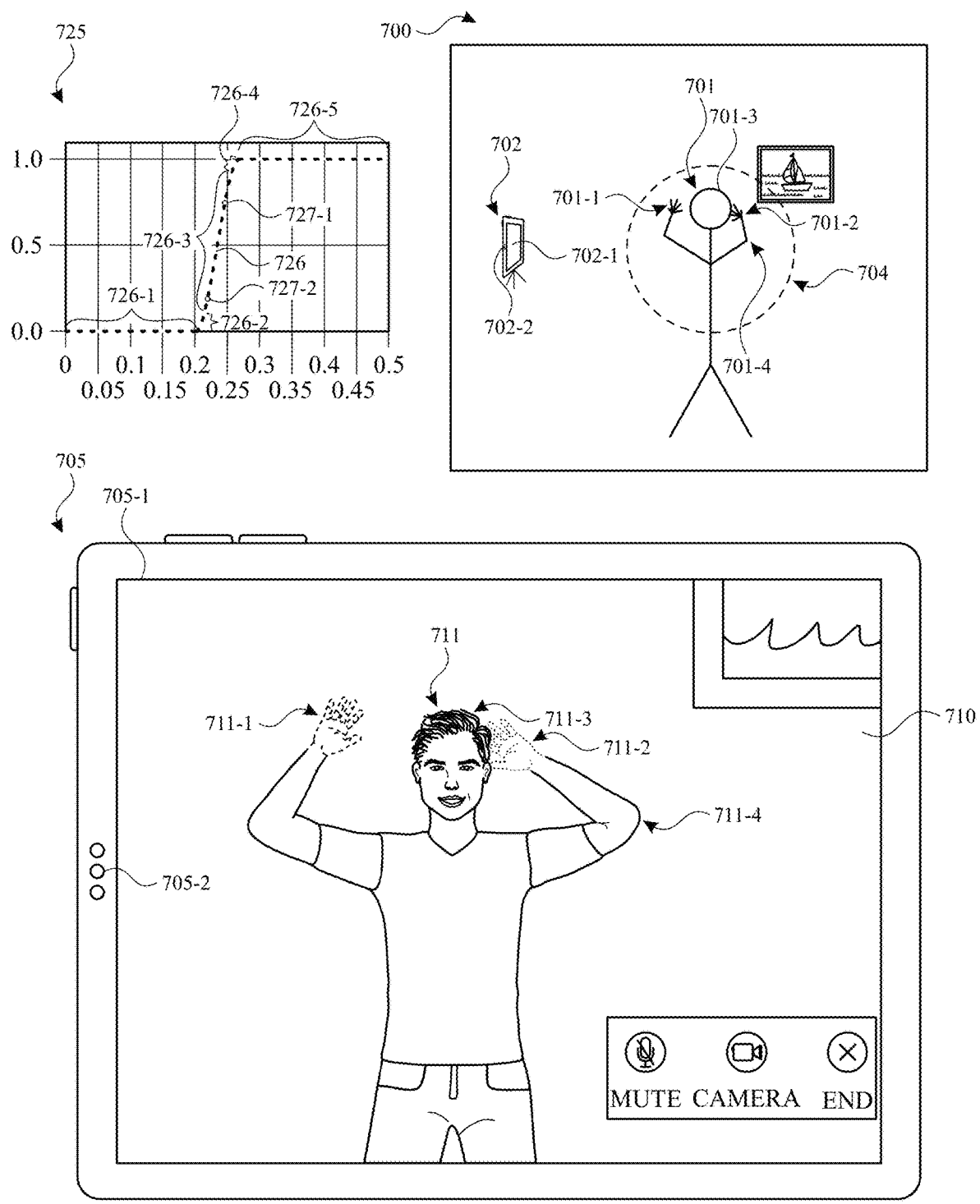

FIG. 7B depicts an embodiment in which device 705 modifies avatar 711 in response to a heuristic that is based on a relative position of a portion of user 701 relative to the user's head 701-3. In this embodiment, as portions of user 701 move closer to the user's head 701-3, device 705 changes one or more visual characteristics of the corresponding avatar features when the portions of the user are within a threshold distance from the user's head. For example, in FIG. 7B, user 701 is standing with left hand 701-2 next to the user's head 701-3, and with right hand 701-1 near head 701-3 but positioned farther from the head than left hand 701-1. User hands 701-1 and 701-2 are within a threshold distance from user head 701-3 and, therefore, are within a range for causing the corresponding avatar features (avatar hands 711-1 and 711-2) to have a modified visual characteristic. In some embodiments, the avatar's hands are displayed having a modified visual characteristic when they are near the user's head because the hands, when in such a pose, are presumed to be less important than the user's head for communication and are likely to be distracting to someone viewing the avatar.

As shown in FIG. 7B, device 705 displays avatar 711 having the same pose as user 701 and modifies avatar hands 711-1 and 711-2 to have a changed visual characteristic that deemphasizes the hands, and/or causes them to be displayed less prominently, such as having increased blurring, fading, and/or desaturation. For example, the avatar's right hand 711-1 is indicated to have a change in the visual characteristic as compared to other avatar features because the user's right hand 701-1 is near the user's head. Accordingly, the avatar's right hand 711-1 is depicted with a dashed line type. The avatar's left hand 711-2 is indicated to have an even greater change in the visual characteristic, as compared to the avatar's right hand 711-1, because the user's left hand 701-2 is closer to the user's head than the user's right hand 701-1. Accordingly, avatar left hand 711-2 is depicted with a dotted line type. Because the user's left hand 701-2 is closer to the user's head 701-3 than right hand 701-1, avatar left hand 711-2 is shown with a greater change in the visual characteristics than the avatar right hand 711-1. In this embodiment, some portions of the user are not close enough to the user's head 701-3 to cause a visual characteristic change to corresponding portions of avatar 711. For example, a visual characteristic of avatar elbow 711-4 is not changed because user elbow 701-4 is outside of the threshold distance from the user's head. Accordingly, avatar elbow 711-4 is represented having solid lines in the avatar depicted in FIG. 7B.

FIG. 7B includes graph 725, which represents the value of the visual characteristic(s) for the respective avatar features, for the heuristic that is based on the location of the corresponding portions of user 701 relative to the user's head 701-3. The x-axis represents distance from user head 701-3, and the y-axis represents a value that is indicative of the state of the visual characteristics of the modified avatar feature. Graph 725 includes line 726, which represents a value for the visual characteristic for the avatar features at different distances from user head 701-3. In the embodiment in FIG. 7B, line portion 726-1 corresponds to a range of distances from user head 701-3 that is less than the threshold distance for changing the visual characteristic of the avatar feature. Thus, when a portion of user 701 is at a distance from user head 701-3 that corresponds to line portion 726-1, the visual characteristics of the corresponding avatar feature are modified at maximum or high value (e.g., the avatar hand is completely blurred, completely faded, and/or completely desaturated, or not displayed). Line portion 726-2, 726-3, and 726-4 correspond to ranges of distances from user head 701-3 that are within the threshold distance for changing the visual characteristic of the avatar feature. Specifically, line portion 726-2 corresponds to distances for which the visual characteristics are changed at a first rate (a more gradual rate), line portion 726-3 corresponds to distances for which the visual characteristics are changed at a greater rate (a quicker rate of change), and line portion 726-4 corresponds to distances for which the visual characteristics are changed at a third rate (e.g., a more gradual rate similar to the first rate). When the portion of the user is located at a distance from user head 701-3 that is represented by sections 726-2, 726-3, and 726-4, the corresponding avatar feature has a changed visual characteristic that varies based on the distance from the user's head. For example, point 727-1 represents the visual characteristic value for avatar right hand 711-1 (shown having a dashed line in FIG. 7B), and point 727-2 represents the visual characteristic value for avatar left hand 711-2 (shown having a dotted line in FIG. 7B). Line portion 726-5 corresponds to a range of distances from user head 701-3 that are greater than the threshold for modifying the visual characteristics of the corresponding avatar features. Thus, when a portion of user 701 is at a distance from user head 701-3 that corresponds to line portion 726-5, the visual characteristics of the corresponding avatar feature are not modified (e.g., the avatar hands are not blurred, faded, and/or saturated). Accordingly, as a portion of user 701 moves towards the user's head 701-3, the visual characteristics of the corresponding avatar feature do not change until the feature reaches a threshold distance (e.g., represented by the transition from line section 726-5 to line section 726-4). Once the portion of the user reaches the threshold distance, the visual characteristics of the corresponding avatar feature gradually changes (to deemphasize the avatar feature) as the portion of the user continues to move towards the user's head for a first range of distances from the user's head 701-3 (represented by the values in line section 726-4), then changes more quickly for a second range of distances from the user's head 701-3 (represented by the values in line section 726-3), and then again changes more gradually for a third range of distances from the user's head 701-3 (represented by the values in line section 726-2). When the portion of the user is in a range of distances less than a threshold distance from the user's head 701-3 (represented by the values in line section 726-1), the corresponding avatar feature is displayed having the maximum characteristic change or is not displayed. In some embodiments, as the portion of the user moves away from the user's head 701-3, the modifications to the visual characteristics of the corresponding avatar feature are reversed.

Figure 7C:
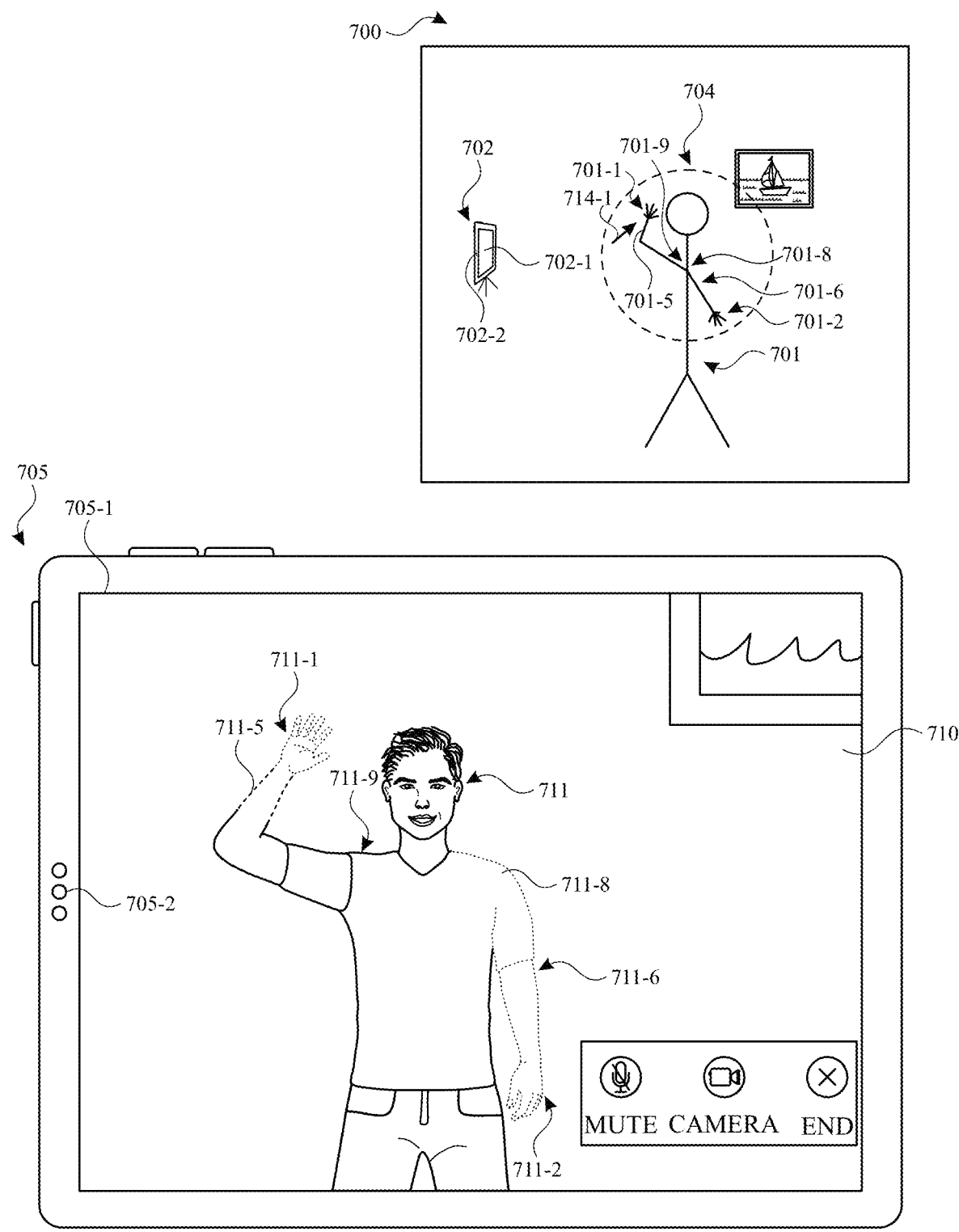

FIG. 7C depicts embodiments in which device 705 modifies a first portion of avatar 711 in response to a first heuristic that is based on an amount of movement of a portion of user 701 and modifies a second portion of avatar 711 in response to a second heuristic that is based on an amount of movement and a detected location of a portion of user 701. The movement heuristic is demonstrated by the movement of the user's right forearm 701-5 and hand 701-1 (the movement is indicated by arrow 714-1) and corresponding modification to the avatar's right forearm 711-5 and hand 711-1. In this embodiment, as the user bends their arm at the elbow, user's hand 701-1 moves at a greater rate of speed than user's forearm 711-5. As portions of user 701 move in the physical environment 700, the certainty of the detected pose decreases, particularly as the speed of movement increases. Therefore, there is uncertainty of the pose of the user's forearm 701-5 and even greater uncertainty of the pose of the user's hand 701-1. Accordingly, as device 705 displays avatar 711 moving the avatar's right forearm 711-5 and right hand 711-1 to mimic the movement of the user's right forearm 701-5 and right hand 701-1, the avatar's right forearm 711-5 is displayed with a change in the visual characteristic, as indicated by the dashed line type of forearm 711-5, and the avatar's right hand 711-1 is displayed with a greater change in the visual characteristic, as indicated by the dotted line type of hand 711-1.

The movement-and-location heuristic is demonstrated by the location of the user's left hand 701-2 and corresponding modification to the avatar's left arm 711-6, hand 711-2, and shoulder 711-8. In this embodiment, the user has lowered and is not moving left arm 701-6 and hand 701-2. In this embodiment, the location criteria of the heuristic is met by the placement of hand 701-2 below the user's waist, and the movement criteria of the heuristic is met by the hand 701-2 being stationary. In this situation, the user's hand is presumed to be unimportant for communication purposes and is, therefore, deemphasized or not displayed at device 705, as indicated by the dotted line type of avatar hand 711-2, arm 711-6, and shoulder 711-8. It should be appreciated that the location component can be different from the example provided here. For example, the location component could be satisfied by placement of the hand near the user's head. In some embodiments, the various heuristics can include additional criteria such as pose criteria. For example, the movement-and-location heuristic is met when the hand has a particular pose such as a resting pose when placed below the user's waist or near the user's head and not moving.

As demonstrated in FIG. 7C, in some embodiments, the visual characteristics can be changed independently for various avatar features. For example, avatar shoulder 711-8 corresponds to user shoulder 701-8, and avatar shoulder 711-9 corresponds to user shoulder 701-9. Avatar shoulder 711-8 is shown with a dotted line type whereas avatar shoulder 711-9 is shown with a solid line type, indicating that the visual characteristic is not changed for avatar shoulder 711-9, but the visual characteristic is changed for avatar shoulder 711-8. In some embodiments, some avatar features are not displayed if other avatar features are not displayed. For example, assuming the dotted line type indicates an avatar feature not being displayed, the embodiment depicted in FIG. 7C demonstrates that avatar hand 711-2 is not displayed. This is because user hand 701-2 is positioned below the user's waist and is not moving. Because avatar hand 711-2 is not displayed, device 705 also does not display avatar arm 711-6 and, optionally, avatar shoulder 711-8, because displaying those additional features (even if their location is known or being tracked) can be distracting to a user viewing avatar 711.

Figure 7D:
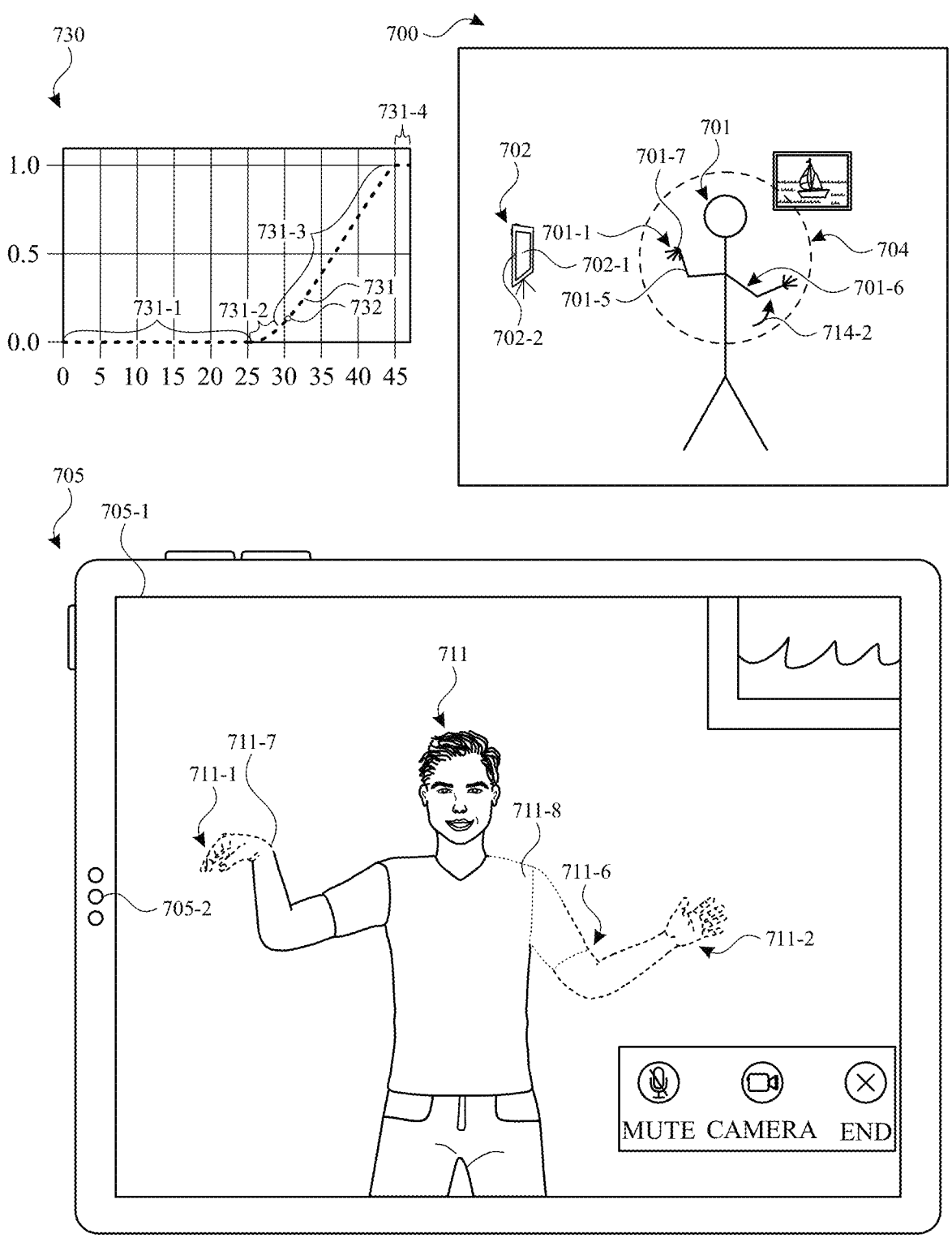

FIG. 7D depicts an embodiment in which device 705 modifies a portion of avatar 711 in response to the movement-and-location heuristic. In FIG. 7D, user 701 has moved from the pose in FIG. 7C, to the pose in FIG. 7D, and device 705 updates avatar 711 in response to the movements. In FIG. 7D, user arm 701-6 and hand 701-2 are being raised from the resting position in FIG. 7C (movement is indicated by arrow 714-2), and right wrist 701-7 is being flexed, causing hand 701-1 to be angled with respect to forearm 701-5 and with respect to the line-of-sight of camera 702-2. As user 701 raises hand 701-2 and arm 701-6, the criteria of the movement-and-location heuristic is no longer met, so device 705 reverses the change in visual characteristics for avatar hand 711-2, arm 711-6, and shoulder 711-8, as shown in FIG. 7D. In some embodiments, the visual characteristics of different avatar features are modified at different rates. For example, in FIG. 7D, the avatar hand 711-2 and arm 711-6 fade back into view at a faster rate than shoulder 711-8, as indicated by the dashed line type of hand 711-2 and arm 711-6 and the dotted line type of shoulder 711-8. In some embodiments, the visual characteristics are changed at different rates depending on which direction the visual characteristic is changing. For example, the hands are shown fading out at a more rapid rate (the change shown in FIG. 7C) than they are shown fading back into view (the change shown in FIG. 7D).

FIG. 7D also depicts an embodiment in which device 705 modifies a portion of avatar 711 in response to a heuristic that is based on flexion of a portion of user 701. As user flexes right wrist 701-7, the angle of hand 701-1 changes with respect to the user's forearm 701-5 and with respect to a line-of-sight of camera 702-2. In some embodiments, the heuristic is met based on detecting the angle of flexion with respect to the user's forearm (or another portion of the user). In some embodiments, the heuristic is met based on detecting the angle of flexion with respect to a different reference point or reference line, such as the line-of-sight of camera 702-2. In these embodiments, the orientation of hand 701-1 in the flexed pose can increase the uncertainty of the hand pose as portions of the hand can become obscured or blocked with respect to camera 702-2. In some embodiments, such as when device 702 is an HMD having a camera located on the HMD, the hand is obscured because the device's view of the hand is at least partially blocked by the user's wrist or other body parts when the wrist is flexed. In response to detecting the flex of wrist 701-7 and/or the angled orientation of hand 701-1, device 705 modifies the pose and visual characteristics of avatar hand 711-1 and avatar wrist 711-7, as shown by the dashed line style of hand 711-1 and wrist 711-7 in FIG. 7D.

FIG. 7D includes graph 730, which represents the value of the visual characteristic(s) for the respective avatar features, for the heuristic that is based on the flexion of a portion of user 701. The x-axis represents the angle of flexion (e.g., measured with respect to forearm 701-5 or measured with respect to the line-of-sight of camera 702-2), and the y-axis represents a value that is indicative of the state of the visual characteristics of the modified avatar feature. Graph 730 includes line 731, which represents a value for the visual characteristic for the avatar features at different angles. In the embodiment in FIG. 7D, line portion 731-1 corresponds to a range of angles that is less than a threshold angle for varying the visual characteristic of the avatar feature. Thus, when a portion of user 701 is flexed at an angle that corresponds to line portion 731-1, the visual characteristics of the corresponding avatar feature are modified at maximum or high value (e.g., the avatar hand is completely blurred, completely faded, and/or completely desaturated, or not displayed). Line portion 731-2 and 731-3 correspond to ranges of angles that meet the angle threshold for varying the visual characteristic of the avatar feature. Specifically, line portion 731-2 corresponds to angles for which the visual characteristics are changed at a first rate (a more gradual rate), and line portion 731-3 corresponds to angles for which the visual characteristics are changed at a greater rate (a quicker rate of change). When the portion of the user is flexed at an angle that is represented by sections 731-2 and 731-3, the corresponding avatar feature has a changed visual characteristic that varies based on the angle of flexion. For example, point 732 represents the visual characteristic value for avatar right hand 711-1 and wrist 711-7 (shown having a dashed line type in FIG. 7D). Line portion 731-4 corresponds to a range of angles that are greater than the threshold for modifying the visual characteristics of the corresponding avatar features. Thus, when a portion of user 701 is flexed at an angle that corresponds to line portion 731-4, the visual characteristics of the corresponding avatar feature are not modified (e.g., the avatar hand and wrist are not blurred, faded, and/or saturated). Accordingly, as a portion of user 701 flexes, the visual characteristics of the corresponding avatar feature do not change until the feature reaches a threshold angle of flexion (e.g., represented by the transition from line section 731-4 to line section 731-3). Once the portion of the user reaches the threshold angle, the visual characteristics of the corresponding avatar feature changes (to deemphasize the avatar feature) as the portion of the user continues to flex for a first range of angles (represented by the values in line section 731-3), then changes more gradually for a second range of angles (represented by the values in line section 731-2). When the portion of the user is flexed by an amount that is in a range of angles less than a threshold for varying the visual characteristic (represented by the values in line section 731-1), the corresponding avatar feature is displayed having the maximum characteristic change or is not displayed. In some embodiments, as the portion of the user flexes in the opposite direction (e.g., unflexing), the modifications to the visual characteristics of the corresponding avatar feature are reversed.

Figure 7E:
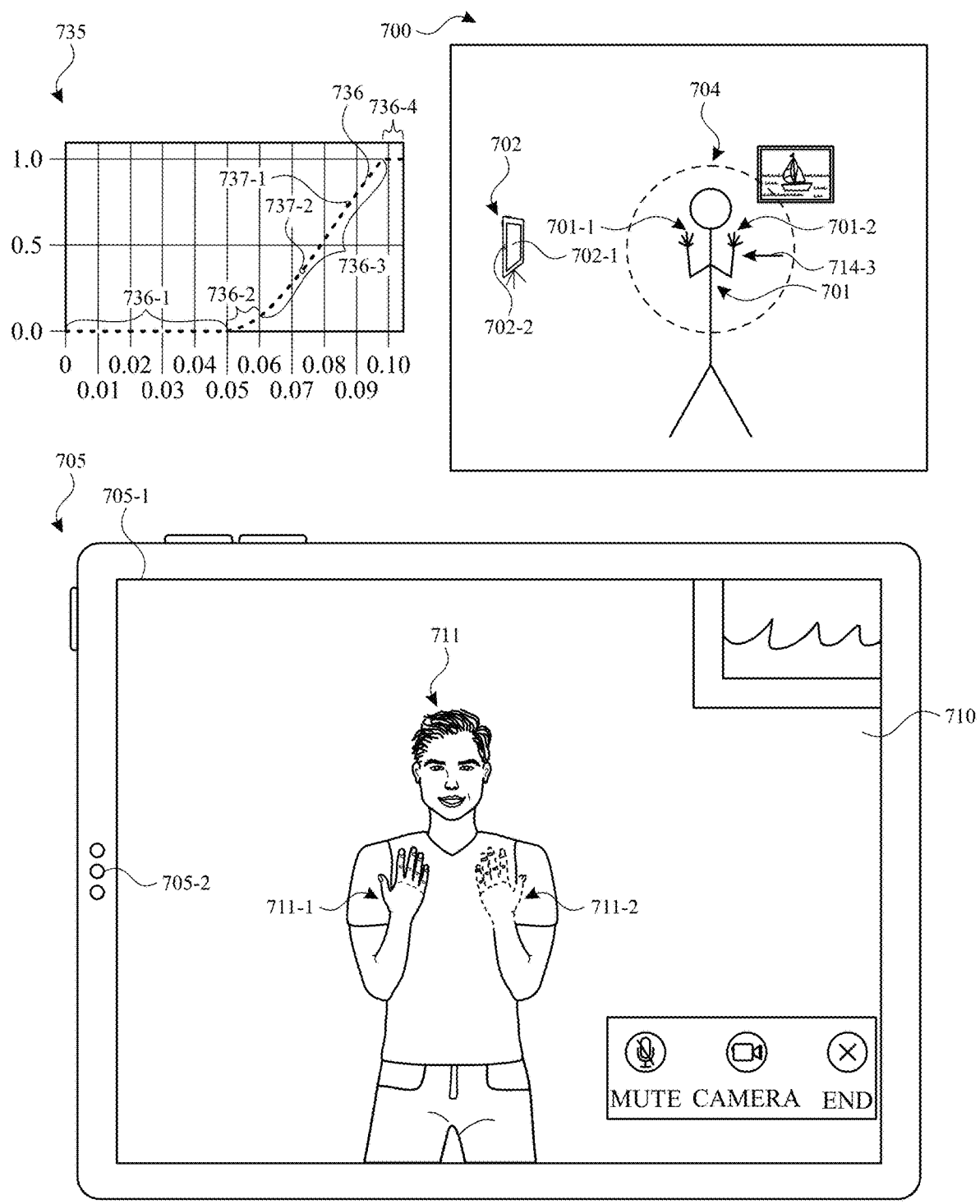

FIG. 7E depicts embodiments in which device 705 modifies a portion of avatar 711 in response to a heuristic that is based on a pose of portions of user 701. In this embodiment, when portions of user 701 have a particular pose, device 705 modifies the corresponding avatar features based on characteristics of the pose such as, for example, a distance between the portions of the user. For example, in FIG. 7E, user 701 is holding hand 701-1 and hand 701-2 out in front and moving the hands closer together as indicated by arrow 714-3. In this embodiment, the hands have a pose in which the palms are facing towards user 701, however other poses can be detected such as, for example, a clapping or praying pose in which the palms of the hands are facing towards each other. In some embodiments, the poses being considered are poses that can cause increased uncertainty of the poses of the particular portions of user 701 as the portions of the user move. For example, as the hands move together in a clapping pose, it becomes more difficult for device 702 or device 705 to distinguish between the two hands of user 701. Accordingly, visual characteristics of the corresponding avatar features (e.g., avatar hand 711-1 and/or avatar hand 711-2) are changed as the avatar hands move together. As shown in FIG. 7E, as the user moves hands 701-1 and 701-2 closer together, device 705 modifies avatar 711 to show the corresponding movement of avatar hands 711-1 and 711-2, and begins to modify the visual characteristic of one (or both) of the hands. In the embodiment depicted in FIG. 7E, device 705 begins to modify the visual characteristic of hand 711-2 (as indicated by the dashed line type), however, the other hand or both hands could be shown with the modified visual characteristic.

FIG. 7E includes graph 735, which represents the value of the visual characteristic(s) for the respective avatar features, for the heuristic that is based on a pose of a portion of user 701. The x-axis represents the distance between the portions of the user while in the respective pose, and the y-axis represents a value that is indicative of the state of the visual characteristics of the modified avatar feature. Graph 735 includes line 736, which represents a value for the visual characteristic for the avatar features at different distances. In the embodiment in FIG. 7E, line portion 736-1 corresponds to a range of distances that is less than a threshold distance for varying the visual characteristic of the corresponding avatar feature(s). Thus, when a portion of user 701 has the respective pose and is at a distance from another portion of user 701 that corresponds to line portion 736-1, the visual characteristics of the corresponding avatar feature(s) are modified at maximum or high value (e.g., the avatar hand is completely blurred, completely faded, and/or completely desaturated, or not displayed). Line portion 736-2 and 736-3 correspond to ranges of distances that meet the distance threshold for varying the visual characteristic of the avatar feature. Specifically, line portion 736-2 corresponds to distances for which the visual characteristics are changed at a first rate (a more gradual rate), and line portion 736-3 corresponds to distances for which the visual characteristics are changed at a greater rate (a quicker rate of change). When the portions of the user have the pose and are positioned at a distance that is represented by sections 736-2 and 736-3, the corresponding avatar feature has a changed visual characteristic that varies based on the distance between the portions of user 701. For example, point 737-1 represents the visual characteristic value for avatar left hand 711-2 (shown having a dashed line type in FIG. 7E), and point 737-2 represents the visual characteristic value for avatar left hand 711-2 when the hands move closer together (for example, corresponding to avatar hand 711-2 shown having the dotted line type in FIG. 7F). Line portion 736-4 corresponds to a range of distances that are greater than the threshold for modifying the visual characteristics of the corresponding avatar features. Thus, when a portion of user 701 has the pose and is at a distance that corresponds to line portion 736-4, the visual characteristics of the corresponding avatar feature are not modified (e.g., the avatar hand is not blurred, faded, and/or saturated). Accordingly, as portions of user 701 have the respective pose, the visual characteristics of the corresponding avatar features do not change until the features reach a threshold distance from one another (e.g., represented by the transition from line section 736-4 to line section 736-3). Once the portions of the user reach the threshold distance, the visual characteristics of the corresponding avatar features change (to deemphasize the avatar features) as the portions of the user continue to move together for a first range of distances (represented by the values in line section 736-3), then changes more gradually for a second range of distances (represented by the values in line section 736-2). When the portions of the user are spaced by an amount that is in a range of distances less than a threshold for varying the visual characteristic (represented by the values in line section 736-1), the corresponding avatar features are displayed having the maximum characteristic change or are not displayed. In some embodiments, as the portions of the user have the respective pose and move away from each other, the modifications to the visual characteristics of the corresponding avatar features are reversed.

Figure 7F:
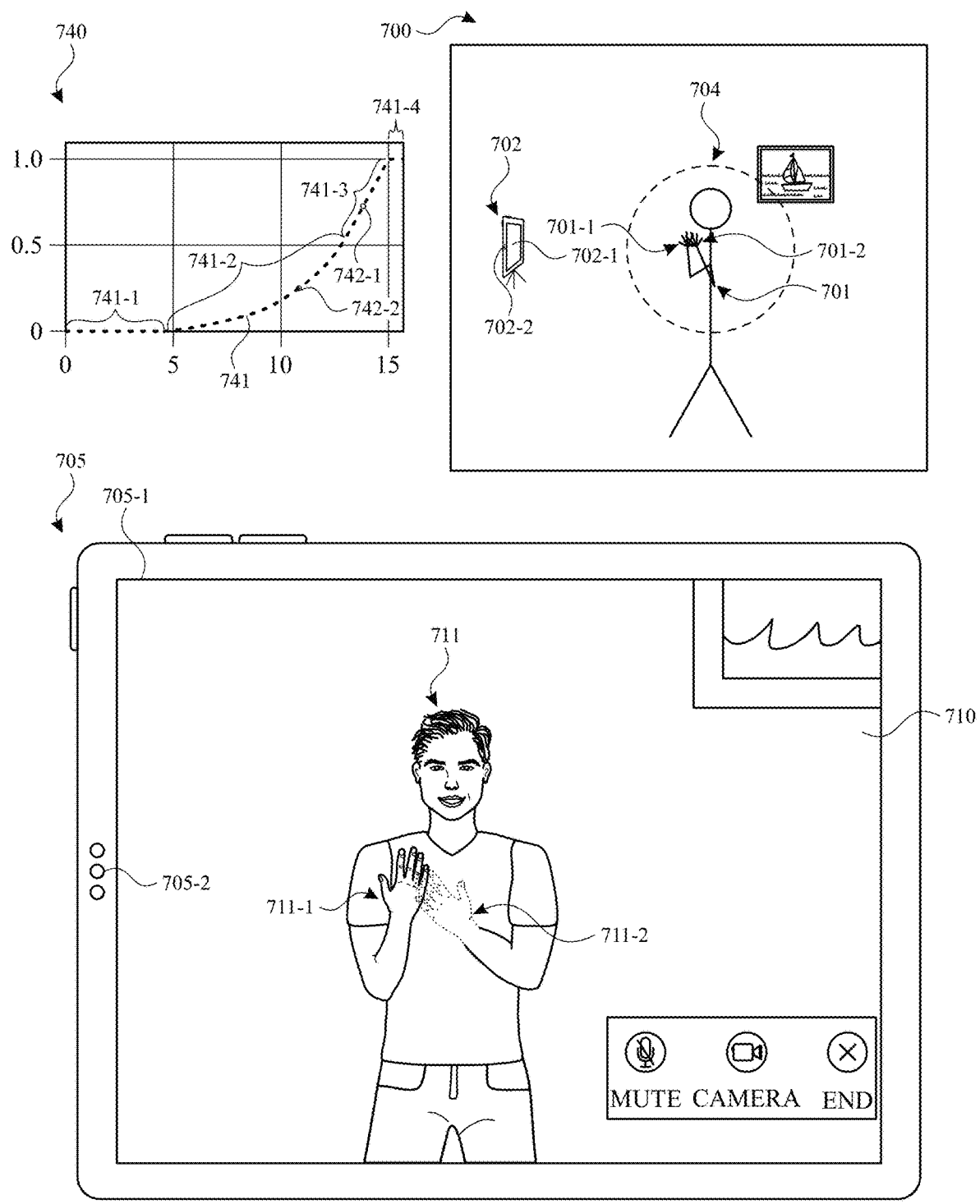

FIG. 7F depicts embodiments in which device 705 modifies a portion of avatar 711 in response to a heuristic that is based on an amount of overlap (or an anticipated overlap) between portions of user 701. In FIG. 7F, user 701 moves from the pose in FIG. 7E to the pose in FIG. 7F where hand 701-2 is positioned behind hand 701-1 from the perspective of camera 702-2. As the hand moves from the position in FIG. 7E to the position in FIG. 7F, device 705 moves avatar hand 711-2 to mimic the movement and changes the visual characteristic of avatar hand 711-2 as user hand 701-2 moves near, and ultimately behind, user hand 701-1. In some embodiments, the hand that is modified is a hand that is positioned farther away from a reference point such as camera 702-2. For example, because hand 701-2 is farther from camera 702-2 than hand 701-1, it is presumed that hand 701-2 will pass behind hand 701-1 if the hands continue to move together, which will obscure the camera's view of hand 701-2 and cause increased uncertainty of the pose of hand 701-2. Accordingly, device 705 blurs or otherwise modifies the visual characteristic of avatar hand 711-2 as the distance between user hands 701-2 and 701-1 decreases and/or as the overlap between the two portions of the user increases. It should be appreciated that the perspective discussed above can be changed based on the location of camera 702-2. For example, if device 702 is implemented as an HMD, camera 702-2 is positioned on the head of user 701, and hand 701-2 would be positioned in front of hand 701-1 from the perspective of camera 702-2. In such cases, avatar hand 711-1 would be blurred, and avatar hand 711-2 would remain unblurred.

In some embodiments, the visual characteristic change shown in FIG. 7E is caused by the overlap heuristic discussed above with respect to FIG. 7F. In such embodiments, the dashed line type of avatar hand 711-2 is caused by the distance between the user's hands in FIG. 7E, and the change in visual characteristics represented by the dotted line type for avatar hand 711-2 in FIG. 7F represents an increased change in the visual characteristics as compared to the visual characteristic value represented by the dashed lines of avatar hand 711-2 shown in FIG. 7E.

FIG. 7F includes graph 740, which represents the value of the visual characteristic(s) for the respective avatar features, for the heuristic that is based on an amount of overlap (or anticipated overlap) between portions of user 701. The x-axis represents the distance between the portions of the user, and the y-axis represents a value that is indicative of the state of the visual characteristics of the modified avatar feature. In some embodiments, the distance is represented as angular distance between two lines, with the first line extending from camera 702-2 to user hand 701-1 and the second line extending from camera 702-2 to user hand 701-2. Graph 740 includes line 741, which represents a value for the visual characteristic for the avatar features at different distances. In the embodiment in FIG. 7F, line portion 741-1 corresponds to a range of distances that is less than a threshold distance for varying the visual characteristic of the corresponding avatar feature(s). Thus, when a portion of user 701 is at a distance from another portion of user 701 that corresponds to line portion 741-1 (the respective portions of the user are very close together and/or overlapping), the visual characteristics of the corresponding avatar feature(s) are modified at maximum or high value (e.g., the avatar hand is completely blurred, completely faded, and/or completely desaturated, or not displayed). Line portion 741-2 and 741-3 correspond to ranges of distances that meet the distance threshold for varying the visual characteristic of the avatar feature. Specifically, line portion 741-2 corresponds to distances for which the visual characteristics are changed at a first rate (a more gradual rate), and line portion 741-3 corresponds to distances for which the visual characteristics are changed at a greater rate (a quicker rate of change). When the portions of the user are positioned at a distance that is represented by sections 741-2 and 741-3, the corresponding avatar feature has a changed visual characteristic that varies based on the distance between the portions of user 701. For example, point 742-1 represents the visual characteristic value for avatar left hand 711-2 (for example, shown having a dashed line type in FIG. 7E), and point 742-2 represents the visual characteristic value for avatar left hand 711-2 when the hands move closer together (corresponding to avatar hand 711-2 shown having the dotted line type in FIG. 7F). Line portion 741-4 corresponds to a range of distances that are greater than the threshold for modifying the visual characteristics of the corresponding avatar features. Thus, when portions of user 701 are at a distance that corresponds to line portion 741-4, the visual characteristics of the corresponding avatar feature are not modified (e.g., the avatar hand is not blurred, faded, and/or saturated). Accordingly, as portions of user 701 move closer together, the visual characteristics of the corresponding avatar features do not change until the features reach a threshold distance from one another (e.g., represented by the transition from line section 741-4 to line section 741-3). Once the portions of the user reach the threshold distance, the visual characteristics of the corresponding avatar feature changes (to deemphasize the avatar feature) as the portions of the user continue to move together for a first range of distances (represented by the values in line section 741-3), then changes more gradually for a second range of distances (represented by the values in line section 741-2). When the portions of the user are overlapping or are spaced by an amount that is in a range of distances less than a threshold for varying the visual characteristic (represented by the values in line section 741-1), the corresponding avatar features are displayed having the maximum characteristic change or are not displayed. In some embodiments, as the portions of the user move away from each other, the modifications to the visual characteristics of the corresponding avatar features are reversed.

In some embodiments, inputs from multiple heuristics that do not individually trigger a change in an appearance of a portion of avatar 711 can, collectively, meet a threshold for changing the appearance of the portion of the avatar. For example, FIGS. 7G-7I depict an embodiment in which the poses of user 701 do not meet the criteria of individual heuristics for modifying the visual characteristics of the corresponding avatar features, but the cumulative effect of the uncertainty caused by the pose is sufficient to meet a threshold for causing device 705 to modify the visual characteristics of the corresponding avatar feature.

Figure 7G:
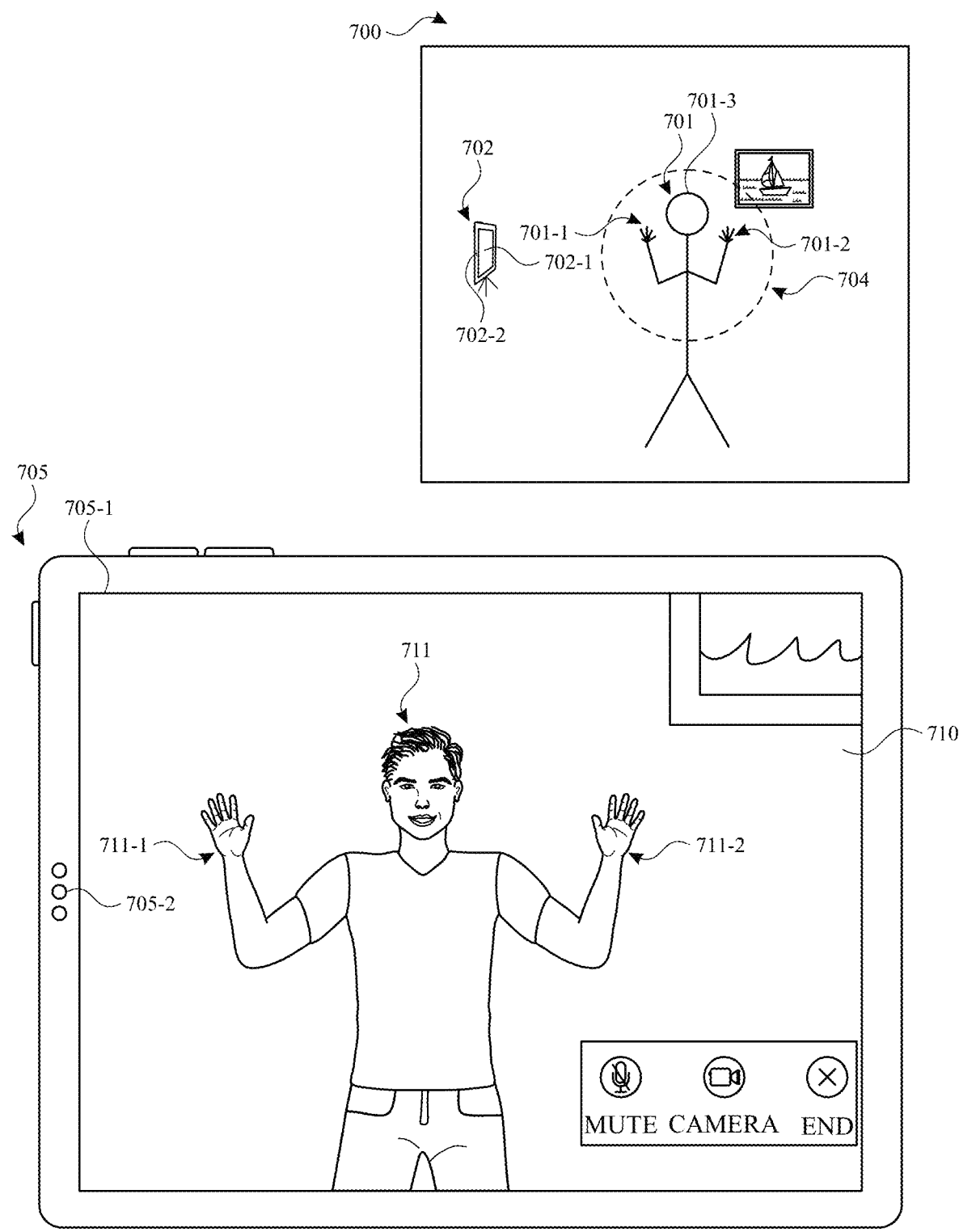

In FIG. 7G, user 701 is standing in physical environment 700 with hands 701-1 and 701-2 raised close to user's head 701-3, but not close enough to trigger the heuristic that is based on a relative position of a portion of user 701 relative to the user's head 701-3 (e.g., as discussed above with respect to FIG. 7B). Accordingly, device 705 displays avatar

711 with avatar hands 711-1 and 711-2 raised to mimic the pose of user 701, but does not change the visual characteristic of the avatar hands.

Figure 7H:
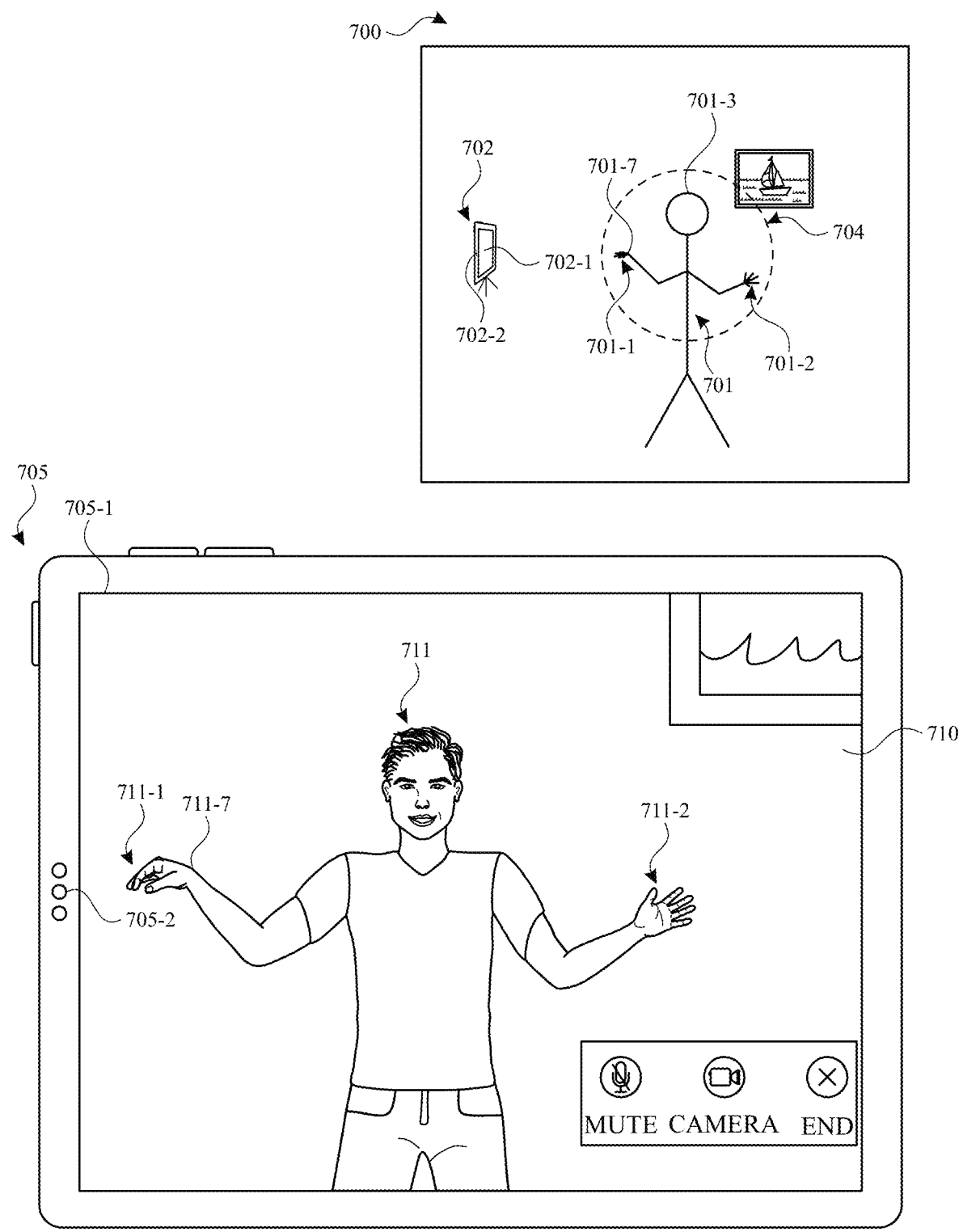
Figure 7I:
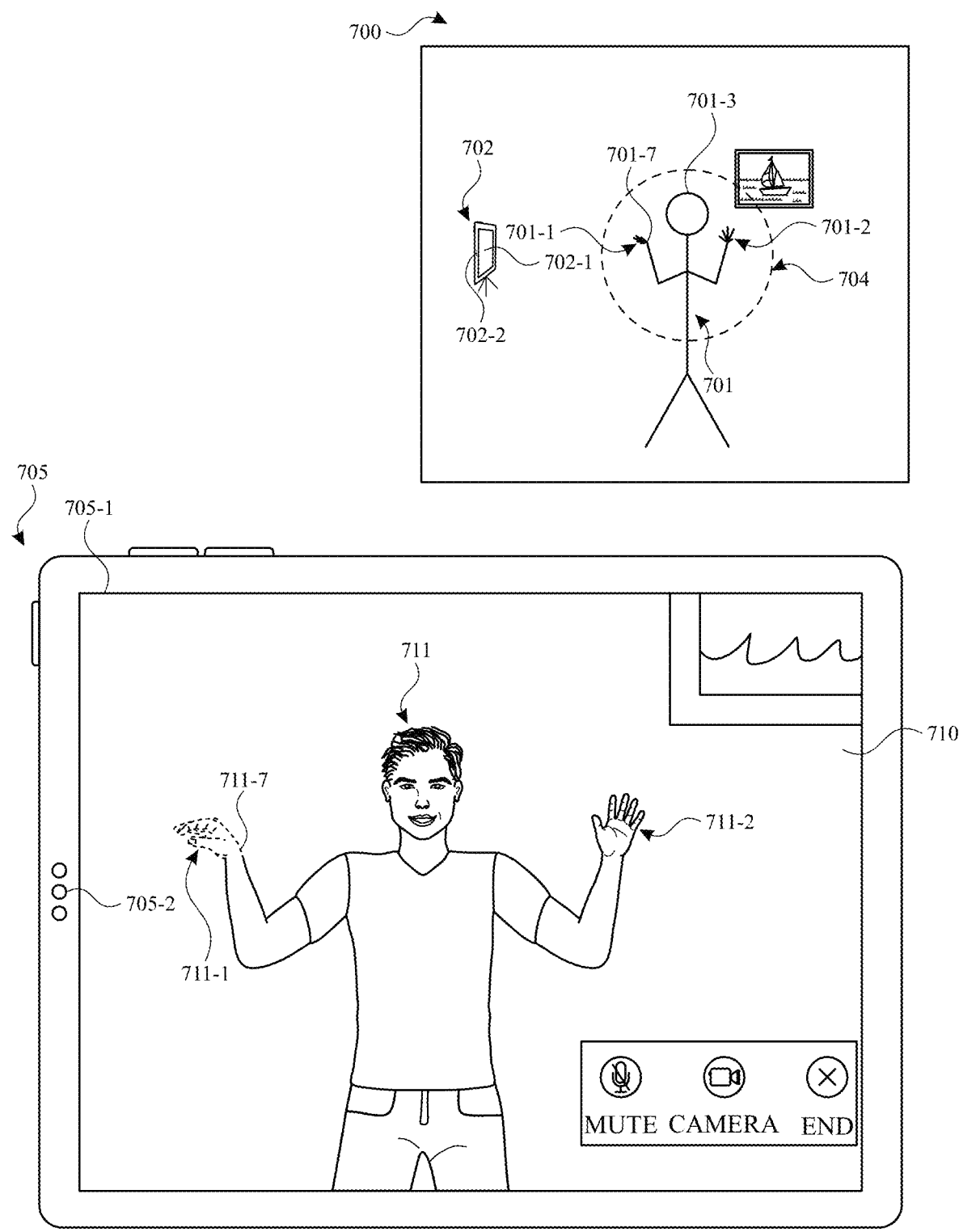

In FIG. 7H, user 701 is standing in physical environment 700 with wrist 701-7 slightly flexed, but not flexed enough to trigger the heuristic that is based on flexion of a portion of user 701 (e.g., as discussed above with respect to FIG. 7D). Accordingly, device 705 displays avatar 711 with avatar hands 711-1 and 711-2 raised and with wrist 711-7 slightly flexed to mimic the pose of user 701, but does not change the visual characteristic of avatar hand 711-1 or avatar wrist 711-7.

In FIG. 7I, user 701 is standing in physical environment 700 with hands 701-1 and 701-2 raised (similar to FIG. 7G), and with wrist 701-7 slightly flexed (similar to FIG. 7H). The raised position of hand 701-1 is not close enough to the user's head 701-3 to trigger the heuristic that is based on a relative position of a portion of user 701 relative to the user's head 701-3. Similarly, wrist 701-7 is not flexed enough to trigger the heuristic that is based on flexion of a portion of user 701. However, the combination of the placement of hand 701-1 near the head 701-3 and having the slight flexion of wrist 701-7 is sufficient to cause enough uncertainty of the pose of hand 701-1 that device 705 modifies the visual characteristic of avatar hand 711-1, as shown in FIG. 7I. Accordingly, device 705 displays avatar 711 with hands 711-1 and 711-2 raised and with wrist 711-7 slightly flexed to mimic the pose of user 701, and modifies the visual characteristics of hand 711-1 and wrist 711-7 to indicate uncertainty of the pose, as indicated by the dashed line type of avatar hand 711-1 and avatar wrist 711-7. In some embodiments, device 705 modifies avatar hand 711-1 and wrist 711-7 based on an additional heuristic that is based on both the distance from the user's head 701-3 and flexion of the portion of the user (e.g., user wrist 701-7). In some embodiments, device 705 modifies avatar hand 711-1 and wrist 711-7 based on taking the outputs of the two heuristics (e.g., distance from head and joint flexion) and determining if a separate threshold is met based on the outputs of the separate thresholds.

Additional descriptions regarding FIGS. 7A-7I are provided below in reference to method 800 described with respect to FIGS. 7A-7I.

FIG. 8 is a flow diagram of an exemplary method 800 for modifying a portion of an avatar based on one or more heuristics, in accordance with some embodiments. In some embodiments, method 800 is performed at a computer system (e.g., computer system 101 in FIG. 1, device 702, and/or device 705) (e.g., a smartphone, tablet, laptop, and/or head-mounted display generation component) that is in communication with a display generation component (e.g., display generation component 120 in FIGS. 1, 3, and 4; display 702-1; and/or display 705-1) (e.g., a visual output device, a 3D display, a display having at least a portion that is transparent or translucent on which images can be projected (e.g., a see-through display), a projector, a heads-up display, and/or a display controller). In some embodiments, the computer system is associated with a first user (e.g., the computer system is being operated by the first user (e.g., a user that is in a communication session (e.g., an extended reality and/or video conference) with a user of an external computer system)). In some embodiments, the computer system includes one or more sensors (e.g., 702-2 and/or 705-2) (e.g., a gyroscope, an accelerometer, a motion sensor, a movement sensor, a microphone, an infrared sensor, a camera sensor, a depth camera, a visible light camera, an eye-tracking sensor, a gaze-tracking sensor, a physiological sensor, and/or an image sensor) for obtaining pose data of the first user or another user. In some embodiments, the display generation component is part of the computer system. In some embodiments, the display generation component is part of an external computer system. In some embodiments, the method 800 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 800 are, optionally, combined and/or the order of some operations is, optionally, changed.

In method 800, the computer system (e.g., 702 and/or 705) causes (802) (e.g., via the transmission of data) a representation (e.g., 711) (e.g., an avatar; a virtual avatar (e.g., the avatar is a virtual representation of at least a portion of a first user); in some embodiments, the virtual avatar is displayed, in an extended reality environment, in lieu of the first user)) of a first user (e.g., 701) (e.g., a user in a physical environment (e.g., 700) and/or a user of the computer system) to be displayed, via the display generation component (e.g., 702-1 and/or 705-1), in an extended reality environment (e.g., 710), wherein the representation of the first user includes a representation (e.g., 711-1, 711-2, 711-3, 711-4, 711-5, 711-6, 711-7, 711-8, and/or 711-9) of at least a respective portion (e.g., 701-1, 701-2, 701-3, 701-4, 701-5, 701-6, 701-7, 701-8, and/or 701-9) (e.g., a human body part such as a hand, forearm, upper arm, shoulder, torso, neck, and/or head) of the first user that is displayed in the extended reality environment having a first pose (e.g., physical position, orientation, and/or gesture). In some embodiments, the representation of the first user is represented in the extended reality environment by a rendering (e.g., a virtual avatar) that has anthropomorphic features (e.g., a head, arms, legs, and/or hands). In some embodiments, the representation of the first user is displayed having a same pose of the first user. In some embodiments, the representation of the first user is displayed having a portion that has a same pose as a corresponding portion of the first user. In some embodiments, the representation of the first user is an avatar (e.g., virtual avatar) that changes pose in response to a detected change in pose of at least a portion of the first user in the physical environment. For example, the avatar is displayed in the extended reality environment as an animated character that mimics the detected movements of the first user in the physical environment.

The computer system (e.g., 702 and/or 705) receives (804) (in some embodiments, detects) first data (e.g., depth data, image data, pose data, and/or sensor data (e.g., image data from a camera (e.g., 702-2 and/or 705-2))) that includes data indicating a change in pose (e.g., physical position, orientation, gesture, and/or movement) of the first user (e.g., 701) (e.g., a change, in the physical environment, in the pose of the first user) from the first pose to a second pose (e.g., a change from a pose in any of FIGS. 7A-7I to any other poses shown in any of FIGS. 7A-7I). In some embodiments, the first data includes sensor data (e.g., image data from a camera, movement data from an accelerometer, location data from a GPS sensor, data from a proximity sensor, and/or data from a wearable device (e.g., a watch and/or a headset device)). In some embodiments, the sensor can be connected to, or integrated with, the computer system. In some embodiments, the sensor can be an external sensor (e.g., a sensor of a different computer system (e.g., another user's electronic device)). In some embodiments, the first data includes a certainty value indicating a measure of certainty (e.g., confidence) that the determined pose of the user, and/or a portion of the user, is accurate (e.g., an accurate representation of the pose of the user and/or portion of the user in the real environment). In some embodiments, the computer system receives or detects the first data from one or more sensors (e.g., 702-2 and/or 705-2) for detecting the pose of the first user. In some embodiments, the computer system is a transmitting device (in some embodiments, device 702) that detects the pose of the first user and transmits instructions to an external computer system (e.g., a recipient device) (in some embodiments, device 705) for causing the representation of the first user to be displayed, updated, and/or modified (e.g., at the recipient device) in a particular manner. In some embodiments, the computer system causes the representation of the first user to be displayed, updated, and/or modified at the computer system. In some embodiments, the computer system is a receiving device (in some embodiments, device 705) that receives the first data from an external computer system (e.g., a separate computer system) (in some embodiments, device 702) that generated and/or transmitted the first data to the computer system. For example, the external computer system is a transmitting device that detects the pose of the first user and then transmits instructions to the computer system for displaying, updating, and/or modifying the representation of the first user. In some embodiments, the computer system is referred to as a receiving device or recipient device. In some embodiments, the computer system is referred to as a sending device or transmitting device. In some embodiments, the computer system is a server for sending and/or receiving the first data.

In response to receiving the first data, the computer system (e.g., 702 and/or 705) causes (806) an appearance of the representation (e.g., 711) of the first user (e.g., 701) in the extended reality environment (e.g., 710) to be updated (e.g., based on at least a portion of the first data). Causing the appearance of the representation of the first user in the extended reality environment to be updated includes changing a pose of the representation of the first user based on a change in pose of one or more corresponding portions (e.g., 701-1, 701-2, 701-3, 701-4, 701-5, 701-6, 701-7, 701-8, and/or 701-9) of the first user, including the following steps of method 800.

In accordance with a determination (e.g., a determination that is made at a recipient device and/or a sending device) that the change in pose of a first portion (e.g., 701-1, 701-2, 701-3, 701-4, 701-5, 701-6, 701-7, 701-8, and/or 701-9) of the first user (e.g., 701) (e.g., a hand, one or more fingers, forearm, elbow, and/or shoulder) meets respective criteria (e.g., criteria for displaying and/or changing an appearance of the portion of the representation of the first user) based on a first property (e.g., movement speed, location, and/or positioning of the first portion of the first user) of the pose of the first portion of the first user meeting a first set of one or more conditions based on the first property (e.g., without regard to whether or not a second, different, property of the pose of the corresponding portion of the user meets a second set of one or more conditions based on a second property), the computer system (e.g., 702 and/or 705) changes (808) an appearance of a portion (e.g., 711-1, 711-2, 711-3, 711-4, 711-5, 711-6, 711-7, 711-8, and/or 711-9) of the representation (e.g., 711) of the first user, that corresponds to the first portion of the first user, in a first manner (e.g., a change that is different from changing a location of the portion of the representation of the user such as changing a visual characteristic (e.g., saturation, blur, and/or opacity) of the portion of the representation of the user or ceasing to display the portion of the representation of the user).

In accordance with a determination (e.g., a determination that is made at a recipient device and/or a sending device) that the change in pose of the first portion (e.g., 701-1, 701-2, 701-3, 701-4, 701-5, 701-6, 701-7, 701-8, and/or 701-9) of the first user (e.g., 701) meets the respective criteria based on a second property (e.g., occlusion of the first portion of the first user and/or a property of the pose that is different from the first property) of the pose of the first portion of the first user meeting a second set of one or more conditions (e.g., without regard to whether or not the first property of the pose of the corresponding portion of the user meets the first set of one or more conditions based on the first property), the computer system (e.g., 702 and/or 705) changes (810) an appearance of the portion (e.g., 711-1, 711-2, 711-3, 711-4, 711-5, 711-6, 711-7, 711-8, and/or 711-9) of the representation (e.g., 711) of the first user in the first manner (e.g., a change that is different from changing a location of the portion of the representation of the user such as changing a visual characteristic (e.g., saturation, blur, and/or opacity) of the portion of the representation of the user or ceasing to display the portion of the representation of the user), wherein the second property of the pose of the first portion of the first user is different from the first property of the pose of the first portion of the first user. Changing the appearance of the portion of the representation of the first user in the first manner when the change in pose of the first portion of the first user meets respective criteria based on a first property of the pose of the first portion of the first user meeting the first set of one or more conditions based on the first property, and changing the appearance of the portion of the representation of the first user in the first manner when the change in pose of the first portion of the first user meets the respective criteria based on a second property of the pose of the first portion meeting a second set of one or more conditions, provides feedback about a state of the computer system (e.g., a state in which tracking of the first portion of the first user is likely to be lost or degraded). In some embodiments, the second set of one or more conditions is different from the first set of one or more conditions.

In accordance with a determination (e.g., a determination that is made at a recipient device and/or a sending device) that the change in pose of the first portion (e.g., 701-1, 701-2, 701-3, 701-4, 701-5, 701-6, 701-7, 701-8, and/or 701-9) of the first user (e.g., 701) does not meet the respective criteria, the computer system (e.g., 702 and/or 705) forgoes (812) changing an appearance of the portion (e.g., 711-1, 711-2, 711-3, 711-4, 711-5, 711-6, 711-7, 711-8, and/or 711-9) of the representation (e.g., 711) of the first user in the first manner (e.g., maintaining display of the portion of the representation of the user or changing an appearance the portion of the representation of the user in a second manner that is different from the first manner).

In some embodiments, the first and/or second set of one or more conditions includes a set of heuristics. In some embodiments, the set of heuristics includes one or more of: a determination of whether the first portion of the first user (e.g., 701) overlaps a second portion of the first user by a particular amount in the second pose, a determination of whether the respective portion has a particular location relative to a field-of-view (e.g., 704) (e.g., a field-of-view of the first user, a user of the computer system, a sensor (e.g., camera) of the external computer system, and/or a sensor of the computer system) in the second pose, a determination of whether the first portion of the first user has a particular location relative to another portion of the first user (e.g., the first user's head and/or the first user's neck) in the second pose, a determination of whether the first portion of the first user is flexed by a particular amount and/or angle in the second pose, a determination of whether the first portion of the first user has a particular orientation and/or pose in the second pose, a determination of whether the first portion of the first user has a particular orientation relative to another portion of the first user in the second pose, and a determination of whether the first portion of the first user has moved by a particular amount and/or velocity when moving to the second pose.

In some embodiments, the representation of the first portion of the first user is displayed in the extended reality environment (e.g., 710) having a visual characteristic (e.g., a set of one or more visual parameters of the rendering of the first portion of the first user; an amount or state of blurriness, opacity, color, visual smoothing, attenuation, density, and/or resolution) that can have one or more states (e.g., a state that corresponds to a less blurred or non-blurred appearance of the first portion of the first user and/or a state that corresponds to a less translucent or fully opaque appearance of the first portion of the first user). In some embodiments, changing the appearance of the portion of the representation of the first user in the first manner includes changing a state of the visual characteristic. In some embodiments, the state of the visual characteristic is indicated by (e.g., corresponds to, is associated with, and/or includes) a value for the visual characteristic. For example, a first state for the visual characteristic corresponds to a value in a first range (e.g., a range of 0-0.25, 0-0.3, 0-0.4, 0-0.48, 0-0.5, or 0-0.52), a second state for the visual characteristic corresponds to a value in a second range (e.g., a range of 0.25-0.7, 0.4-0.8, 0.48-0.9, or 0.5-0.9), and a third state for the visual characteristic corresponds to a value in a third range (e.g., a range of 0.7-1.0, 0.75-1.0, 0.8-1.0, or 0.9-1.0).

In some embodiments, the visual characteristic varies based on the certainty (e.g., confidence) of the pose of the portion of the user. In some embodiments, the certainty of the pose of the portion of the user is determined using a set of heuristics. In some embodiments, the certainty of the pose of the portion of the user is represented as a certainty value (e.g., a value representing a certainty (confidence) that the determined pose of the portion of the user is an accurate representation of the actual (e.g., in the real environment) pose of the portion of the user). In some embodiments, the certainty value is represented using a range of values, for example, a percentage range from 0% to 100%, where 0% indicates that there is no (e.g., minimum) certainty that the pose of a respective user feature (or portion thereof) is accurate and 100% indicates complete (e.g., maximum) certainty that the pose of the respective user feature is accurate. In some embodiments, the certainty may be 0% when the computer system (e.g., 702 and/or 705) (or another processing device) does not have sufficient useful data from which to deduce a potential location or pose of the respective user feature (e.g., 701-1, 701-2, 701-3, 701-4, 701-5, 701-6, 701-7, 701-8, and/or 701-9). For example, the respective user feature may not be within the field-of-view (e.g., 704) of an image sensor (e.g., 702-2 and/or 705-2) and the respective user feature is equally likely to be in any one of a number of different locations or poses. Or for example, data produced using a proximity sensor (or some other sensor) is indefinite or otherwise insufficient for accurately deducing the pose of the respective user feature. In some embodiments, the certainty may be 100% when the computer system (or another processing device) can unambiguously identify the respective user feature using the pose data and can determine the correct position of the respective user feature using the pose data. In some embodiments, the visual characteristic correlates directly to the certainty of the pose of the portion of the user. For example, the respective avatar feature (e.g., 711-1, 711-2, 711-3, 711-4, 711-5, 711-6, 711-7, 711-8, and/or 711-9) can be rendered with the visual characteristic having a first value (e.g., a low value) in order to convey (e.g., to a viewer) a first certainty (e.g., low certainty) in the pose of the portion of the user. Conversely, the respective avatar feature can be rendered with the visual characteristic having a second value greater than the first value (e.g., a high value) to convey a greater certainty (e.g., high certainty) in the pose of the portion of the user. In some embodiments, the visual characteristic does not correlate directly to the certainty (e.g., certainty value) of the pose of the portion of the user. For example, if the certainty of the pose of the portion of the user is expected or anticipated to decrease (e.g., tracking of the portion of the user expected to be lost or inhibited), the corresponding avatar feature can be rendered with the visual characteristic having a value that corresponds to low certainty, even if there is currently high certainty in the pose of the portion of the user. This may be done, for example, to smoothly transition the appearance of the portion of the avatar to avoid unnatural poses of the avatar feature that may result from inaccurate or incomplete pose detection of the corresponding portion of the user.

In some embodiments, causing the appearance of the representation (e.g., 711) of the first user (e.g., 701) in the extended reality environment (e.g., 710) to be updated includes the following. In accordance with a determination that the change in pose of the first portion (e.g., 701-1, 701-2, 701-3, 701-4, 701-5, 701-6, 701-7, 701-8, and/or 701-9) of the first user meets the respective criteria based on a change in the first property that does not meet the first set of one or more conditions (e.g., user hand 701-1 does not trigger the heuristic in FIG. 7G) (e.g., the change in pose, by itself (without considering other factors), does not meet a threshold associated with the first set of one or more conditions for changing the appearance of the portion of the representation of the first user in the first manner) and a change in the second property that does not meet the second set of one or more conditions (e.g., user hand 701-1 and wrist 701-7 do not trigger the heuristic in FIG. 7H) (e.g., the change in pose, by itself (without considering other factors), does not meet a threshold associated with the second set of one or more conditions for changing the appearance of the portion of the representation of the first user in the first manner), changing an appearance of the portion of the representation of the first user in the first manner (e.g., avatar hand 711-1 and avatar wrist 711-7 are shown having the changed appearance in FIG. 7I). Changing the appearance of the portion of the representation of the first user in the first manner when the change in pose of the first portion of the first user meets respective criteria based on a change in the first property that does not meet the first set of one or more conditions and a change in the second property that does not meet the second set of one or more conditions provides feedback about a state of the computer system (e.g., a state in which tracking of the first portion of the first user is likely to be lost or degraded based on multiple heuristics).

In some embodiments, inputs from multiple heuristics that do not individually trigger a change in an appearance of the portion of the avatar (e.g., 711-1, 711-2, 711-3, 711-4, 711-5, 711-6, 711-7, 711-8, and/or 711-9) in the first manner can, collectively, meet a threshold for changing the appearance of the portion of the avatar in the first manner. For example, the change in pose may include a hand (e.g., 701-1 and/or 701-2) positioning that is not close enough to the user's head (e.g., 701-3) to meet a positioning threshold for blurring the avatar's hand (e.g., 711-1 and/or 711-2) (e.g., as shown in FIG. 7G), and a slight flexing of the user's wrist (e.g., 701-7) that is not flexed enough to meet a flexing threshold for blurring the avatar's hand (e.g., as shown in FIG. 7H), but the combination of the positioning of hand near that user's head with the slight flexing of the wrist meets a collective threshold that is sufficient to blur the avatar's hand (e.g., as shown in FIG. 7I).

In some embodiments, the combination of the heuristics can be used to change more than one portion of the avatar in the first manner. For example, the change in pose may include a left hand (e.g., 701-2) positioning that is not close enough to the user's head (e.g., 701-3) to meet a threshold for blurring the avatar's left hand (e.g., 711-2) (e.g., as shown in FIG. 7G), and a flexing of the user's right wrist (e.g., 701-7) that is not flexed enough to meet a threshold for blurring the avatar's right hand (e.g., 711-1) (e.g., as shown in FIG. 7H), but the combination of the positioning of the two hands meets a combined threshold that, when reached, is sufficient to blur the avatar's right and left hands.

In some embodiments, the first set of one or more conditions (or the second set of one or more conditions) is met based on overlap (e.g., overlap as detected from a respective perspective and/or angle (e.g., the perspective of a camera of the computer system, a sensor, and/or the user) and/or an anticipated overlap based on a relative position of the first portion of the first user (e.g., 701) with respect to the second portion of the first user and/or an angular distance between the respective portion and the second portion) of the first portion (e.g., 701-1 or 701-2) of the first user (e.g., 701) with a second portion (e.g., 701-2 or 701-1) (e.g., a hand, an arm, a torso, a head, and/or a portion of the first user that is different from the first portion of the first user) of the first user (e.g., from the perspective of the computer system (e.g., 702 and/or 705), a sensor (e.g., 702-2 and/or 705-2), and/or a user (e.g., 701)). Changing the appearance of the portion of the representation of the first user in the first manner when the change in pose of the first portion of the first user meets respective criteria based on overlap of the first portion of the first user with a second portion of the first user provides feedback about a state of the computer system (e.g., a state in which tracking of the first portion of the first user is likely to be lost or degraded due to the overlap of the user's body parts).

In some embodiments, the first set of one or more conditions is not met when the first portion (e.g., 701-1 or 701-2) of the first user (e.g., 701) and the second portion (e.g., 701-2 or 701-1) of the first user have less than a threshold amount of overlap (e.g., 0 cm of overlap, 0.5 cm of overlap, 1 cm of overlap, or 2 cm of overlap) as detected from a respective perspective and/or angle, and the appearance of the portion (e.g., 711-1 and/or 711-2) of the avatar (e.g., 711) is not changed in the first manner (e.g., the avatar hand is not faded, blurred, and/or desaturated). In some embodiments, the first set of one or more conditions is met when the first portion of the first user and the second portion of the first user have at least the threshold amount of overlap, and the appearance of the portion of the avatar is changed in the first manner. In some embodiments, the first set of one or more conditions is not met when the first portion of the first user and the second portion of the first user have an angular distance that is greater than a first threshold angular distance (e.g., 12°, 15°, 18°, or greater), and the appearance of the portion of the avatar is not changed in the first manner (e.g., the avatar hand is not faded, blurred, and/or desaturated). In some embodiments, the first set of one or more conditions is met when the angular distance is less than the first threshold angular distance, and the appearance of the portion of the avatar is changed in the first manner (e.g., the avatar hand is faded, blurred, and/or desaturated). In some embodiments, the amount by which the appearance is changed in the first manner is determined based on the angular distance of the respective portion and the second portion of the first user (e.g., as indicated in graph 740). For example, when the user's hands have 11°, 10°, 9°, 7°, 5°, 4°, 2°, or 1° angular distance, the computer system begins to change the appearance in the first manner (e.g., slightly fading, blurring, and/or desaturating the avatar hand). As the angular distance decreases, the amount of fading, blurring, and/or desaturation increases. When the hands have less than a threshold angular distance (e.g., less than 1° or at 0° angular distance) the computer system displays the hands with a high amount (e.g., more than a threshold amount such as 50%, 70%, 75%, 80%, 85%, 90%, 95%, 98%, or 99%) of fading, blurring, and/or desaturation or does not display the hands. In some embodiments, the angular distance between two objects is determined from a perspective from a predetermined reference point such as a center of a camera (e.g., 702-2 and/or 705-2) and/or sensor field-of-view and/or from a perspective of the user's eyes. In some embodiments, the angular distance between two objects is determined relative to a predetermined reference line such as a reference line that originates from or is co-located with the predetermined reference point.

In some embodiments, the first set of one or more conditions (or the second set of one or more conditions) is met based on a detected location of the first portion (e.g., 701-1, 701-2, 701-3, 701-4, 701-5, 701-6, 701-7, 701-8, and/or 701-9) of the first user (e.g., 701) within a field-of-view (e.g., 704) (e.g., a field-of-view of a camera, a sensor, and/or a user) (e.g., as shown in FIG. 7A). Changing the appearance of the portion of the representation of the first user in the first manner when the change in pose of the first portion of the first user meets respective criteria based on a detected location of the first portion of the first user within a field-of-view provides feedback about a state of the computer system (e.g., a state in which tracking of the first portion of the first user is likely to be lost or degraded due to movement of the first portion of the user outside of a field-of-view).

In some embodiments, the field-of-view (e.g., 704) is a field-of-view of a sensor or camera (e.g., 702-2 and/or 705-2) used to detect the position of the first user (e.g., 701). In some embodiments, the field-of-view is a field-of-view of a respective user (e.g., 701) (e.g., the first user or a user viewing the representation of the first user). In some embodiments, the first set of one or more conditions is not met when the first portion (e.g., 701-1, 701-2, 701-3, 701-4, 701-5, 701-6, 701-7, 701-8, and/or 701-9) of the first user is not detected within a region of the field-of-view (e.g., a region that is at least 30°, 32°, or 35° from center), and the appearance of the portion of the avatar is not changed in the first manner (e.g., the avatar hand is not faded, blurred, and/or desaturated). In some embodiments, the first set of one or more conditions is met when the first portion of the first user is detected within the region of the field-of-view, appearance of the portion of the avatar is changed in the first manner (e.g., the avatar hand is faded, blurred, and/or desaturated). In some embodiments, the amount by which the appearance of the portion of the representation of the first user is changed in the first manner is determined based on the location of the first portion of the first user within the field-of-view (e.g., as indicated in graph 720). For example, when the first portion of the first user is located less than 30° from a center point of the field-of-view, the computer system does not change the appearance of the portion of the representation of the first user in the first manner. When the first portion of the first user is located at around 30° from center, the computer system begins to change the appearance of the portion of the representation of the first user (e.g., slightly fading, blurring, and/or desaturating the avatar hand). As the first portion of the first user moves farther from the center of the field-of-view, the computer system increases the amount of blurring, fading, and/or desaturation. In some embodiments, when the first portion of the first user reaches a threshold distance from the center of the field-of-view, the computer system displays the portion of the representation of the first user having a high amount (e.g., more than a threshold amount such as 50%, 70%, 75%, 80%, 85%, 90%, 95%, 98%, or 99%) of blurring, fading, and/or desaturation or does not display the portion of the representation of the first user.

In some embodiments, the first set of one or more conditions (or the second set of one or more conditions) is met based on a location of the first portion (e.g., 701-1, 701-2, 701-3, 701-4, 701-5, 701-6, 701-7, 701-8, and/or 701-9) of the first user (e.g., 701) relative to the first user's head (e.g., 701-3) (e.g., as shown in FIG. 7B). Changing the appearance of the portion of the representation of the first user in the first manner when the change in pose of the first portion of the first user meets respective criteria based on a location of the first portion of the first user relative to the first user's head provides feedback about a state of the computer system (e.g., a state in which tracking of the first portion of the first user is likely to be lost or degraded due to placement of the respective portion near the user's head).

In some embodiments, the first set of one or more conditions is not met when the first portion (e.g., 701-1, 701-2, 701-3, 701-4, 701-5, 701-6, 701-7, 701-8, and/or 701-9) of the first user (e.g., 701) is not within a threshold distance from the first user's head (e.g., 701-3) (e.g., 0.4 m, 0.3 m, or 0.25 m), and the appearance of the portion of the avatar is not changed in the first manner (e.g., the avatar hand is not faded, blurred, and/or desaturated). In some embodiments, the first set of one or more conditions is met when the first portion (e.g., 701-1 and/or 701-2) of the first user is within the threshold distance from the first user's head, and the appearance of the portion of the avatar (e.g., 711-1 and/or 711-2) is changed in the first manner (e.g., the avatar hand is faded, blurred, and/or desaturated). In some embodiments, the amount by which the appearance is changed in the first manner is determined based on the distance of the first portion of the first user from the first user's head (e.g., as indicated by graph 725). For example, when the user's hand is 0.27 m, 0.26 m, 0.25 m, or 0.24 m from the user's head, the computer system begins to change the appearance in the first manner (e.g., slightly fading, blurring, and/or desaturating the avatar hand). As the distance of the user's hand from the user's head decreases, the amount of fading, blurring, and/or desaturation increases. When the user's hand is less than a threshold distance from the user's head (e.g., less than 0.2 m, 0.8 m, or 0.6 m) the computer system displays the avatar hand with a high amount (e.g., more than a threshold amount such as 50%, 70%, 75%, 80%, 85%, 90%, 95%, 98%, or 99%) of fading, blurring, and/or desaturation or does not display the avatar hand.

In some embodiments, the first set of one or more conditions (or the second set of one or more conditions) is met based on an angle of flexion of the first portion (e.g., 701-1 and/or 701-7) (e.g., the first portion of the first user is a joint such as a wrist, elbow, ankle, and/or arm socket) of the first user (e.g., 701) relative to a predetermined reference line (e.g., a line-of-sight of a camera (e.g., 702-2 and/or 705-2) and/or sensor of the computer system and/or a user) (e.g., as shown in FIG. 7D). Changing the appearance of the portion of the representation of the first user in the first manner when the change in pose of the first portion of the first user meets respective criteria based on an angle of flexion of the first portion of the first user relative to a predetermined reference line provides feedback about a state of the computer system (e.g., a state in which tracking of the first portion of the first user is likely to be lost or degraded due to the angle of flexion at the user's joint relative to the predetermined reference line).

In some embodiments, the first set of one or more conditions is not met when the angle of flexion of the first portion (e.g., 701-1, 701-2, and/or 701-7) of the first user (e.g., 701) is greater than a threshold angle (e.g., 45°, 40°, 30°, 25°, or 20°) relative to the predetermined reference line, and the appearance of the portion (e.g., 711-1, 711-2, and/or 711-7) of the avatar (e.g., 711) is not changed in the first manner (e.g., the avatar hand is not faded, blurred, and/or desaturated). In some embodiments, the first set of one or more conditions is met when the angle of flexion of the first portion of the first user is less than the threshold angle relative to the predetermined reference line, and the appearance of the portion of the avatar is changed in the first manner (e.g., the avatar hand is faded, blurred, and/or desaturated). In some embodiments, the amount by which the appearance is changed in the first manner is determined based on the angle of flexion of the first portion of the first user relative to the predetermined reference line (e.g., as indicated by graph 730). For example, when the user's wrist is flexed at 44°, 29°, or 23° with respect to the predetermined reference line, the computer system begins to change the appearance in the first manner (e.g., slightly fading, blurring, and/or desaturating the avatar hand). As the angle of flexion of the first portion decreases with respect to the predetermined reference line, the amount of fading, blurring, and/or desaturation increases. For example, when the user's wrist is less than a threshold angle of flexion (e.g., less than 20°, 18°, or 16°) relative to the reference line, the computer system displays the avatar hand with a high amount (e.g., more than a threshold amount such as 50%, 70%, 75%, 80%, 85%, 90%, 95%, 98%, or 99%) of fading, blurring, and/or desaturation or does not display the avatar hand.

In some embodiments, the predetermined reference line is based on (e.g., anchored to, originates from, and/or includes) a reference point (e.g., a predetermined reference point (e.g., the center of the field-of-view (e.g., 704) of a camera, sensor, and/or a user)). In some embodiments, the angle of flexion is determined or measured relative to a predetermined reference line that is based on a reference point (e.g., 704-1) within the field-of-view (e.g., 704) of a camera (e.g., 702-2 and/or 705-2) or sensor used to determine the position of the first portion (e.g., 701-1 and/or 701-7) of the first user (e.g., 701). In some embodiments, the angle of flexion is not an angle of the first portion of the first user relative to another body part of the user (e.g., not an angle of wrist flex relative to the user's forearm or an angle of elbow flex relative to the user's upper arm or forearm). In some embodiments, the angle of flexion is 90° when the user's wrist is located at or near the center (e.g., 704-1) of the field-of-view (e.g., 704)

of a camera or sensor and the user's hand (e.g., 701-1 or 701-2) is positioned vertically. In some embodiments, the angle of flexion is 0° when the user's wrist is located at or near the center of the field-of-view of the camera or sensor and the user's hand is positioned horizontally (e.g., facing away from or towards the reference point). In some embodiments, the angle is an angle along the z-axis relative to the reference point. For example, as a user's wrist flexes along the z-axis relative to the reference point, the user's hand and/or fingers becomes more difficult to localize due to the flexed position of the wrist and/or due to being blocked by other parts of the user's body (e.g., forearm, wrist, and/or shoulder). In some embodiments, the reference point is a location along the predetermined reference line.

In some embodiments, the first portion of the first user (e.g., 701) includes a joint (e.g., 701-7) of the first user (e.g., the first portion of the first user is a wrist, elbow, ankle, and/or arm socket), and the first set of one or more conditions (or the second set of one or more conditions) is met based on an amount of flexion at the joint of the first user (e.g., an amount of flexion relative to another portion of the user's body and/or without regard for a particular perspective of the flexion from a predetermined reference point or reference line) (e.g., as shown in FIG. 7D). Changing the appearance of the portion of the representation of the first user in the first manner when the first portion of the first user is a joint and the change in pose of the first portion of the first user meets respective criteria based on an amount of flexion at the joint of the first user provides feedback about a state of the computer system (e.g., a state in which tracking of the first portion of the first user is likely to be lost or degraded due to the amount of flexion at the joint of the user's body).

In some embodiments, the first portion (e.g., 701-1) of the first user (e.g., 701) includes the joint (e.g., 701-7). In some embodiments, the joint connects the first portion (e.g., 701-1) (e.g., a hand) to another portion of the user (e.g., 701-5) (e.g., a forearm). In some embodiments, the first set of one or more conditions is not met when the amount of flexion at the second joint of the first user (e.g., 701) is greater than a threshold angle of flexion (e.g., 20°, 18°, 15°, 12°, or 10° relative to another portion of the first user), and the appearance of the portion of the avatar is not changed in the first manner (e.g., the avatar hand is not faded, blurred, and/or desaturated). In some embodiments, the first set of one or more conditions is met when the amount of flexion at the second joint of the first user is less than the threshold angle of flexion, and the appearance of the portion of the avatar is changed in the first manner (e.g., the avatar hand is faded, blurred, and/or desaturated). In some embodiments, the amount by which the appearance is changed in the first manner is determined based on the amount of flexion of the first portion of the first user (when the respective portion is a joint) (e.g., as indicated by graph 730). For example, when the user's wrist is flexed at 48°, 45°, or 42°, the computer system begins to change the appearance in the first manner (e.g., slightly fading, blurring, and/or desaturating the avatar hand). As the amount of flexion at the joint decreases, the amount of fading, blurring, and/or desaturation increases. When the user's wrist is less than a threshold amount of flexion (e.g., less than 30°, 28°, or 25°) the computer system displays the avatar hand with a high amount (e.g., more than a threshold amount such as 50%, 70%, 75%, 80%, 85%, 90%, 95%, 98%, or 99%) of fading, blurring, and/or desaturation or does not display the avatar hand.

In some embodiments, the first set of one or more conditions (or the second set of one or more conditions) is met based on an orientation (e.g., position, pose, and/or location) of the first portion (e.g., 701-1, 701-2, 701-3, 701-4, 701-5, 701-6, 701-7, 701-8, and/or 701-9) of the first user (e.g., 701) (e.g., relative to a field-of-view of a camera, sensor, and/or user). Changing the appearance of the portion of the representation of the first user in the first manner when the change in pose of the first portion of the first user meets respective criteria based on an orientation of the first portion of the first user provides feedback about a state of the computer system (e.g., a state in which tracking of the first portion of the first user is likely to be lost or degraded due to the orientation of the user's body part).

In some embodiments, the first set of one or more conditions is not met when the first portion (e.g., 701-1, 701-2, 701-3, 701-4, 701-5, 701-6, 701-7, 701-8, and/or 701-9) of the first user (e.g., 701) does not have a particular orientation (e.g., the first portion of the first user is positioned in front of the user, has a natural pose, does not have a particular pose, and/or is not obstructed by an object or other body part), and the appearance of the portion of the avatar (e.g., 711) is not changed in the first manner (e.g., the avatar hand is not faded, blurred, and/or desaturated). In some embodiments, the first set of one or more conditions is met when the first portion of the first user has a particular orientation (e.g., the first portion of the first user is not in front of the first user, has an unnatural pose, has a predefined pose, has an amount of movement, and/or is obstructed by an object or other body part), and the appearance of the portion of the avatar is changed in the first manner (e.g., the avatar hand is faded, blurred, and/or desaturated).

In some embodiments, the first set of one or more conditions (or the second set of one or more conditions) is met based on a detected orientation (e.g., position, pose, and/or location) of the first portion (e.g., 701-1, 701-2, 701-3, 701-4, 701-5, 701-6, 701-7, 701-8, and/or 701-9) of the first user (e.g., 701) relative to a third portion of the first user (e.g., a hand, an arm, a torso, a head, and/or a portion of the first user that is different from the first portion of the first user). Changing the appearance of the portion of the representation of the first user in the first manner when the change in pose of the first portion of the first user meets respective criteria based on a detected orientation of the first portion of the first user relative to a third portion of the first user provides feedback about a state of the computer system (e.g., a state in which tracking of the first portion of the first user is likely to be lost or degraded due to the orientation of the user's body parts).

In some embodiments, the first set of one or more conditions is not met when the first portion (e.g., 701-1, 701-2, 701-3, 701-4, 701-5, 701-6, 701-7, 701-8, and/or 701-9) of the first user (e.g., 701) does not have a particular orientation relative to another portion of the first user (e.g., the first portion of the first user is positioned in front of the user, is not adjacent another portion of the user, does not have a particular pose or positioning with another portion of the user, and/or is not obstructed by an object or other body part), and the appearance of the portion of the avatar (e.g., 711) is not changed in the first manner (e.g., the avatar hand is not faded, blurred, and/or desaturated). In some embodiments, the first set of one or more conditions is met when the first portion of the first user has a particular orientation relative to another portion of the first user, and the appearance of the portion of the avatar is changed in the first manner (e.g., the avatar hand is faded, blurred, and/or desaturated). For example, the first set of one or more conditions is met when the user's hands are positioned a particular distance from one another and/or having a particular pose (e.g., clapping and/or praying). In some embodiments, the amount by which the appearance is changed in the first manner is determined based on the orientation of the respective portion relative to the third portion of the first user. For example, when the user's hands are positioned with palms facing together, and less than a threshold distance from each other (e.g., 0.1 m, 0.09 m, or 0.08 m), the computer system begins to change the appearance in the first manner (e.g., slightly fading, blurring, and/or desaturating the avatar hand). As the spacing between the hands decreases (and/or the hands move to another pose that triggers the changed appearance), the amount of fading, blurring, and/or desaturation increases (e.g., as indicated by graph 735). For example, when the hands are less than a threshold distance apart (e.g., 0.06 m, 0.05 m, 0.04 m) the computer system displays the avatar hand with a high amount (e.g., more than a threshold amount such as 50%, 70%, 75%, 80%, 85%, 90%, 95%, 98%, or 99%) of fading, blurring, and/or desaturation or does not display the avatar hand.

In some embodiments, the first set of one or more conditions (or the second set of one or more conditions) is met based on movement (e.g., 714-1, 714-2, and/or 714-3) (e.g., magnitude, speed, and/or direction of movement and/or a change in magnitude, speed, and/or direction of movement) of the first portion (e.g., 701-1, 701-2, 701-3, 701-4, 701-5, 701-6, 701-7, 701-8, and/or 701-9) of the first user (e.g., 701) (e.g., relative to a different portion of the first user and/or relative to a field-of-view of a camera, sensor, and/or user). Changing the appearance of the portion of the representation of the first user in the first manner when the change in pose of the first portion of the first user meets respective criteria based on movement of the first portion of the first user provides feedback about a state of the computer system (e.g., a state in which tracking of the first portion of the first user is likely to be lost or degraded due to movement of the user's body part). In some embodiments, the first set of one or more conditions is not met when the movement of the first portion of the first user (e.g., 701) does not meet a movement threshold (e.g., a threshold magnitude, speed, and/or direction of movement and/or a threshold change in the magnitude, speed, and/or direction of the movement), and the appearance of the portion of the avatar is not changed in the first manner (e.g., the avatar hand is not faded, blurred, and/or desaturated). In some embodiments, the first set of one or more conditions is met when the movement of the first portion of the first user meets the movement threshold, and the appearance of the portion of the avatar is changed in the first manner (e.g., the avatar hand is faded, blurred, and/or desaturated). In some embodiments, the amount by which the appearance is changed in the first manner is determined based on the movement of the first portion of the first user.

In some embodiments, the first set of one or more conditions (or the second set of one or more conditions) is met based on the movement (e.g., 714-1, 714-2, and/or 714-3) and a detected location of the first portion (e.g., 701-2 and/or 701-6) of the first user (e.g., 701) (e.g., as shown in FIG. 7C). Changing the appearance of the portion of the representation of the first user in the first manner when the change in pose of the first portion of the first user meets respective criteria based on movement and a detected location of the first portion of the first user provides feedback about a state of the computer system (e.g., a state in which tracking of the first portion of the first user is likely to be lost or degraded due to movement and a location of the user's body part).

In some embodiments, the first set of one or more conditions is not met when the movement (e.g., 714-1, 714-2, and/or 714-3) of the first portion (e.g., 701-1, 701-2, 701-3, 701-4, 701-5, 701-6, 701-7, 701-8, and/or 701-9) of the first user (e.g., 701) does not meet a movement threshold and/or the first portion of the first user does not meet a set of location criteria (e.g., having a predetermined pose, orientation, position, location, and/or elevation (e.g., in the camera field-of-view and/or a sensor field-of-view)), and the appearance of the portion of the avatar (e.g., 711) is not changed in the first manner (e.g., the avatar hand is not faded, blurred, and/or desaturated). In some embodiments, the first set of one or more conditions is met when the movement of the first portion of the first user meets the movement threshold and the first portion of the first user meets the set of location criteria, and the appearance of the portion of the avatar is changed in the first manner (e.g., the avatar hand is faded, blurred, and/or desaturated). In some embodiments, the amount by which the appearance is changed in the first manner is determined based on the movement of the first portion of the first user and/or the first portion of the first user having a set of location characteristics. For example, in some embodiments, the computer system changes the appearance of the portion of the avatar in the first manner when the first portion of the first user (e.g., a user's hand) is not located near the user's head or face and is moving less than a threshold amount (e.g., not moving or slightly moving), but does not change the appearance in the first manner when the user's hand is moving less than the threshold amount and is positioned within a threshold distance from (e.g., near or at) the user's face and/or head. In some embodiments, the computer system changes the appearance of the portion of the avatar in the first manner when the user's hand is moving less than the threshold amount and is located near or below the user's waist.

In some embodiments, the portion (e.g., 711-1, 711-2, 711-3, 711-4, 711-5, 711-6, 711-7, 711-8, and/or 711-9) of the representation (e.g., 711) of the first user (e.g., 701) is displayed in the extended reality environment (e.g., 710) having a first amount of opacity (e.g., a high amount of opacity such as 100%, 99%, 98%, 97%, 95%, 90%, 85%, 80%, 75%, 70%, 65%, or 60% opacity or a low amount of opacity such as 1%, 2%, 5%, 10%, 15%, 25%, 40%, or 50% opacity) while having the first pose, and changing an appearance of the portion of the representation of the first user in the first manner includes the computer system (e.g., 702 and/or 705) changing (e.g., increasing or decreasing) an amount of opacity of the portion of the representation of the first user from the first amount of opacity (e.g., as shown for avatar hand 711-2 in FIG. 7C) to a second amount of opacity different from the first amount of opacity (e.g., as shown for avatar hand 711-2 in FIG. 7D) (e.g., displaying the representation of the first user having less opacity than the first amount (e.g., 50%, 40%, 25%, 15%, 10%, 5%, 2%, 1% opacity, or less) or ceasing to display the representation of the first user) (e.g., displaying the representation of the first user having greater opacity than the first amount (e.g., 100%, 99%, 98%, 97%, 95%, 90%, 85%, 80%, 75%, 70%, 65%, or 60% opacity)). Changing an amount of opacity of the portion of the representation of the first user provides feedback about a state of the computer system (e.g., a state in which tracking of the first portion of the first user has failed or is likely to be lost or degraded).

In some embodiments, the portion of the representation (e.g., 711) of the first user (e.g., 701) is displayed in the extended reality environment (e.g., 710) having a first amount of blur (e.g., a high amount of a blurring or other effect that obscures the displayed appearance of the first portion of the representation of the first user such as 100%, 99%, 98%, 97%, 95%, 90%, 85%, 80%, 75%, 70%, 65%, or 60% blur, or a low amount of a blurring or other obscuring effect such as 1%, 2%, 5%, 10%, 15%, 25%, 40%, or 50% blur) while having the first pose, and changing an appearance of the portion of the representation of the first user in the first manner includes the computer system (e.g., 702 and/or 705) changing (e.g., increasing or decreasing) an amount of blur of the portion (e.g., 711-1, 711-2, 711-3, 711-4, 711-5, 711-6, 711-7, 711-8, and/or 711-9) of the representation of the first user from the first amount of blur (e.g., as shown for avatar hand 711-2 in FIG. 7C) to a second amount of blur different from the first amount of blur (e.g., as shown for avatar hand 711-2 in FIG. 7D) (e.g., displaying the representation of the first user having less blur than the first amount (e.g., 50%, 40%, 25%, 15%, 10%, 5%, 2%, 1% blur, or less)) (e.g., displaying the representation of the first user having a greater amount of blur than the first amount (e.g., 100%, 99%, 98%, 97%, 95%, 90%, 85%, 80%, 75%, 70%, 65%, or 60% blurring) or ceasing to display the representation of the first user). Changing an amount of blur of the portion of the representation of the first user provides feedback about a state of the computer system (e.g., a state in which tracking of the first portion of the first user has failed or is likely to be lost or degraded).

In some embodiments, changing an appearance of the portion (e.g., 711-1, 711-2, 711-3, 711-4, 711-5, 711-6, 711-7, 711-8, and/or 711-9) of the representation (e.g., 711) of the first user (e.g., 701) in the first manner includes the following. In accordance with a determination that the change in appearance is a first type of change (e.g., a change in which a blurring, desaturating, and/or fading effect is increasing), the computer system (e.g., 702 and/or 705) changes the appearance of the portion of the representation of the first user at a first rate of change (e.g., a gradual rate of change and/or a rate of change over a first amount of time (e.g., 1 second, 0.75 seconds, 0.5 seconds, or 0.4 seconds)). In accordance with a determination that the change in appearance is a second type of change different from the first type of change (e.g., a change in which a blurring, desaturating, and/or fading effect is decreasing), the computer system changes the appearance of the portion of the representation of the first user at a second rate of change different from the first rate of change (e.g., a rapid rate of change and/or a rate of change over a second amount of time that is less than the first amount of time (e.g., 0.4 seconds, 0.25 seconds, or 0.1 seconds)). Changing the appearance of the portion of the representation of the first user at a first rate of change when the change in appearance is a first type of change, and changing the appearance of the portion of the representation of the first user at a second rate of change different from the first rate of change when the change in appearance is a second type of change provides feedback about a state of the computer system (e.g., a state in which tracking of the first portion of the first user has failed or is likely to be lost or degraded, or a state in which tracking of the first portion of the first user has resumed).

In some embodiments, the first portion of the first user (e.g., 701) includes a hand (e.g., 701-1 and/or 701-2) of the first user. In some embodiments, the portion of the representation (e.g., 711) of the first user is an avatar hand (e.g., 711-1 and/or 711-2).

In some embodiments, the first portion of the first user (e.g., 701) includes a forearm (e.g., 701-5) of the first user. In some embodiments, the portion of the representation (e.g., 711) of the first user is an avatar forearm (e.g., 711-5).

In some embodiments, the computer system displays a greater amount of the avatar forearm when the user's hand is farther from the user's body, and displays less of the avatar forearm when the user's hand is closer to the user's body. For example, when the user's hand is greater than a threshold distance (e.g., 0.4 m, 0.45 m, 0.5 m, 0.55 m, 0.6 m, 0.65 m, 0.7 m, or 0.8 m) from the user's body, a first amount of the avatar forearm is displayed, and when the user's hand is less than the threshold distance, a second amount (less than the first amount) of the avatar forearm is displayed. In some embodiments, the amount of avatar forearm displayed is proportional to the distance of the user's hand from the user's body. For example, if the user's hand is a first distance from the user's body (e.g., 0.4 m or 0.45 m) a first amount of the avatar forearm is displayed. If the user's hand is a second distance from the user's body greater than the first distance (e.g., 0.5 m or 0.55 m), a second amount (greater than the first amount) of the avatar forearm is displayed. If the user's hand is a third distance from the user's body greater than the second distance (e.g., 0.6 m or 0.65 m), a third amount (greater than the second amount) of the avatar forearm is displayed.

In some embodiments, in response to receiving a request to display the representation (e.g., 711) of the first user (e.g., 701) in the extended reality environment (e.g., 710) with a respective feature (e.g., 711-1 or 711-2) (e.g., an avatar hand or an avatar shoulder), and in accordance with a determination that the first data indicates that the representation of the first user should be displayed with the portion of the representation of the first user (e.g., 711-5 or 711-4) (e.g., an avatar forearm and/or an avatar elbow) that corresponds to the first portion of the first user (e.g., 701-5 or 701-4) (e.g., the user's forearm and/or elbow), the computer system (e.g., 702 and/or 705) causes the representation of the first user to be displayed in the extended reality environment with the portion of the representation (e.g., 701-5 or 701-4) of the first user and the respective feature (e.g., 711-1 or 711-2) (e.g., an avatar hand or an avatar shoulder). In accordance with a determination that the first data indicates that the representation of the first user should not be displayed with the portion of the representation of the first user (e.g., an avatar forearm and/or an avatar elbow) that corresponds to the first portion of the first user (e.g., the user's forearm and/or elbow), the computer system causes the representation of the first user (e.g., 711) to be displayed in the extended reality environment without the respective feature (and without the portion of the representation of the first user). Causing the representation of the first user to be displayed with the portion of the representation of the first user and the respective feature when the first data indicates that the representation of the first user should be displayed with the portion of the representation of the first user, and causing the representation of the first user to be displayed without the respective feature when the first data indicates that the representation of the first user should not be displayed with the portion of the representation of the first user, enables the computer system to provide a more realistic user experience by conditionally displaying avatar features based on the presence of other avatar features in the displayed avatar, which also preserves battery power. In some embodiments, a first portion of the avatar is not displayed without a corresponding feature. For example, the avatar forearm is not displayed without an avatar hand.

In some embodiments, the first portion of the first user (e.g., 701) includes a first shoulder (e.g., 701-8 or 701-9) of the first user. In some embodiments, the portion of the representation (e.g., 711) of the first user includes a representation (e.g., 711-8 or 711-9) of the first shoulder (e.g., a first avatar shoulder). In some embodiments, the avatar (e.g., 711) is displayed having shoulders when the user's hands (e.g., 701-1 and/or 701-2) are being tracked. In some embodiments, the avatar is displayed without a shoulder when a corresponding hand of the user (the user's right hand corresponds to the user's right shoulder and the user's left hand corresponds to the user's left shoulder) is not being tracked (e.g., the hand is outside of the camera field-of-view, criteria is not met for tracking the user's hand, criteria is not met for displaying the avatar hand, or the tracking of the user's hand has failed).

In some embodiments, in response to detecting first update data corresponding to a request to update display of the representation (e.g., 711) of the first user (e.g., 701), the computer system (e.g., 702 and/or 705) updates the display of the representation of the first user, including the following. In accordance with a determination that the first update data indicates a changed appearance of the representation (e.g., 711-8) of the first shoulder (e.g., 701-8), the computer system (e.g., 702 and/or 705) changes an appearance of the representation of the first shoulder without changing an appearance of a representation (e.g., 711-9) of a second shoulder (e.g., 701-9) (e.g., increasing a blurring, desaturation, and/or fading of the first avatar shoulder without changing an appearance of a second avatar shoulder, or decreasing a blurring, desaturation, and/or fading of the first avatar shoulder without changing an appearance of the second avatar shoulder) (e.g., as shown in FIG. 7C). In accordance with a determination that the first update data indicates a changed appearance of a representation (e.g., 711-9) of a second shoulder (e.g., 701-9), the computer system changes an appearance of the representation of the second shoulder without changing an appearance of the representation of the first shoulder (e.g., increasing a blurring, desaturation, and/or fading of the second avatar shoulder without changing an appearance of the first avatar shoulder, or decreasing a blurring, desaturation, and/or fading of the second avatar shoulder without changing an appearance of the first avatar shoulder). Changing the appearance of the portion of the representation of the first shoulder without changing an appearance of a representation of a second shoulder when the first update data indicates a changed appearance of the representation of the first shoulder, and changing the appearance of the representation of the second shoulder without changing an appearance of the representation of the first shoulder when the first update data indicates a changed appearance of the representation of the second shoulder provides feedback about a state of the computer system (e.g., a state in which a tracked location of a user feature causes changes in a displayed state of an avatar feature).

In some embodiments, in response to detecting second update data corresponding to a request to update display of the representation (e.g., 711) of the first user (e.g., 701) to include a changed appearance of the representation (e.g., 711-8) of the first shoulder (e.g., 701-8) and a changed appearance of a representation (e.g., 711-1 or 711-2) of a first hand (e.g., 701-1 or 701-2) (e.g., an avatar hand), the computer system (e.g., 702 and/or 705) updates the display of the representation of the first user, including the following. The computer system changes the appearance of the representation of the first hand (e.g., increasing a blurring, desaturation, and/or fading of the first avatar hand, or decreasing a blurring, desaturation, and/or fading of the first avatar hand) at a first point in time after detecting the second update data (e.g., hand 711-2 as shown in FIG. 7D). The computer system changes the appearance of the representation of the first shoulder (e.g., shoulder 711-8 as shown in FIG. 7D) (e.g., increasing a blurring, desaturation, and/or fading of the first avatar shoulder, or decreasing a blurring, desaturation, and/or fading of the first avatar shoulder) at a second point in time after detecting the second update data that is later than the first point in time (e.g., 0.75 seconds, 1 second, 1.25 seconds, or 1.5 seconds after the first point in time or 0.1 seconds, 0.25 seconds, or 0.5 seconds after changing the appearance of the representation of the first hand). Changing the appearance of the portion of the representation of the first hand at a first point in time, and changing the appearance of the representation of the first shoulder at a second point in time that is later than the first point in time provides feedback about a state of the computer system (e.g., a state in which a tracked location of a user feature causes changes in a displayed state of other avatar features). In some embodiments, the computer system changes the appearance of the avatar shoulder(s) at a rate that is different from (e.g., faster than or slower than) a rate for changing the appearance of the avatar hand(s).

In some embodiments, aspects/operations of method 1000 may be interchanged, substituted, and/or added between these methods. For example, the techniques discussed with respect to method 1000 for modifying the avatar features after tracking is lost can be applied to the embodiments discussed with respect to method 800. For brevity, these details are not repeated here.

FIGS. 9A-9E illustrate examples of modifying a portion of an avatar after tracking is lost. FIG. 10 is a flow diagram of an exemplary method 1000 for modifying a portion of an avatar after tracking is lost. The user interfaces in FIGS. 9A-9E are used to illustrate the processes described below, including the processes in FIG. 10.

FIGS. 9A-9E illustrate a schematic depiction of physical user 901 in physical environment 900 with physical elements such as physical device 702. User 901 is using device 702 to participate in a live communication session in an XR environment with one or more remote participants or users. As described above, device 702 is a computer system that includes display 702-1 and one or more cameras 702-2 and/or sensors for detecting movement of user 901 in physical environment 900. Device 702 displays a representation of the XR environment for the communication session using display 702-1. The representation of the XR environment can include one or more displayed virtual avatars representing, in the XR environment, other participants of the live communication session. In some embodiments, the representation of the XR environment includes a self view of user 901 such as a view of the avatar that represents user 901 in the XR environment (for example, shown from the perspective that is viewed by the participants of the live communication session and/or shown from the perspective of user 901). In some embodiments, device 702 includes one or more microphones and speakers for providing audio communication between user 901 and the participants of the live communication session in the XR environment. As described in greater detail below, device 702 tracks the movements of portions of user 901 (e.g., by detecting the location, orientation, and/or movement of portions of user 901) that are within camera field-of-view 704, which is the field-of-view of camera 702-2. In some embodiments, tracking indicator 915 indicates whether the tracking feature is enabled and/or functioning properly. Thus, when tracking indicator 915 is shown, one or more portions of user 901 (e.g., the entirety of tracked portions of user 901 or some of the tracked portions) are properly tracked by device 702, and when tracking indicator is not shown, the portions of user 901 are not being tracked by device 702. In some embodiments, device 702 causes the displayed state of an avatar that represents user 901 in the XR environment to be modified based on the changes in the pose of user 901 that are detected in camera field-of-view 704. For example, device 702 detects user 901 quickly nodding their head and sends instructions for causing the avatar, which is displayed at another device (a device of a participant of the live communication session), to be modified based on the movement of user 901 such that the avatar mimics the movements of user 901 by quickly nodding its head. In some embodiments, some portions of user 901 are not tracked, even if they are located in the field-of-view 704 of camera 702-2 when tracking is enabled.

FIGS. 9A-9E also depict device 705, which represents the device of a participant of the live communication session that is provided in the XR environment. As described above, device 705 includes display 705-1 and one or more cameras 705-2. Device 705 displays XR environment 910 which, in the embodiments depicted in FIGS. 9A-9E, includes virtual avatar 911, which represents user 901 in the live communication session provided in XR environment 910. Device 705 also displays controls 712 for controlling aspects of the live communication session in the XR environment. In some embodiments, XR environment 910 can be a completely virtual embodiment or an AR environment. As user 901 moves in physical environment 900, and the tracking feature is enabled, the movement of user 901 is captured in field-of-view 704 of camera 702-2, and the display of avatar 911 is modified based on the movement of user 901. For example, as user 901 slowly raises his left hand in physical environment 900, device 702 captures the movement in the field-of-view of camera 702-2, and sends instructions to device 705 (e.g., directly or indirectly) to modify the displayed appearance of avatar 911 based on the movement of user 901. In this example, device 705 displays avatar 911 slowly raising its left hand in the same manner as user 901. In some embodiments, avatar 911 is displayed as a complete representation of user 901, having a complete set of corresponding avatar features such as an avatar head, neck, shoulders, upper arms, elbows, forearms, hands, fingers, a torso, waist, legs, thighs, knees, lower legs, and/or feet. In some embodiments, avatar 911 is displayed as a partial representation of user 901, having a subset of corresponding avatar features such as an avatar head, neck, shoulders, hands, fingers, and, optionally, forearms, with other avatar features omitted. In some embodiments, some portions of avatar 911 shown having a solid line type may not be displayed or correspond to portions of a user that are being tracked. For example, avatar 911 can be shown in the figures with solid lines for legs or a torso, but these portions of the avatar may not be displayed in some embodiments.

As described herein, a device (e.g., device 702 and/or device 705) can cause the display of avatar 911 to be modified after tracking of user 901 has failed, based on movements of user 901 that were detected prior to the tracking feature failing and based on biomechanical relationships of parts of user 901. In some embodiments, the techniques for modifying the display of avatar 911 improve the user experience by providing a more realistic or natural representation of avatar 911 in the XR environment by eliminating unnatural and/or jittery movements and poses of the avatar that can occur after tracking has failed. In some embodiments, a device modifies the avatar to display more natural poses and movements by recognizing and/or anticipating movements of portions of user 901 when tracking fails and by moving the avatar in a natural manner that is based on movement of the feature when tracking failed and a biomechanical relationship between the previously tracked feature and other parts of the user's body. In some embodiments, device 702 or another device (e.g., a server) modifies avatar 911, with device 705 displaying the modified avatar.

In the embodiments provided herein, the techniques for modifying the avatar are described with respect to devices 702 and 705, which are depicted as tablet or smartphone computer systems that are used to display an avatar in an XR environment. It should be appreciated, however, that a different type of computer system can be used in lieu of (or in addition to) device 702 and/or device 705. For example, instead of using device 702 and/or device 705, the computer system can be a head-mounted device (HMD) that is worn by user 901 and/or other participants of the live communication session in the XR environment. In such embodiments, the HMD includes a display component that is analogous to display 702-1 and/or display 705-1 and one or more sensors and/or cameras analogous to camera 702-2 and/or camera 705-2. For example, the display can be an opaque display screen with display components and/or a transparent or translucent display through which user 901 may directly view physical environment 900 and upon which virtual elements of the live communication session can be displayed or projected. The HMD may further include speakers and/or other audio output devices integrated into the HMD for providing audio output for the live communication session, and one or more cameras, microphones, and/or other sensors that are used to capture images (e.g., video and/or pictures) of physical environment 900 (e.g., for display at the HMD and/or for detecting input), for detecting poses and/or movement of portions of user 901, and to receive user input in the form of hand gestures, voice gestures, gaze gestures, and/or other input forms described herein. For example, user 901 can be wearing an HMD that includes a display for viewing the XR environment during the live communication session, and cameras and/or sensors for detecting the poses of portions of user 901 (similar to the use of camera 702-2 for detecting the user's poses) for modifying display of the avatar (e.g., avatar 911 representing user 901 in the XR environment). In some embodiments, the point of view of the sensors and/or cameras of the HMD can align substantially with the point of view of user 901, such that the point of view of the respective sensors and/or cameras are considered to be consistent with the user's point of view for purposes of executing the techniques described herein. In some embodiments, a participant of the live communication session in the XR environment can be wearing an HMD that includes a display for displaying the avatar in the XR environment (similar to the display of avatar 911 in environment 910 shown in FIG. 9A), wherein the avatar is modified using the techniques described herein. Accordingly, while the methods for modifying the portions of the avatar after tracking of the user has failed are discussed herein with respect to devices 702 and 705, it should be appreciated that the methods can be performed using other computer systems including, for example, an HMD. Similarly, it should be understood that the methods described as being performed by device 702 can likewise be performed using device 705, and vice versa. For example, the embodiments provided herein describe the pose and movements of user 901 as being captured using camera 702-2 of device 702. However, the movements can instead (or additionally) be captured using camera 705-2 of device 705 (for example, if user 901 and the participant are both located in physical environment 900).

FIGS. 9A-9E depict various example embodiments in which device 705 modifies avatar 911 after tracking of user 901 has failed (e.g., tracking of one or more portions of user 901 has failed). In some embodiments, the modification of the avatar includes a change in one or more visual characteristics of a portion of the avatar such as, for example, changing an amount of blurriness, opacity, and/or saturation of a respective feature of the avatar, similar to that discussed above with respect to FIGS. 7A-7I. For example, the avatar can be modified such that an avatar hand fades, blurs, and/or desaturates while the visual characteristics of other portions of the avatar (e.g., the avatar's head, neck, and/or shoulders) are not changed or are changed in a different manner. In some embodiments, changing the visual characteristic causes the respective avatar feature to be deemphasized or displayed less prominently, and reversing the change in the visual characteristic reverses the deemphasizing effect. For example, increasing the amount of blurriness, fading, and/or desaturation causes the respective avatar feature to be deemphasized or to be displayed less prominently, whereas decreasing the amount of blurriness, fading, and/or desaturation, causes the respective avatar feature to be reemphasized (or less deemphasized) or to increase the prominence with which the respective avatar feature is displayed. In some embodiments, the amount of change in the visual characteristic is dynamic and changes based on parameters for displaying or modifying display of a respective avatar feature. In some embodiments, the change in the visual characteristic is a change within a range of values for the respective visual characteristic. For example, in some embodiments, the respective avatar feature is faded by decreasing opacity of the avatar feature from 100% opacity to a lower amount of opacity such as, for example, 10% opacity or 5% opacity or, in some instances 0% opacity, in which case the respective avatar feature is not displayed. In the embodiments described herein, the value of the visual characteristic for an avatar feature is represented by different line types in the figures. For example, a solid line represents a first value for one or more visual characteristics that corresponds to no change in the visual characteristics (e.g., no fading, full saturation, and/or no blurring), a dashed line represents a second value for the one or more visual characteristics that corresponds to a first degree of change that is greater than the solid line (e.g., an increased amount of fading, increased desaturation, and/or increased blurring), and a dotted line represents a third value for the one or more visual characteristics that corresponds to a second degree of change that is greater than the dashed line (e.g., a great amount of fading, a great amount of desaturation, and/or a great amount of blurring, or the feature is not displayed). In some embodiments, the dotted line type indicates that a respective avatar feature is not displayed. It should be appreciated that the different line types are used for illustrative purposes to represent a change in a visual characteristic of the avatar and that the visual characteristic values associated with the different line types are used as examples for illustrating different values for the changed visual characteristics. It should also be appreciated that the visual characteristic values associated with the different line types may not be consistent among each of the example embodiments described herein and that the different line types are provided for illustrative purposes to demonstrate a contrast between different visual characteristic values.

In the embodiments described herein, the changes in the visual characteristic of the avatar are implemented after tracking of the user 901 has failed, and are based on detected movements of a portion of the user prior to tracking failing, and based on biomechanical and spatial relationships between the portion of the user and other body parts of user 901. In some embodiments, the biomechanical relationship defines possible and/or probable relational geometries between two biological features of the user based on a biological positioning of the two features on the body of the user, and the spatial relationship defines a relative positioning of respective biological features of the user. Thus, when tracking fails, the device continues to move a portion of the avatar in accordance with the biomechanical and spatial relationships so that the avatar is not rendered having unnatural and/or jittery movements and behavior and, instead, is displayed with more natural poses and movements. In some embodiments, the device modifies one or more visual characteristics of the avatar to indicate to the viewer of the avatar that there may be uncertainty in determining the pose of a portion of the user. In some embodiments, the changed visual characteristics convey this information to the viewer in a manner that is less distracting than displaying the avatar feature without modified visual characteristics, particularly when the respective avatar feature would be displayed moving in an unnatural or otherwise distracting manner. Various examples of the lost-tracking behavior and biomechanical relationships used to modify the avatar are discussed in greater detail below. It should be appreciated that the examples represent non-limiting examples and can be combined without departing from the scope of the present disclosure.

Figure 9A:
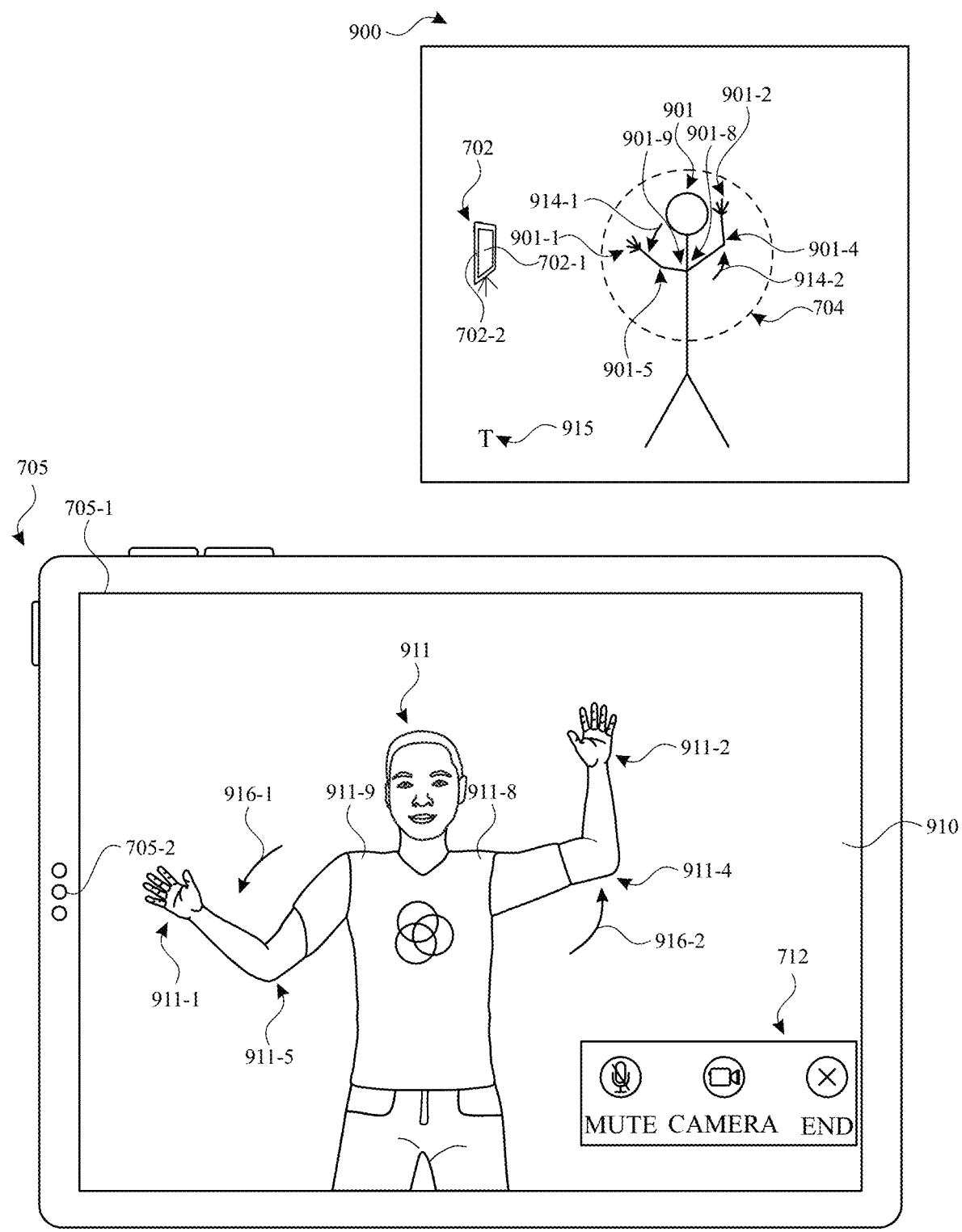
FIGS. 9A-9E illustrate example techniques for modifying a portion of an avatar after tracking is lost, in accordance with some embodiments.

In FIG. 9A, user 901 is standing in physical environment 900 and moving arm 901-5 and hand 901-1 in a downward direction as indicated by arrow 914-1, and moving arm 901-4 and hand 901-2 in an upward direction as indicated by arrow 914-2. Device 702 is tracking the movements of user 901 as indicated by tracking indicator 915. As user 901 is moving, device 705 displays avatar 911 moving to match the movements of user 901. Specifically, device 705 displays avatar hand 911-1 and avatar arm 911-5 moving downward (indicated by arrow 916-1) similar to user hand 901-1 and arm 901-5. Device 705 also displays avatar hand 911-2 and avatar arm 911-4 moving upward (indicated by arrow 916-2) similar to user hand 901-2 and arm 901-4. The avatar features are displayed having the pose of user 901 and without a modified visual characteristic, as indicated by the solid line type used to depict right avatar hand 911-1, left avatar hand 911-2, left avatar arm 911-4, right avatar arm 911-5, right avatar shoulder 911-8, and left avatar shoulder 911-9. The arrows shown on device 705, such as arrows 916-1 and 916-2, are provided for illustrative purposes and are not displayed at device 705.

Figure 9B:
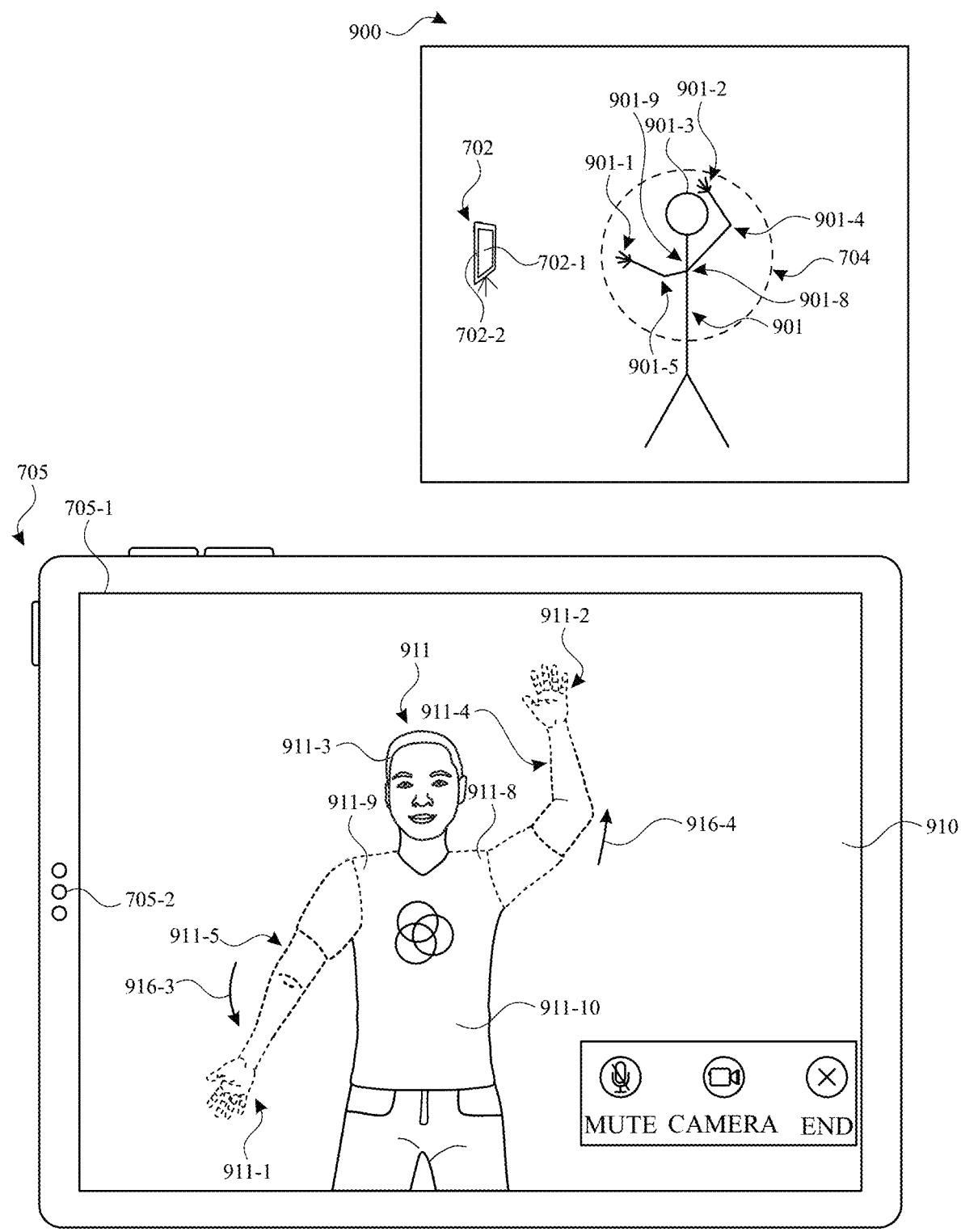

In FIG. 9B, user has lowered right hand 901-1 and right arm 901-5 from the position in FIG. 9A while keeping arm 901-5 extended out to the side of user 901, and has raised left hand 901-2 and left arm 901-4 from the position in FIG. 9A such that hand 901-2 is raised over the user's head 901-3. As the user was moving from the pose in FIG. 9A to the pose in FIG. 9B, tracking of the movement of user 901 failed, as indicated by the absence of tracking indicator 915. Accordingly, device 705 is not informed of the specific pose of user 901 in FIG. 9B, and therefore, does not know the exact positions of the user's hands and arms.

As shown in FIG. 9B, device 705 modifies the pose of avatar 911 after tracking of one or more portions of user 901 has failed. Specifically, device 705 continues the downward movement of avatar hand 911-1 and avatar arm 911-5, as indicated by arrow 916-3 and the displayed position of avatar hand 911-1 and avatar arm 911-5. Importantly, however, device 705 does not simply display avatar arm 911-5 and avatar hand 911-1 continuing to move in the same direction and orientation that was displayed when tracking failed. Rather, device 705 modifies the movement trajectory and the displayed position and orientation of hand 911-1 and arm 911-5 based on the biomechanical and spatial relationships between the user's hand 901-1, arm 901-5, and shoulder 901-9, and the movement of the hand and/or arm, when tracking failed. For example, instead of displaying avatar hand 911-1 continuing to move straight down, device 705 displays hand 911-1 and arm 911-5 rotating inward and moving downward towards the avatar's body 911-10. In some embodiments, avatar shoulder 911-9 stretches and rotates downward to facilitate the downward and rotational movement of avatar hand 911-1 and avatar arm 911-5. This movement of the avatar features conforms to the relational geometries for the corresponding portions of user 901, which is based on how the portions of the user are connected to the user's body. For example, device 705 does not display avatar hand 911-1 moving to a location in the XR environment that extends beyond the reach of the user's arm 901-5 or awkwardly contorts the user's shoulder 901-9. Instead, the hand is displayed at a position that is within reach of the user's arm 901-5 and is selectively determined based on the movement of the user's hand 901-1 when tracking failed. Thus, because the user's hand 901-1 was moving in a downward direction when tracking failed, it is more likely that the hand continued with the downward movement (as opposed to moving in an upward direction). Therefore, device 705 displays avatar hand 911-1 continuing with a downward movement that is also based on the biomechanical and spatial relationships between the user's hand, arm, and shoulder.

Device 705 also modifies avatar hand 911-2, avatar arm 911-4, and shoulder 911-8 based on the biomechanical and spatial relationships between user's hand 901-2, arm 901-4, and shoulder 901-8, and the movement of the hand and/or arm when tracking failed. For example, device 705 continues the upward movement of avatar arm 911-4 and avatar hand 911-2 as indicated by arrow 916-4 and the displayed positions of the respective avatar features in FIG. 9B. In some embodiments, avatar shoulder 911-8 stretches to facilitate the upward movement of avatar arm 911-4 and avatar hand 911-2. As described above, device 705 determines the movement and displayed positions of avatar hand 911-2, avatar arm 911-4, and avatar shoulder 911-8 based on the biomechanical and spatial relationships of user arm 901-4 and user hand 901-2, and the movement of these portions of user 901 when tracking failed. Accordingly, device 705 displays avatar hand 911-2 continuing to raise over avatar head 911-3, then stops the movement of the avatar hand 911-2 and arm 911-4 so that the hand does not continue to move beyond the reach of the user's arm.

In addition to displaying the continued movement of the avatar features, device 705 modifies the visual characteristics of the avatar's hands 911-1 and 911-2 and shoulders 911-8 and 911-9 to indicate decreased certainty of the poses of these respective features (e.g., as discussed above with respect to FIGS. 7A-7I) due to the loss of tracking. In some embodiments, device 705 also modifies the visual characteristics of avatar arms 911-4 and 911-5. In FIG. 9B, avatar hands 911-1 and 911-2 and avatar shoulders 911-8 and 911-9 are shown with dashed line type, indicating a change in the visual characteristics of these avatar features such as increased blurring, fading, and/or desaturation.

Figure 9C:
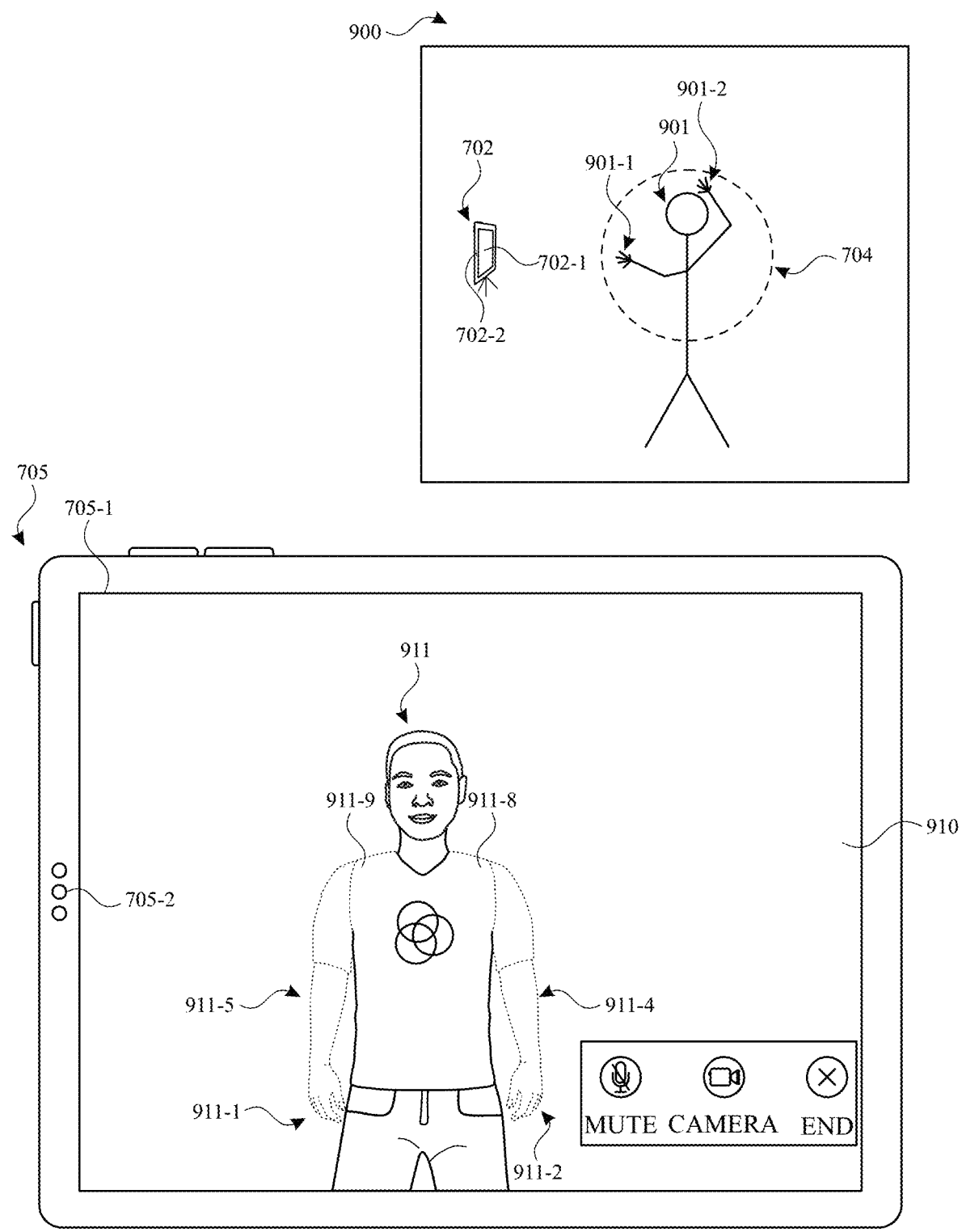

In FIG. 9C, user 901 continues to hold the same pose as in FIG. 9B, while tracking of the user is still unavailable. Device 705 modifies avatar 911 by moving avatar hands 911-1 and 911-2, and avatar arms 911-4 and 911-5 to the sides of avatar 911, representing a resting pose of the avatar hands and arms. In some embodiments, device 705 displays avatar shoulders 911-8 and 911-9 relaxing/dropping as the hands and arms move to the resting pose. In some embodiments, the resting pose if different from that depicted in FIG. 9C. For example, the hands are moved to the avatar's lap in the resting pose. In FIG. 9C, avatar hands 911-1 and 911-2 are displayed having a resting pose that is different from the opened hand pose in FIGS. 9A and 9B. In some embodiments, device 705 transitions avatar 911 to the resting pose after holding the pose in FIG. 9B for a predetermined amount of time. In some embodiments, when tracking is lost device 705 transitions avatar 911 to the resting pose, and the embodiment depicted in FIG. 9B is an intermediate pose that is displayed as part of the transition to the resting pose in FIG. 9C, but is not held for the predetermined amount of time. As shown in FIG. 9C, device 705 continues to change the visual characteristics for avatar hands 911-1 and 911-2 and avatar shoulders 911-8 and 911-9, as shown by the dotted line type indicating increased fading, blurring, and/or desaturation of the respective avatar features. In some embodiments, the dotted line type indicates that avatar hands 911-1 and 911-2 and avatar shoulders 911-8 and 911-9 are not displayed. In some embodiments, an avatar forearm is modified as part of the changes to avatar hand 911-1 and/or avatar hand 911-2.

Figure 9D:
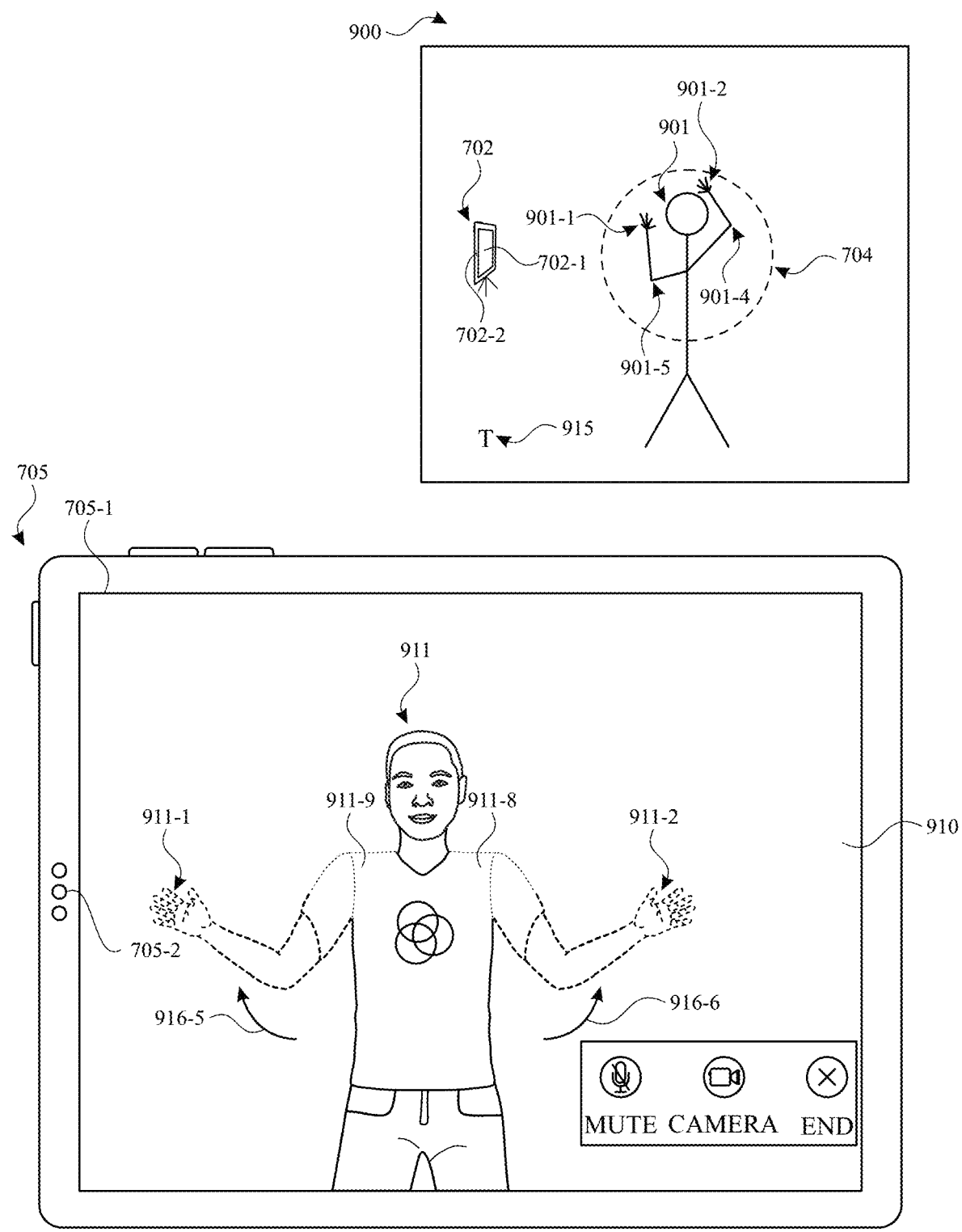

In FIG. 9D, user 901 is holding arms 901-4 and 901-5 raised in the air when tracking resumes, as indicated by tracking indicator 915. When tracking resumes, device 705 detects the updated pose of user 901 and modifies avatar 911 to assume the pose of user 901. However, instead of displaying an instantaneous transition from the resting pose (shown in FIG. 9C) to a pose mimicking user 901 (shown in FIG. 9E), device 705 displays a transition that includes moving avatar 911 from the resting pose to intermediate or interpolated poses, such as that shown in FIG. 9D. The intermediate poses are determined based on the detected pose of user 901, and the biomechanical and spatial relationships of the tracked portions of user 901, such that the avatar 911 moves smoothly, and in a natural movement pattern, from the resting pose to the pose of user 901, while gradually reversing the changed visual characteristics of the respective avatar features, which avoids drawing attention to the fact that tracking was lost and avoids distracting a viewer of avatar 911.

For example, in FIG. 9D, device 705 displays avatar hand 911-1 raising up from the resting pose towards the raised position of user hand 901-1, as indicated by arrow 916-5. Device 705 also reduces the blurring, fading, and/or desaturation of avatar hand 911-1, as shown by the dashed line type of avatar hand 911-1. Similarly, device 705 displays avatar hand 911-2 raising up from the resting pose towards the raised position of user hand 901-2, as indicated by arrow 916-6. Shoulders 911-8 and 911-9 are shown raising up from the resting pose, moving to facilitate the transition from the resting pose. Device 705 reduces the blurring, fading, and/or desaturation of avatar hand 911-2, as shown by the dashed line type of avatar hand 911-2. Accordingly, device 705 displays the avatar hands fading into view as the hands move towards the pose of the user's hands. In some embodiments, different portions of the avatar are displayed reversing the changed visual characteristic (e.g., fading into view, reducing the blur, and/or reducing the desaturation) at different rates. For example, in FIG. 9D, the avatar hands 911-1 and 911-2 are shown fading into view more rapidly than avatar shoulders 911-8 and 911-9, which are depicted in FIG. 9D as still having the dotted line type. In some embodiments, the visual characteristics of some avatar features, such as avatar shoulders 911-8 and 911-9, change at a same rate. For example, avatar shoulder 911-8 fades in or out at the same rate as shoulder 911-9. In some embodiments, the visual characteristics change at different rates based on whether they are changing or reversing the change. For example, avatar shoulders 911-8 and 911-9 fade into view at a slower rate than they fade out. In some embodiments, the shoulders fade in or out together. In some embodiments, the shoulders fade in our out independently. In should be appreciated that the change in visual characteristics is sometimes described herein with reference to one particular change (such as fading), however, the fading is being used as one example and other visual characteristics can be changed instead of, or in addition to, the fading.

Figure 9E:
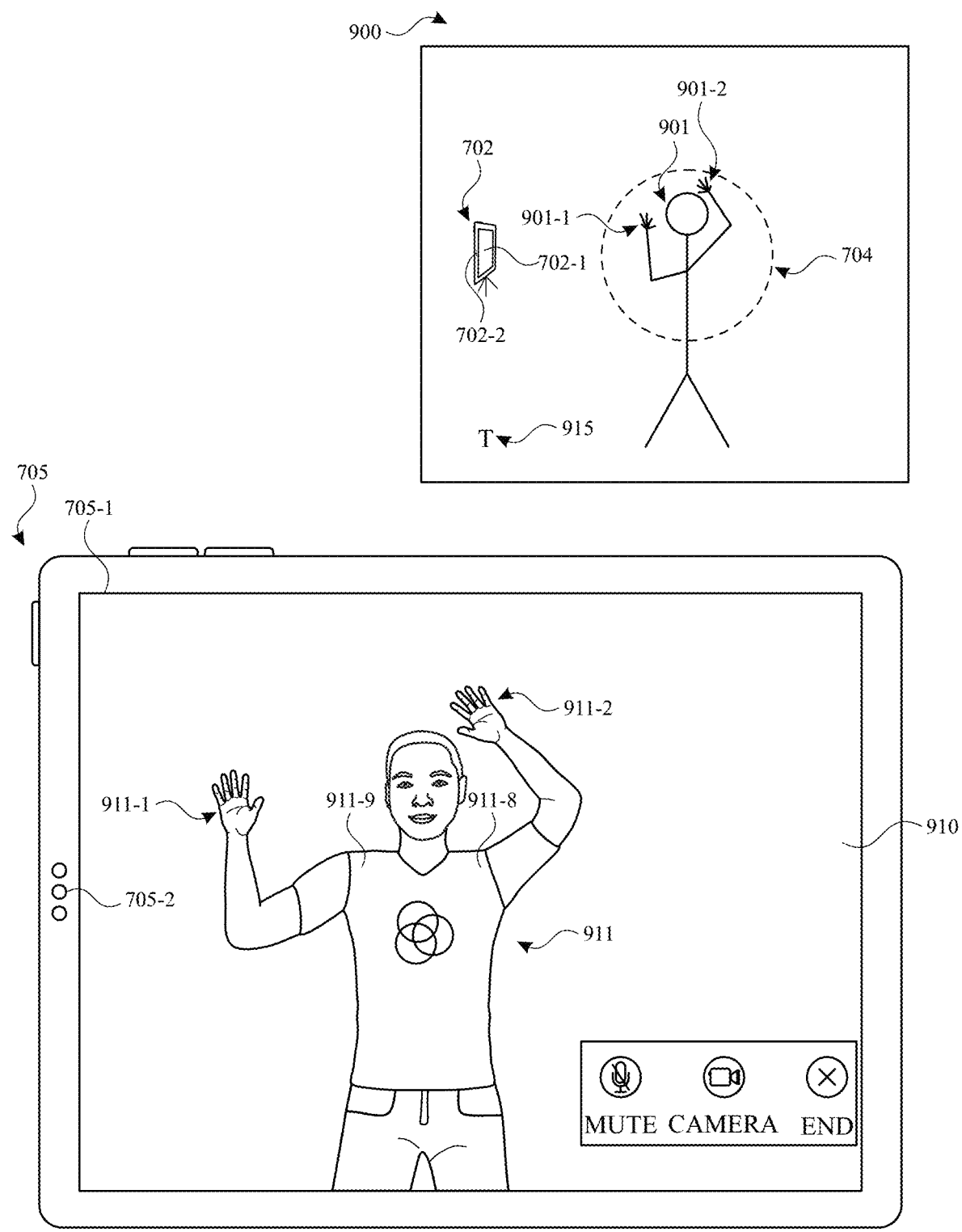

In FIG. 9E, tracking is still available and user 901 has the same pose as in FIG. 9D. Device 705 displays avatar 911 having a pose that mimics the pose of user 901. Specifically, device 705 has displayed avatar 911 transitioning from the interpolated pose in FIG. 9D, to the pose that matches the pose of user 901, shown in FIG. 9E. Accordingly, device 705 has fully reversed the changed visual characteristics of the avatar features, as indicated by the solid line style used to depict avatar hands 911-1 and 911-2 and avatar shoulders 911-8 and 911-9.

Additional descriptions regarding FIGS. 9A-9E are provided below in reference to method 1000 described with respect to FIGS. 9A-9E.

FIG. 10 is a flow diagram of an exemplary method 1000 for modifying a portion of an avatar after tracking is lost, in accordance with some embodiments. In some embodiments, method 1000 is performed at a computer system (e.g., computer system 101 in FIGS. 1, 702, and/or 705) (e.g., a smartphone, tablet, laptop, and/or head-mounted display generation component) that is in communication with a display generation component (e.g., display generation component 120 in FIGS. 1, 3, and 4) (e.g., display 702-1 and/or display 705-1) (e.g., a visual output device, a 3D display, a display having at least a portion that is transparent or translucent on which images can be projected (e.g., a see-through display), a projector, a heads-up display, and/or a display controller). In some embodiments, the computer system is associated with a first user (e.g., the computer system is being operated by the first user (e.g., a user that is in a communication session (e.g., an extended reality and/or video conference) with a user of an external computer system)). In some embodiments, the computer system includes one or more sensors (e.g., 702-2 and/or 705-2) (e.g., a gyroscope, an accelerometer, a motion sensor, a movement sensor, a microphone, an infrared sensor, a camera sensor, a depth camera, a visible light camera, an eye-tracking sensor, a gaze-tracking sensor, a physiological sensor, and/or an image sensor) for obtaining pose data of the first user. In some embodiments, the display generation component is part of the computer system. In some embodiments, the display generation component is part of an external computer system. In some embodiments, the method 1000 is governed by instructions that are stored in a non-transitory (or transitory) computer-readable storage medium and that are executed by one or more processors of a computer system, such as the one or more processors 202 of computer system 101 (e.g., control 110 in FIG. 1). Some operations in method 1000 are, optionally, combined and/or the order of some operations is, optionally, changed.

In method 1000, the computer system (e.g., 702 and/or 705) causes (1002) (e.g., via the transmission of data) a representation (e.g., 911) of a first user (e.g., 901) (e.g., a virtual avatar (e.g., the avatar is a virtual representation of at least a portion of the first user (e.g., 901)); in some embodiments, the virtual avatar is displayed, in an extended reality environment (e.g., 910), in lieu of the first user)) to be displayed in an extended reality environment (e.g., 910), via the display generation component (e.g., 705-1 and/or 702-1). The representation of the first user has one or more features (e.g., 911-1, 911-2, 911-3, 911-4, 911-5, 911-8, and/or 911-9) (e.g., avatar features such as one or more an avatar hand, finger, wrist, elbow, arm, leg, shoulder, neck, and/or head) that change appearance in response to detected changes in pose (e.g., physical position, orientation, gesture, and/or movement) of the first user (e.g., changes in pose of the first user detected in the physical environment (e.g., 900)). The representation of the first user includes a first feature that corresponds to (e.g., is a visual representation of) a first portion (e.g., a human body part such as a hand, forearm, upper arm, shoulder, torso, neck, and/or head) of the first user (e.g., avatar features 911-1, 911-2, 911-3, 911-4, 911-5, 911-8, and 911-9 correspond to user portions 901-1, 901-2, 901-3, 901-4, 901-5, 901-8, and 901-9, respectively) and is displayed in the extended reality environment having a first pose (e.g., as shown in FIG. 9A) (e.g., the first pose of the first feature is determined based on a detected pose of the first portion of the first user in the physical environment). In some embodiments, the representation of the first user is represented in the extended reality environment by a rendering that has anthropomorphic features (e.g., a head, arms, legs, and/or hands). In some embodiments, the representation of the first user is displayed having a same pose of the first user in the physical environment. In some embodiments, the representation of the first user is displayed having a portion that has a same pose as a corresponding portion of the first user in the physical environment. In some embodiments, the representation of the first user changes pose in response to a detected change in pose of at least a portion of the first user in the physical environment. For example, the representation of the first user is displayed in the extended reality environment as an animated character that mimics the detected movements of the first user in the physical environment.

The computer system (e.g., 702 and/or 705) receives (1004) (in some embodiments, detects) first data (e.g., depth data, image data, pose data, sensor data (e.g., image data from a camera)) that includes data indicating a change in pose (e.g., physical position, orientation, gesture, and/or movement) of the first user (e.g., 901) (e.g., a change, in the physical environment, in the pose of the first user), wherein the change in pose of the first user includes movement of the first portion of the first user relative to a second portion of the first user (e.g., movement of user hand 901-1 relative to shoulder 901-9, movement of user hand 901-2 relative to shoulder 901-8, and/or movement of any of user portions 901-1, 901-2, 901-3, 901-4, 901-5, 901-8, and 901-9 relative to any other portions of user 901) (e.g., the first portion of the first user is a first biological feature (e.g., a hand) and the second portion of the first user is a second biological feature different from the first biological feature (e.g., the first user's shoulder)). In some embodiments, the change in pose includes movement of the first portion of the first user in a pattern (e.g., 914-1 and/or 914-2) (e.g., a direction, arc, magnitude, and/or velocity (e.g., the first user is moving their hand in an upward direction; the first user is moving their shoulder(s) in a downward direction)). In some embodiments, the data includes sensor data (e.g., image data from a camera, movement data from an accelerometer, location data from a GPS sensor, data from a proximity sensor, and/or data from a wearable device (e.g., a watch and/or a headset device)). In some embodiments, the sensor can be connected to, or integrated with, the computer system. In some embodiments, the sensor can be an external sensor (e.g., a sensor of a different computer system (e.g., another user's electronic device)). In some embodiments, the computer system receives or detects the first data from one or more sensors (e.g., 702-2 and/or 705-2) for detecting the pose of the first user. In some embodiments, the computer system is a transmitting device (in some embodiments, device 702) that detects the pose of the first user and transmits instructions to an external computer system (in some embodiments, device 705) (e.g., a recipient device) for causing the representation of the first user to be displayed, updated, and/or modified (e.g., at the recipient device) in a particular manner. In some embodiments, the computer system causes the representation of the first user to be displayed, updated, and/or modified at the computer system. In some embodiments, the computer system is a receiving device (in some embodiments, device 705) that receives the first data from an external computer system (in some embodiments, 702) (e.g., a separate computer system) that generated and/or transmitted the first data to the computer system. For example, the external computer system is a transmitting device that detects the pose of the first user and then transmits instructions to the computer system for displaying, updating, and/or modifying the representation of the first user. In some embodiments, the computer system is referred to as a receiving device or recipient device. In some embodiments, the computer system is referred to as a sending device or transmitting device. In some embodiments, the computer system is a server for sending and/or receiving the first data.

After (in some embodiments, in response to) receiving the first data and after (in some embodiments, in response to failure of tracking) tracking of the first portion (e.g., 901-1 and/or 901-2) of the first user (e.g., 901) has failed (e.g., while the first user is changing pose (e.g., moving)) (e.g., tracking has failed because the first portion of the first user is no longer within the field-of-view of a camera for tracking movement, the first portion of the first user is obscured, and/or a sensor is unable to track the first portion of the first user), the computer system (e.g., 702 and/or 705) causes (1006) an appearance of the representation (e.g., 911) of the first user in the extended reality environment (e.g., 910) to be updated (e.g., based on at least a portion of the first data), wherein causing the appearance of the representation of the first user to be updated includes the following steps of method 1000.

In accordance with a determination that the first portion (e.g., 901-1 and/or 901-2) of the first user (e.g., 901) is moving in a first movement pattern (e.g., 914-1 and/or 914-2) (e.g., a first direction, arc, magnitude, and/or velocity) prior to (e.g., immediately prior to) the tracking of the first portion of the first user failing while the first portion of the first user has a first spatial relationship relative to the second portion (e.g., 901-9 and/or 901-8) of the first user (e.g., the first portion of the first user is determined to have a first position relative to the second portion of the first user), the computer system (e.g., 702 and/or 705) causes (1008) display of the first feature (e.g., 911-1 and/or 911-2) of the representation (e.g., 911) of the first user at a second position (e.g., a position shown in FIG. 9B or FIG. 9C) that is based on (e.g., is calculated using a function and/or a model that includes the movement pattern, the spatial relationship, and a biomechanical relationship as inputs) the first movement pattern, the first spatial relationship, and a first biomechanical relationship between the first portion of the first user and the second portion of the first user (e.g., a relationship that defines possible and/or probable relational geometries between two biological features of the user based on a biological positioning of the two features on the body of the user). Causing display of the first feature of the representation of the first user at the second position that is based on the first movement pattern, the first spatial relationship, and the first biomechanical relationship when the first portion of the first user is moving in the first movement pattern prior to the tracking of the first portion of the first user failing while the first portion of the first user has the first spatial relationship relative to the second portion of the user, and causing display of the first feature at the third position that is based on the first movement pattern, the second spatial relationship, and the first biomechanical relationship when the first portion is moving in the first movement pattern prior to the tracking of the first portion failing while the first portion has the second spatial relationship relative to the second portion of the first user enables the computer system to provide a more realistic user experience by displaying realistic movement of a feature of a representation of the user, based on biomechanical and spatial relationships of portions of the user when tracking of the corresponding portion of the user has failed.

In some embodiments, the biomechanical relationship defines a range of possible and/or probable positions and/or locations of a respective portion of the first user (e.g., 901) relative to a different portion of the user based on the mechanical structure of the user's body. In some embodiments, the biomechanical relationship is the particular relationship at the time tracking failed. In some embodiments, the spatial relationship between the first portion of the first user and the second portion of the first user changes over time and impacts how the first portion of the first user is likely to move given the constraints of the biomechanical relationship between the first and second portions of the first user. In some embodiments, causing display of the first feature of the representation of the first user at the second position includes displaying the first feature continuing to move in the first pattern (e.g., 914-1 and/or 914-2) (e.g., first direction, arc, magnitude, and/or velocity). In some embodiments, causing display of the first feature of the representation of the first user at the second position includes displaying the first feature (e.g., 911-1 and/or 911-2) continuing to move (e.g., 916-3 and/or 916-4) based on the first movement pattern and dampening the velocity and/or magnitude of movement of the first feature. In some embodiments, movement of the first feature is restricted to a first range of movement. For example, the avatar hand moves in a first direction, but does not extend beyond a determined length of the first user's arm (e.g., 901-5 or 901-4) as determined based on a known or approximated length of the user's arm and/or a known or approximated location of the user's shoulder (e.g., 901-9 or 901-8). In some embodiments, the first feature has a second movement pattern (e.g., 916-3 and/or 916-4) in the second position based on a previous movement pattern (e.g., 914-1, 914-2, 916-1, and/or 916-2) (e.g., the first movement pattern) and the first biomechanical relationship and/or the first spatial relationship.

In accordance with a determination that the first portion (e.g., 901-1 and/or 901-2) of the first user (e.g., 901) is moving in the first movement pattern (e.g., 914-1 and/or 914-2) prior to the tracking of the first portion of the first user failing while the first portion of the first user has a second spatial relationship relative to the second portion (e.g., 901-9 and/or 901-8) of the first user that is different from the first spatial relationship (e.g., the first portion of the first user has a second, different position relative to the second portion of the first user), the computer system (e.g., 702 and/or 705) causes (1010) display of the first feature (e.g., 911-1 and/or 911-2) at a third position that is different from the second position and is based on the first movement pattern, the second spatial relationship, and the first biomechanical relationship (e.g., moving the first feature to a different position (e.g., in the first direction, arc, magnitude, and/or velocity) than the second position).

In some embodiments, the change in spatial relationship impacts a potential displayed location of a feature (e.g., 911-1, 911-2, 911-3, 911-4, 911-5, 911-8, and/or 911-9) of the representation (e.g., 911) of the first user (e.g., 901) after tracking has failed. For example, when tracking fails, the computer system (e.g., 702 and/or 705) displays the representation of the user's hand (e.g., 911-1 or 911-2) in the XR environment (e.g., 910) at a position that is within a range of potential locations that are oriented about the last known location of the user's hand (e.g., 901-1 or 901-2) (e.g., when tracking failed). The potential locations are further narrowed based on the physical limitations of the user's hand movement due to the biomechanical relationship with the second portion of the user (e.g., 901-9 or 901-8) (e.g., the user's shoulder). For example, if the user's hand was last detected above the user's head (e.g., 901-3) (e.g., at a location that corresponds to the user's arm being fully extended), the computer system can display the representation of the user's hand at a predicted location that is oriented about where the hand was positioned when the tracking failed, but can also eliminate potential locations based on the last detected movement/position of the hand and the biomechanical relationship between the user's hand and the user's shoulder. For example, the computer system can eliminate potential hand locations that are farther extended from the user's shoulder based on the biomechanical constraints of the position of the user's hand relative to the user's shoulder. In short, the computer system determines that the hand is unlikely to be positioned even higher above the user's head (and is therefore more likely to be positioned closer to the user's head) because the user's arm was fully extended when tracking failed and, therefore, farther extending the user's hand would violate the biomechanical relationship between the user's hand and the user's shoulder (e.g., because such positions of the user's hand would exceed a determined or predicted reach of the user). This process can be used to produce a representation of the user that is more realistic and reduces distractions that are caused by unnatural movement of the representation of the user in the XR environment.

In some embodiments, causing the appearance of the representation (e.g., 911) of the first user (e.g., 901) to be updated includes the following. In accordance with a determination that the first portion (e.g., 901-1 and/or 901-2) of the first user is moving in the first movement pattern (e.g., 914-1 and/or 914-2) prior to the tracking of the first portion of the first user failing while the first portion of the first user has a third spatial relationship relative to a third portion (e.g., 901-5 and/or 901-4) (e.g., a shoulder, forearm, and/or a neck) of the first user that is different from the first portion of the first user (and, in some embodiments, is different from the second portion of the first user), the computer system (e.g., 702 and/or 705) causes display of the first feature (e.g., 911-1 and/or 911-2) of the representation of the first user at a fourth position that is different from the second position and is based on the first movement pattern, the third spatial relationship, and a second biomechanical relationship between the first portion of the first user and the third portion of the first user, wherein the second biomechanical relationship is different from the first biomechanical relationship (e.g., the third portion of the first user is a different biological feature than the first or second biological feature) (e.g., the first portion of the first user is a hand and the third portion of the first user is the first user's forearm) (e.g., the first portion of the first user is determined to have a second range of movement relative to the third portion of the first user). In accordance with a determination that the first portion of the first user is moving in the first movement pattern prior to the tracking of the first portion of the first user failing while the first portion of the first user has a fourth spatial relationship relative to the third portion of the first user that is different from the third spatial relationship, the computer system causes display of the first feature of the representation of the first user at a fifth position that is different from the fourth position and is based on the first movement pattern, the fourth spatial relationship, and the second biomechanical relationship (e.g., moving the first feature to a different position (e.g., in the first direction, arc, magnitude, and/or velocity) than the fourth position). Causing display of the first feature of the representation of the first user at the fourth position that is based on the first movement pattern, the third spatial relationship, and a second biomechanical relationship when the first portion of the first user is moving in the first movement pattern prior to the tracking of the first portion of the first user failing while the first portion of the first user has the third spatial relationship relative to the third portion of the user, and causing display of the first feature at the fifth position that is based on the first movement pattern, the fourth spatial relationship, and the second biomechanical relationship when the first portion is moving in the first movement pattern prior to the tracking of the first portion failing while the first portion has the fourth spatial relationship relative to the third portion of the first user enables the computer system to provide a more realistic user experience by displaying realistic movement of a feature of a representation of the user, based on different biomechanical relationships of portions of the user when tracking of the corresponding portion of the user has failed. In some embodiments, the first feature of the representation of the first user is displayed at a different position based on the first portion of the first user having a different biomechanical relationship with a respective portion of the first user.

In some embodiments, causing the appearance of the representation (e.g., 911) of the first user (e.g., 901) to be updated includes the following. In accordance with a determination that the first portion (e.g., 901-1 and/or 901-2) of the first user is moving in a second movement pattern different from the first movement pattern (e.g., 914-1 and/or 914-2) (e.g., a second direction, arc, magnitude, and/or velocity) prior to the tracking of the first portion of the first user failing while the first portion of the first user has the first spatial relationship relative to the second portion of the first user, the computer system (e.g., 702 and/or 705) causes display of the first feature (e.g., 911-1 and/or 911-2) of the representation of the first user at a sixth position that is different from the first position and is based on the second movement pattern, the first spatial relationship, and the first biomechanical relationship between the first portion of the first user and the second portion of the first user. In accordance with a determination that the first portion of the first user is moving in the second movement pattern prior to the tracking of the first portion of the first user failing while the first portion of the first user has the second spatial relationship relative to the second portion of the first user that is different from the first spatial relationship, the computer system causes display of the first feature at a seventh position that is different from the sixth position and is based on the second movement pattern, the second spatial relationship, and the first biomechanical relationship (e.g., moving the first feature to a different position (e.g., in the second direction, arc, magnitude, and/or velocity) than the sixth position). Causing display of the first feature of the representation of the first user at the sixth position that is based on the second movement pattern, the first spatial relationship, and the first biomechanical relationship when the first portion of the first user is moving in the second movement pattern prior to the tracking of the first portion of the first user failing while the first portion of the first user has the first spatial relationship relative to the second portion of the user, and causing display of the first feature at the seventh position that is based on the second movement pattern, the second spatial relationship, and the first biomechanical relationship when the first portion is moving in the second movement pattern prior to the tracking of the first portion failing while the first portion has the second spatial relationship relative to the second portion of the first user enables the computer system to provide a more realistic user experience by displaying realistic movement of a feature of a representation of the user, based on biomechanical and spatial relationships of portions of the user when tracking of the corresponding portion of the user has failed. In some embodiments, the first feature of the representation of the first user is displayed at a different position based on the first portion of the first user having a different movement pattern at the time tracking failed.

In some embodiments, causing the appearance of the representation (e.g., 911) of the first user (e.g., 901) to be updated includes the following. In accordance with a determination that the first portion (e.g., 901-1 and/or 901-2) of the first user is moving in a third movement pattern different from the first movement pattern (e.g., 914-1 and/or 914-2) (e.g., a third direction, arc, magnitude, and/or velocity) prior to the tracking of the first portion of the first user failing while the first portion of the first user has a fifth spatial relationship relative to a fourth portion (e.g., 901-3) (e.g., a shoulder and/or a neck) of the first user that is different from the first portion of the first user, the computer system (e.g., 702 and/or 705) causes display of the first feature (e.g., 911-1 and/or 911-2) of the representation of the first user at an eighth position that is different from the second position and is based on the third movement pattern, the fifth spatial relationship, and a third biomechanical relationship between the first portion of the first user and the fourth portion of the first user, wherein the third biomechanical relationship is different from the first biomechanical relationship (e.g., the fourth portion of the first user is a different biological feature than the first or second biological feature) (e.g., the first portion of the first user is a hand and the fourth portion of the first user is the first user's neck) (e.g., the first portion of the first user is determined to have a third range of movement relative to the fourth portion of the first user). In accordance with a determination that the first portion of the first user is moving in the third movement pattern prior to the tracking of the first portion of the first user failing while the first portion of the first user has a sixth spatial relationship relative to the fourth portion of the first user that is different from the fifth spatial relationship (e.g., the first portion of the first user is determined to have a fourth position relative to the fourth portion of the first user), the computer system causes display of the first feature of the representation of the first user at a ninth position that is different from the eighth position and is based on the third movement pattern, the sixth spatial relationship, and the third biomechanical relationship (e.g., moving the first feature to a different position (e.g., in the first direction, arc, magnitude, and/or velocity) than the seventh position). Causing display of the first feature of the representation of the first user at the eighth position that is based on the third movement pattern, the fifth spatial relationship, and the third biomechanical relationship when the first portion of the first user is moving in the third movement pattern prior to the tracking of the first portion of the first user failing while the first portion of the first user has the fifth spatial relationship relative to the fourth portion of the user, and causing display of the first feature at the ninth position that is based on the third movement pattern, the sixth spatial relationship, and the third biomechanical relationship when the first portion is moving in the third movement pattern prior to the tracking of the first portion failing while the first portion has the sixth spatial relationship relative to the fourth portion of the first user enables the computer system to provide a more realistic user experience by displaying realistic movement of a feature of a representation of the user, based on biomechanical and spatial relationships of portions of the user when tracking of the corresponding portion of the user has failed. In some embodiments, the first feature of the representation of the first user is displayed at a different position based on the first portion of the first user having a different biomechanical relationship with a respective portion of the first user and based on the first portion of the first user having a different movement pattern at the time tracking failed.

In some embodiments, the second position and the third position are located within a predetermined distance (e.g., a distance limit and/or a maximum range of distance away from the avatar's body) from a body feature (e.g., 911-3, 911-8, 911-9, 911-10) (e.g., an avatar torso, shoulder, and/or neck) of the representation (e.g., 911) of the first user (e.g., 901) when the first portion (e.g., 901-1 and/or 901-2) of the first user has the first biomechanical relationship with the second portion (e.g., 901-9 and/or 901-8) of the first user. Causing display of the first feature of the representation of the first user at the second position or the third positions that are located within a predetermined distance from a body feature of the representation of the first user when the first portion of the first user has the first biomechanical relationship with the second portion of the user enables the computer system to provide a more realistic user experience by eliminating the display of unrealistic movements of a feature of a representation of the user that extend beyond a biomechanical limitation of the user's body when tracking of the corresponding portion of the user has failed, which also conserves battery power. In some embodiments, the computer system imposes distance limits for displaying respective avatar features. For example, the computer system does not display avatar hands having more than a threshold distance (e.g., 1.2 m, 1 m, 0.8 m, 0.5 m, or 0.2 m) from the avatar's body. In some embodiments, the distance limits are intended to avoid displaying an avatar feature at a distance from respective portions of the avatar that are unrealistic or unnatural. In some embodiments, the distance limits are based on a respective avatar feature. For example, a limit on avatar hand distance from the avatar body is based on a detected, anticipated, and/or approximated arm length for the avatar and/or the first user.

In some embodiments, causing the appearance of the representation (e.g., 911) of the first user (e.g., 901) to be updated includes the following (in some embodiments, after causing display of the first feature at the second position or at the third position). In accordance with a determination that a first set of criteria is met (e.g., the first portion of the user is a hand, the first feature is an avatar hand, and/or after a threshold amount of time (e.g., a non-zero threshold, 0.5 seconds, 1 second, and/or 1.5 seconds)), the computer system (e.g., 702 and/or 705) causes display of the first feature (e.g., 911-1) moving in a predetermined movement pattern (e.g., 916-3) (e.g., a downward movement (e.g., over a predetermined period of time), a movement towards a resting position at or near the waist of the avatar and/or at the avatar's side, and/or a movement to a predefined location) after tracking of the first portion (e.g., 901-1) of the first user has failed. Causing display of the first feature moving in the predetermined movement pattern after tracking of the first portion of the first user has failed when the first set of criteria is met enables the computer system to provide a more realistic user experience by eliminating the display of unrealistic and/or unnatural movements or poses of a feature of a representation of the user, and instead displaying more natural movements and poses, when tracking of the corresponding portion of the user has failed, which also conserves battery power. In some embodiments, the computer system causes the avatar hands to move downward to a resting position (e.g., as shown in FIG. 9C) after tracking is lost because maintaining the avatar's hands at an elevated position (e.g., above the avatar's waist or at a location other than by the avatar's side) does not conform with a natural pose of a user because the user's arms would likely be fatigued by maintaining the elevated pose for a substantial amount of time (e.g., the threshold amount of time). In some embodiments, the avatar hands are displayed at the second and/or third positions as part of the downward movement of the avatar hands.

In some embodiments, causing display of the first feature (e.g., 911-1 and/or 911-2) moving in the predetermined movement pattern (e.g., 916-3 and/or 916-4) after tracking of the first portion (e.g., 901-1 and/or 901-2) of the first user (e.g., 901) has failed includes the computer system (e.g., 702 and/or 705) causing display of a second feature (e.g., 911-9 and/or 911-8) of the representation (e.g., 911) of the first user (e.g., an avatar shoulder, upper arm, and/or elbow) moving based on the predetermined movement pattern of the first feature after tracking of the first portion of the first user has failed, wherein the second feature is different from the first feature. Causing display of the second feature moving based on the predetermined movement pattern of the first feature after tracking of the first portion of the first user has failed, wherein the second feature is different from the first feature, enables the computer system to provide a more realistic user experience by eliminating the display of unrealistic and/or unnatural movements or poses of a feature of a representation of the user, and instead displaying more natural movements and poses, when tracking of the corresponding portion of the user has failed, which also conserves battery power.

In some embodiments, the first feature is a hand feature (e.g., 911-1 and/or 911-2). In some embodiments, the first portion of the first user is a hand portion of the first user (e.g., the user's right hand 901-1 and/or left hand 901-2). In some embodiments, the representation of the first user includes a shoulder feature (e.g., 911-9 and/or 911-8) (e.g., an avatar shoulder and/or upper arm). In some embodiments, the shoulder feature corresponds to the second portion of the first user (e.g., 901-9 and/or 901-8). In some embodiments, the shoulder feature corresponds to a different portion of the first user (e.g., a third portion). In some embodiments, the second portion of the first user is a shoulder portion of the first user (e.g., the user's right shoulder 901-9 and/or left shoulder 901-8). In some embodiments, causing display of the first feature of the representation (e.g., 911) of the first user (e.g., 901) at the second position (e.g., as shown in FIG. 9B or FIG. 9C) includes causing display of the shoulder feature having a first rotated position (e.g., a position that is rotated relative to a position of the shoulder feature prior to the tracking of the first portion of the first user failing and/or a position that is rotated relative to a position of the shoulder feature prior to receiving the first data) that is based on the first movement pattern (e.g., 914-1 and/or 914-2) of the first portion of the first user, the first spatial relationship, and the first biomechanical relationship between the first portion of the first user and the second portion of the first user. In some embodiments, causing display of the first feature of the representation of the first user at the third position includes causing display of the shoulder feature having a second rotated position that is different form the first rotated position (e.g., a position that is rotated relative to a position of the shoulder feature prior to the tracking of the first portion of the first user failing and/or a position that is rotated relative to a position of the shoulder feature prior to receiving the first data) and is based on the first movement pattern of the first portion of the first user, the second spatial relationship, and the first biomechanical relationship between the first portion of the first user and the second portion of the first user. Causing display of the shoulder feature having the first rotated position that is based on the first movement pattern of the first portion of the user, the first spatial relationship, and the first biomechanical relationship between the first portion of the first user and the second portion of the first user, and causing display of the shoulder feature having the second rotated position that is based on the first movement pattern of the first portion, the second spatial relationship, and the first biomechanical relationship, enables the computer system to provide a more realistic user experience by displaying rotational movements of displayed shoulder features based on movement of hand features, when tracking of the corresponding portion of the user has failed. In some embodiments, the representation of the first user includes a shoulder feature that rotates based on a location of the hand feature as the hand feature moves.

In some embodiments, the computer system (e.g., 702 and/or 705) receives second data while the representation (e.g., 911) of the first user (e.g., 901) is displayed in the extended reality environment (e.g., 910) having one or more shoulder features (e.g., 911-9 and/or 911-8) with a first displayed state (e.g., as shown in FIG. 9A or as shown in FIG. 9C). In response to receiving the second data, the computer system causes the appearance of the representation of the first user to be updated, including the following. In accordance with a determination that the second data includes tracking data for the first portion of the first user (e.g., the user's hand is being tracked and/or data representing the location of the user's hand is available), the computer system causes display of the one or more shoulder features of the representation of the first user to be updated (in some embodiments, based on movement of the first portion of the first user) from the first displayed state to a second displayed state (e.g., from the state in FIG. 9C or 9D to the state in FIG. 9E) having a different amount (e.g., less or more) of the one or more shoulder features displayed than in the first displayed state (e.g., changing an amount of the one or more shoulder features that is displayed and/or changing a visual characteristic of the one or more shoulder features). In some embodiments, in accordance with a determination that the second data includes tracking data for the first portion of the first user, the computer system causes display of the one or more shoulder features to have the first displayed state. For example, the shoulder moves, but continues to be displayed in the same displayed state (e.g., the state of shoulder 911-8 and/or shoulder 911-9 in FIG. 9A). In accordance with a determination that the second data does not include tracking data for the first portion of the first user (e.g., the user's hand is not being tracked, tracking of the user's hand has been lost, and/or data representing the location of the user's hand is not available), the computer system forgoes causing display of the one or more shoulder features to be updated from the first displayed state to the second displayed state (e.g., maintaining display of the one or more shoulder features having the first displayed state). Causing display of the one or more shoulder features to be updated from the first displayed state to the second displayed state having a different amount of the one or more shoulder features displayed than in the first displayed state when the second data includes tracking data for the first portion of the first user, and forgoing causing display of the one or more shoulder features to be updated from the first displayed state to the second displayed state when the second data does not include tracking data for the first portion, enables the computer system to provide a more realistic user experience by causing changes to a displayed state of a shoulder feature based on whether movement of the user's hand is tracked, and eliminating causing the changes when the movement of the user's hand is not tracked, which also conserves battery power. In some embodiments, the amount of the avatar's shoulder(s) that is displayed in the extended reality environment is based on whether or not the user's hand(s) are being tracked. In some embodiments, the shoulders have different values for a visual characteristic in the first and second displayed states. For example, the first displayed state is a first amount of blurring, fading, and/or saturation of the avatar shoulder(s), and the second displayed state is a different amount of blurring, fading, and/or saturation of the avatar shoulder(s).

In some embodiments, causing display of the one or more shoulder features (e.g., 911-9 and/or 911-8) of the representation (e.g., 911) of the first user (e.g., 901) to be updated (in some embodiments, based on movement of the first portion of the first user) from the first displayed state to the second displayed state having a different amount of the one or more shoulder features displayed than the first displayed state includes the following. The computer system (e.g., 702 and/or 705) causes a first shoulder feature (e.g., 911-8) to change from the first displayed state (e.g., shown in FIG. 9C or 9D) to the second displayed state (e.g., shown in FIG. 9A or 9E) (e.g., increasing an amount of blurring, fading, and/or desaturation of the first avatar shoulder, or decreasing an amount of blurring, fading, and/or desaturation of the first avatar shoulder) at a first rate of change (e.g., over a period of 1.5 seconds, 2 seconds, 2.5 seconds, or 3 seconds). The computer system causes a second shoulder feature (e.g., 911-9) to change from the first displayed state (e.g., shown in FIG. 9C or 9D) to the second displayed state (e.g., shown in FIG. 9A or 9E) (e.g., increasing an amount of blurring, fading, and/or desaturation of the second avatar shoulder, or decreasing an amount of blurring, fading, and/or desaturation of the second avatar shoulder) at the first rate of change. Causing the first shoulder feature to change from the first displayed state to the second displayed state at the first rate of change, and causing the second shoulder feature to change from the first displayed state to the second displayed state at the first rate of change, provides feedback about a state of the computer system (e.g., a state in which a tracked location of a user feature causes changes in a displayed avatar). In some embodiments, the first and second shoulder features change from the first displayed state to the second displayed state simultaneously. In some embodiments, the first and second shoulder features change from the first displayed state to the second displayed state independently (e.g., not at the same time or without regard for whether the other shoulder feature is changing).

In some embodiments, causing display of the one or more shoulder features (e.g., 911-9 and/or 911-8) of the representation (e.g., 911) of the first user (e.g., 901) to be updated (in some embodiments, based on movement of the first portion of the first user) from the first displayed state to the second displayed state having a different amount of the one or more shoulder features displayed than the first displayed state includes the following. The computer system (e.g., 702 and/or 705) causes a first shoulder feature (e.g., 911-8) to change from the first displayed state (e.g., shown in FIG. 9C or 9D) to the second displayed state (e.g., shown in FIG. 9A or 9E) (e.g., increasing an amount of blurring, fading, and/or desaturation of the first avatar shoulder, or decreasing an amount of blurring, fading, and/or desaturation of the first avatar shoulder) without regard for a displayed state of a second shoulder feature (e.g., 911-9) that is different from the first shoulder feature. The computer system causes the second shoulder feature to change from the first displayed state to the second displayed state (e.g., increasing an amount of blurring, fading, and/or desaturation of the second avatar shoulder, or decreasing an amount of blurring, fading, and/or desaturation of the second avatar shoulder) without regard for a displayed state of the first shoulder feature. Causing the first shoulder feature to change from the first displayed state to the second displayed state without regard for a displayed state of the second shoulder feature, and causing the second shoulder feature to change from the first displayed state to the second displayed state without regard for a displayed state of the first shoulder feature, provides feedback about a state of the computer system (e.g., a state in which a tracked location of a user feature causes changes in a displayed avatar). In some embodiments, the shoulder features change between the first and second displayed states independently.

In some embodiments, causing display of the one or more shoulder features (e.g., 911-9 and/or 911-8) of the representation (e.g., 911) of the first user (e.g., 901) to be updated (in some embodiments, based on movement of the first portion of the first user) from the first displayed state to the second displayed state having a different amount of the one or more shoulder features displayed than the first displayed state includes the following. The computer system (e.g., 702 and/or 705) causes the one or more shoulder features to change from the first displayed state (e.g., shown in FIG. 9C or 9D) to the second displayed state (e.g., shown in FIG. 9A or 9E) (e.g., increasing an amount of blurring, fading, and/or desaturation of the first avatar shoulder, or decreasing an amount of blurring, fading, and/or desaturation of the first avatar shoulder) at a first change rate that is different from (e.g., faster than or slower than) a second change rate for causing the one or more shoulder features to change from the second displayed state to the first displayed state. Causing the one or more shoulder features to change from the first displayed state to the second displayed state at the first change rate that is different from a second change rate for causing the one or more shoulder features to change from the second displayed state to the first displayed state, provides feedback about a state of the computer system (e.g., a state in which a tracked location of a user feature causes changes in a displayed avatar). In some embodiments, the one or more shoulder features are displayed changing from the first displayed state to the second displayed state at a faster rate than they are displayed changing from the second displayed state to the first displayed state. For example, the one or more shoulders are displayed increasing in blurring, fading, and/or desaturation at a faster rate than they are displayed decreasing in blurring, fading, and/or desaturation.

In some embodiments, causing display of the one or more shoulder features (e.g., 911-9 and/or 911-8) of the representation (e.g., 911) of the first user (e.g., 901) to be updated (in some embodiments, based on movement of the first portion of the first user) from the first displayed state to the second displayed state having a different amount of the one or more shoulder features displayed than the first displayed state includes the following. The computer system (e.g., 702 and/or 705) causes the one or more shoulder features to change from the first displayed state (e.g., shown in FIG. 9C or 9D) to the second displayed state (e.g., shown in FIG. 9A or 9E) (e.g., increasing an amount of blurring, fading, and/or desaturation of the first avatar shoulder, or decreasing an amount of blurring, fading, and/or desaturation of the first avatar shoulder) at a third change rate that is different from (e.g., slower than or faster than) a change rate for causing a hand feature (e.g., 911-1 and/or 911-2) to change displayed states (e.g., as shown in FIG. 9D) (e.g., a rate at which an avatar hand is displayed increasing an amount of blurring, fading, and/or desaturation, or a rate at which an avatar hand is displayed decreasing an amount of blurring, fading, and/or desaturation). Causing the one or more shoulder features to change from the first displayed state to the second displayed state at the third change rate that is different from a change rate for causing a hand feature to change displayed states, provides feedback about a state of the computer system (e.g., a state in which a tracked location of a user feature causes changes in a displayed avatar). In some embodiments, the one or more shoulder features are displayed changing from the first displayed state to the second displayed state at a slower rate than an avatar hand is displayed changing states (e.g., as shown in FIG. 9D). For example, the one or more shoulders are displayed increasing or decreasing in blurring, fading, and/or desaturation at a slower rate than the avatar hands.

In some embodiments, after causing the appearance of the representation (e.g., 911) of the first user (e.g., 901) to be updated to display the first feature (e.g., 911-1 and/or 911-2) of the representation of the first user at the second position or at the third position (after tracking of the first portion of the first user has failed), the computer system (e.g., 702 and/or 705) receives third data that indicates an updated change in pose of the first user, wherein the updated change in pose of the first user includes an updated position of the first portion (e.g., 901-1 and/or 901-2) of the first user (e.g., the updated position of the user's hand) that has a first updated spatial relationship relative to the second portion of the first user (e.g., 901-9 and/or 901-8). In some embodiments, the second data is received because tracking of the first portion of the user has resumed. In some embodiments, the receipt of the second data indicates that tracking of the first portion of the user has resumed. In response to receiving the third data, the computer system causes display of the first feature of the representation of the first user at a first updated position (e.g., as shown in FIG. 9D) (e.g., an intermediate position and/or an interpolated position) that is different from (e.g., does not correspond to) the updated position of the first portion of the first user (e.g., as shown in FIG. 9D) and is based on the first updated spatial relationship and the first biomechanical relationship between the first portion of the first user and the second portion of the first user (e.g., the first feature is displayed at an intermediate and/or interpolated position between the respective position and a position that corresponds to the updated position of the first portion of the first user). Causing display of the first feature at the first updated position that is different from the updated position of the first portion of the first user and is based on the first updated spatial relationship and the first biomechanical relationship between the first portion of the first user and the second portion of the first user enables the computer system to provide a more realistic user experience by displaying realistic movement of a feature of a representation of the user, based on biomechanical and spatial relationships of portions of the user when tracking of the corresponding portion of the user has resumed.

In some embodiments, after causing display of the first feature (e.g., 911-1 and/or 911-2) of the representation (e.g., 911) of the first user (e.g., 901) at the first updated position (e.g., as shown in FIG. 9D), the computer system (e.g., 702 and/or 705) causes display of the first feature at a second updated position that corresponds to the updated position of the first portion of the first user and is based on the first updated spatial relationship and the first biomechanical relationship between the first portion of the first user and the second portion of the first user (e.g., the first feature is displayed at a position that corresponds to the updated position of the first portion of the first user). In some embodiments, when a new position of the user hand is detected (e.g., tracking of the hand has resumed), the computer system displays the avatar hand moving to a location that corresponds to the new detected location of the user's hand. The movement of the avatar hand is not instantaneous. Instead, the computer system displays the avatar's hand at one or more intermediate locations that are interpolated based on the biomechanical relationship between the first and second portions of the user and the spatial relationship between the first and second portions of the user in the updated pose. This gives the appearance of a smooth, natural movement of the avatar's hands from a previous pose to an updated pose that represents the updated location of the respective portion of the user.

In some embodiments, causing the appearance of the representation (e.g., 911) of the first user (e.g., 901) to be updated includes changing a pose (e.g., a position, orientation, and/or gesture formed by the respective feature of the avatar) of the first feature (e.g., 911-1 and/or 911-2) from a first pose (e.g., shown in FIG. 9A or 9B) (e.g., an opened hand pose and/or a waving pose) to a second pose (e.g., shown in FIG. 9C) that is different from the first pose (e.g., a closed hand pose and/or a fist). Changing a pose of the first feature from the first pose to the second pose that is different from the first pose enables the computer system to provide a more realistic user experience by displaying realistic movement of a feature of a representation of the user, based on biomechanical and spatial relationships of portions of the user when tracking of the corresponding portion of the user has failed. In some embodiments, the change in pose is a change in geometry of the first feature that is separate from a change in the overall spatial position of the first feature. In some embodiments, the computer system (e.g., 702 and/or 705) causes the first feature to change poses as the feature continues to move after tracking has failed. For example, if the hand tracking fails while the user has an opened hand, the computer system causes the avatar hand to move after tracking has lost, including transitioning the avatar hand from the opened hand pose to a closed fist as the avatar hand moves to a resting position (e.g., at the user's lap, waist, and/or side).

In some embodiments, the second portion of the first user (e.g., 901) includes a body part (one or more body parts) selected from a group consisting of: a hand (e.g., 901-1 or 901-2), a shoulder (e.g., 901-8 or 901-9), a neck, a head (e.g., 901-3), a torso, an upper arm, and a forearm. In some embodiments, the second portion of the first user includes a lower body part such as the user's waist, upper leg, lower leg, knee, and/or foot.

In some embodiments, causing the appearance of the representation (e.g., 911) of the first user (e.g., 901) to be updated includes changing a visual characteristic (e.g., a set of one or more visual parameters of the rendering of the representation of the first user; an amount or state of blurriness, opacity, color, visual smoothing, attenuation, density, and/or resolution) that can have one or more states (e.g., a state that corresponds to a less blurred or non-blurred appearance of the respective feature of the representation of the first user and/or a state that corresponds to a less transparent or fully opaque appearance of the respective feature) (in some embodiments, the visual characteristic is independent of the spatial/displayed position of the first feature) of the first feature (e.g., 911-1, 911-2, 911-8, and/or 911-9) from having a first state of the visual characteristic (e.g., a state having a first amount of fading, blurriness, and/or saturation) to having a second state of the visual characteristic that is different from the first state (e.g., a state having an increased or decreased amount of fading, blurriness, and/or desaturation or a state in which the first feature is not displayed). Changing a visual characteristic of the first feature from having a first state of the visual characteristic to having a second state of the visual characteristic that is different from the first state provides feedback about a state of the computer system (e.g., a state in which tracking of a user feature has failed). In some embodiments, the state of the visual characteristic is indicated by (e.g., corresponds to, is associated with, and/or includes) a value for the visual characteristic. For example, a first state for the visual characteristic corresponds to a value in a first range (e.g., a range of 0-0.25, 0-0.3, 0-0.4, 0-0.48, 0-0.5, or 0-0.52), a second state for the visual characteristic corresponds to a value in a second range (e.g., a range of 0.25-0.7, 0.4-0.8, 0.48-0.9, or 0.5-0.9), and a third state for the visual characteristic corresponds to a value in a third range (e.g., a range of 0.7-1.0, 0.75-1.0, 0.8-1.0, or 0.9-1.0).

In some embodiments, aspects/operations of methods 800 may be interchanged, substituted, and/or added between these methods. For example, the heuristics described with respect to method 800 can be used to modify the visual characteristics of the avatar features described with respect to method 1000. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system configured to communicate with a display generation component, the computer system comprising:
   one or more processors; and
   memory storing one or more programs configured to be executed by the one or more processors, the one or more programs including instructions for:
      causing a representation of a first user to be displayed, via the display generation component, in an extended reality environment, wherein the representation of the first user includes a representation of at least a respective portion of the first user that is displayed in the extended reality environment having a first pose;
      receiving first data that includes data indicating a change in pose of the first user from the first pose to a second pose; and
      in response to receiving the first data, causing an appearance of the representation of the first user in the extended reality environment to be updated, wherein causing the appearance of the representation of the first user in the extended reality environment to be updated includes causing a pose of the representation of the first user to be changed based on a change in pose of one or more corresponding portions of the first user, including:
         in accordance with a determination that the change in pose of a first portion of the first user meets respective criteria based on a first property of the pose of the first portion of the first user meeting a first set of one or more conditions based on the first property, causing an appearance of a portion of the representation of the first user, that corresponds to the first portion of the first user, to be changed in a first manner;
         in accordance with a determination that the change in pose of the first portion of the first user meets the respective criteria based on a second property of the pose of the first portion of the first user meeting a second set of one or more conditions, causing an appearance of the portion of the representation of the first user to be changed in the first manner, wherein the second property of the pose of the first portion of the first user is different from the first property of the pose of the first portion of the first user; and
         in accordance with a determination that the change in pose of the first portion of the first user does not meet the respective criteria, forgoing causing an appearance of the portion of the representation of the first user to be changed in the first manner.

2. The computer system of claim 1, wherein causing the appearance of the representation of the first user in the extended reality environment to be updated includes:
   in accordance with a determination that the change in pose of the first portion of the first user meets the respective criteria based on a change in the first property that does not meet the first set of one or more conditions and a change in the second property that does not meet the second set of one or more conditions, causing an appearance of the portion of the representation of the first user to be changed in the first manner.

3. The computer system of claim 1, wherein the first set of one or more conditions is met based on overlap of the first portion of the first user with a second portion of the first user.

4. The computer system of claim 1, wherein the first set of one or more conditions is met based on a detected location of the first portion of the first user within a field-of-view.

5. The computer system of claim 1, wherein the first set of one or more conditions is met based on a location of the first portion of the first user relative to the first user's head.

6. The computer system of claim 1, wherein the first set of one or more conditions is met based on an angle of flexion of the first portion of the first user relative to a predetermined reference line.

7. The computer system of claim 6, wherein the predetermined reference line is based on a reference point.

8. The computer system of claim 1, wherein the first portion includes a joint of the first user, and the first set of one or more conditions is met based on an amount of flexion at the joint of the first user.

9. The computer system of claim 1, wherein the first set of one or more conditions is met based on an orientation of the first portion of the first user.

10. The computer system of claim 1, wherein the first set of one or more conditions is met based on a detected orientation of the first portion of the first user relative to a third portion of the first user.

11. The computer system of claim 1, wherein the first set of one or more conditions is met based on movement of the first portion of the first user.

12. The computer system of claim 11, wherein the first set of one or more conditions is met based on the movement and a detected location of the first portion of the first user.

13. The computer system of claim 1, wherein the portion of the representation of the first user is displayed in the extended reality environment having a first amount of opacity while having the first pose, and causing an appearance of the portion of the representation of the first user to be changed in the first manner includes causing an amount of opacity of the portion of the representation of the first user to be changed from the first amount of opacity to a second amount of opacity different from the first amount of opacity.

14. The computer system of claim 1, wherein the portion of the representation of the first user is displayed in the extended reality environment having a first amount of blur while having the first pose, and causing an appearance of the portion of the representation of the first user to be changed in the first manner includes causing an amount of blur of the portion of the representation of the first user to be changed from the first amount of blur to a second amount of blur different from the first amount of blur.

15. The computer system of claim 1, wherein causing an appearance of the portion of the representation of the first user to be changed in the first manner includes:
  in accordance with a determination that the change in appearance is a first type of change, causing the appearance of the portion of the representation of the first user to be changed at a first rate of change; and
  in accordance with a determination that the change in appearance is a second type of change different from the first type of change, causing the appearance of the portion of the representation of the first user to be changed at a second rate of change different from the first rate of change.

16. The computer system of claim 1, wherein the first portion of the first user includes a hand of the first user.

17. The computer system of claim 1, wherein the first portion of the first user includes a forearm of the first user.

18. The computer system of claim 1, the one or more programs further including instructions for:
  in response to receiving a request to display the representation of the first user in the extended reality environment with a respective feature:
    in accordance with a determination that the first data indicates that the representation of the first user should be displayed with the portion of the representation of the first user that corresponds to the first portion of the first user, causing the representation of the first user to be displayed in the extended reality environment with the portion of the representation of the first user and the respective feature; and
    in accordance with a determination that the first data indicates that the representation of the first user should not be displayed with the portion of the representation of the first user that corresponds to the first portion of the first user, causing the representation of the first user to be displayed in the extended reality environment without the respective feature.

19. The computer system of claim 1, wherein:
  the first portion of the first user includes a first shoulder of the first user; and
  the portion of the representation of the first user includes a representation of the first shoulder.

20. The computer system of claim 19, the one or more programs further including instructions for:
  in response to detecting first update data corresponding to a request to update display of the representation of the first user, causing the display of the representation of the first user to be updated, including:
    in accordance with a determination that the first update data indicates a changed appearance of the representation of the first shoulder, causing an appearance of the representation of the first shoulder to be changed without causing an appearance of a representation of a second shoulder to be changed; and
    in accordance with a determination that the first update data indicates a changed appearance of a representation of a second shoulder, causing an appearance of the representation of the second shoulder to be changed without causing an appearance of the representation of the first shoulder to be changed.

21. The computer system of claim 19, the one or more programs further including instructions for:
  in response to detecting second update data corresponding to a request to update display of the representation of the first user to include a changed appearance of the representation of the first shoulder and a changed appearance of a representation of a first hand, causing the display of the representation of the first user to be updated, including:
    causing the appearance of the representation of the first hand to be changed at a first point in time after detecting the second update data; and
    causing the appearance of the representation of the first shoulder to be changed at a second point in time after detecting the second update data that is later than the first point in time.

22. A non-transitory computer-readable storage medium storing one or more programs configured to be executed by one or more processors of a computer system that is in communication with a display generation component, the one or more programs including instructions for:
  causing a representation of a first user to be displayed, via the display generation component, in an extended reality environment, wherein the representation of the first user includes a representation of at least a respective portion of the first user that is displayed in the extended reality environment having a first pose;
  receiving first data that includes data indicating a change in pose of the first user from the first pose to a second pose; and
  in response to receiving the first data, causing an appearance of the representation of the first user in the extended reality environment to be updated, wherein causing the appearance of the representation of the first user in the extended reality environment to be updated includes causing a pose of the representation of the first user to be changed based on a change in pose of one or more corresponding portions of the first user, including:
    in accordance with a determination that the change in pose of a first portion of the first user meets respective criteria based on a first property of the pose of the first portion of the first user meeting a first set of one or more conditions based on the first property, causing an appearance of a portion of the representation of the first user, that corresponds to the first portion of the first user, to be changed in a first manner;
    in accordance with a determination that the change in pose of the first portion of the first user meets the respective criteria based on a second property of the pose of the first portion of the first user meeting a second set of one or more conditions, causing an appearance of the portion of the representation of the first user to be changed in the first manner, wherein the second property of the pose of the first portion of the first user is different from the first property of the pose of the first portion of the first user; and
    in accordance with a determination that the change in pose of the first portion of the first user does not meet the respective criteria, forgoing causing an appearance of the portion of the representation of the first user to be changed in the first manner.

23. A method, comprising:

at a computer system that is in communication with a display generation component:

causing a representation of a first user to be displayed, via the display generation component, in an extended reality environment, wherein the representation of the first user includes a representation of at least a respective portion of the first user that is displayed in the extended reality environment having a first pose;

receiving first data that includes data indicating a change in pose of the first user from the first pose to a second pose; and in response to receiving the first data, causing an appearance of the representation of the first user in the extended reality environment to be updated, wherein causing the appearance of the representation of the first user in the extended reality environment to be updated includes causing a pose of the representation of the first user to be changed based on a change in pose of one or more corresponding portions of the first user, including:

in accordance with a determination that the change in pose of a first portion of the first user meets respective criteria based on a first property of the pose of the first portion of the first user meeting a first set of one or more conditions based on the first property, causing an appearance of a portion of the representation of the first user, that corresponds to the first portion of the first user, to be changed in a first manner;

in accordance with a determination that the change in pose of the first portion of the first user meets the respective criteria based on a second property of the pose of the first portion of the first user meeting a second set of one or more conditions, causing an appearance of the portion of the representation of the first user to be changed in the first manner, wherein the second property of the pose of the first portion of the first user is different from the first property of the pose of the first portion of the first user; and in accordance with a determination that the change in pose of the first portion of the first user does not meet the respective criteria, forgoing causing an appearance of the portion of the representation of the first user to be changed in the first manner.

24. The non-transitory computer-readable storage medium of claim 22, wherein causing the appearance of the representation of the first user in the extended reality environment to be updated includes:

in accordance with a determination that the change in pose of the first portion of the first user meets the respective criteria based on a change in the first property that does not meet the first set of one or more conditions and a change in the second property that does not meet the second set of one or more conditions, causing an appearance of the portion of the representation of the first user to be changed in the first manner.

25. The non-transitory computer-readable storage medium of claim 22, wherein the first set of one or more conditions is met based on overlap of the first portion of the first user with a second portion of the first user.

26. The non-transitory computer-readable storage medium of claim 22, wherein the first set of one or more conditions is met based on a detected location of the first portion of the first user within a field-of-view.

27. The non-transitory computer-readable storage medium of claim 22, wherein the first set of one or more conditions is met based on a location of the first portion of the first user relative to the first user's head.

28. The non-transitory computer-readable storage medium of claim 22, wherein the first set of one or more conditions is met based on an angle of flexion of the first portion of the first user relative to a predetermined reference line.

29. The non-transitory computer-readable storage medium of claim 28, wherein the predetermined reference line is based on a reference point.

30. The non-transitory computer-readable storage medium of claim 22, wherein the first portion includes a joint of the first user, and the first set of one or more conditions is met based on an amount of flexion at the joint of the first user.

31. The non-transitory computer-readable storage medium of claim 22, wherein the first set of one or more conditions is met based on an orientation of the first portion of the first user.

32. The non-transitory computer-readable storage medium of claim 22, wherein the first set of one or more conditions is met based on a detected orientation of the first portion of the first user relative to a third portion of the first user.

33. The non-transitory computer-readable storage medium of claim 22, wherein the first set of one or more conditions is met based on movement of the first portion of the first user.

34. The non-transitory computer-readable storage medium of claim 33, wherein the first set of one or more conditions is met based on the movement and a detected location of the first portion of the first user.

35. The non-transitory computer-readable storage medium of claim 22, wherein the portion of the representation of the first user is displayed in the extended reality environment having a first amount of opacity while having the first pose, and causing an appearance of the portion of the representation of the first user to be changed in the first manner includes causing an amount of opacity of the portion of the representation of the first user to be changed from the first amount of opacity to a second amount of opacity different from the first amount of opacity.

36. The non-transitory computer-readable storage medium of claim 22, wherein the portion of the representation of the first user is displayed in the extended reality environment having a first amount of blur while having the first pose, and causing an appearance of the portion of the representation of the first user to be changed in the first manner includes causing an amount of blur of the portion of the representation of the first user to be changed from the first amount of blur to a second amount of blur different from the first amount of blur.

37. The non-transitory computer-readable storage medium of claim 22, wherein causing an appearance of the portion of the representation of the first user to be changed in the first manner includes:

in accordance with a determination that the change in appearance is a first type of change, causing the appearance of the portion of the representation of the first user to be changed at a first rate of change; and in accordance with a determination that the change in appearance is a second type of change different from the first type of change, causing the appearance of the portion of the representation of the first user to be changed at a second rate of change different from the first rate of change.

38. The non-transitory computer-readable storage medium of claim 22, wherein the first portion of the first user includes a hand of the first user.

39. The non-transitory computer-readable storage medium of claim 22, wherein the first portion of the first user includes a forearm of the first user.

40. The non-transitory computer-readable storage medium of claim 22, the one or more programs further including instructions for:
in response to receiving a request to display the representation of the first user in the extended reality environment with a respective feature:
in accordance with a determination that the first data indicates that the representation of the first user should be displayed with the portion of the representation of the first user that corresponds to the first portion of the first user, causing the representation of the first user to be displayed in the extended reality environment with the portion of the representation of the first user and the respective feature; and
in accordance with a determination that the first data indicates that the representation of the first user should not be displayed with the portion of the representation of the first user that corresponds to the first portion of the first user, causing the representation of the first user to be displayed in the extended reality environment without the respective feature.

41. The non-transitory computer-readable storage medium of claim 22, wherein:
the first portion of the first user includes a first shoulder of the first user; and
the portion of the representation of the first user includes a representation of the first shoulder.

42. The non-transitory computer-readable storage medium of claim 41, the one or more programs further including instructions for:
in response to detecting first update data corresponding to a request to update display of the representation of the first user, causing the display of the representation of the first user to be updated, including:
in accordance with a determination that the first update data indicates a changed appearance of the representation of the first shoulder, causing an appearance of the representation of the first shoulder to be changed without causing an appearance of a representation of a second shoulder to be changed; and
in accordance with a determination that the first update data indicates a changed appearance of a representation of a second shoulder, causing an appearance of the representation of the second shoulder to be changed without causing an appearance of the representation of the first shoulder to be changed.

43. The non-transitory computer-readable storage medium of claim 41, the one or more programs further including instructions for:
in response to detecting second update data corresponding to a request to update display of the representation of the first user to include a changed appearance of the representation of the first shoulder and a changed appearance of a representation of a first hand, causing the display of the representation of the first user to be updated, including:
causing the appearance of the representation of the first hand to be changed at a first point in time after detecting the second update data; and
causing the appearance of the representation of the first shoulder to be changed at a second point in time after detecting the second update data that is later than the first point in time.

44. The method of claim 23, wherein causing the appearance of the representation of the first user in the extended reality environment to be updated includes:
in accordance with a determination that the change in pose of the first portion of the first user meets the respective criteria based on a change in the first property that does not meet the first set of one or more conditions and a change in the second property that does not meet the second set of one or more conditions, causing an appearance of the portion of the representation of the first user to be changed in the first manner.

45. The method of claim 23, wherein the first set of one or more conditions is met based on overlap of the first portion of the first user with a second portion of the first user.

46. The method of claim 23, wherein the first set of one or more conditions is met based on a detected location of the first portion of the first user within a field-of-view.

47. The method of claim 23, wherein the first set of one or more conditions is met based on a location of the first portion of the first user relative to the first user's head.

48. The method of claim 23, wherein the first set of one or more conditions is met based on an angle of flexion of the first portion of the first user relative to a predetermined reference line.

49. The method of claim 48, wherein the predetermined reference line is based on a reference point.

50. The method of claim 23, wherein the first portion includes a joint of the first user, and the first set of one or more conditions is met based on an amount of flexion at the joint of the first user.

51. The method of claim 23, wherein the first set of one or more conditions is met based on an orientation of the first portion of the first user.

52. The method of claim 23, wherein the first set of one or more conditions is met based on a detected orientation of the first portion of the first user relative to a third portion of the first user.

53. The method of claim 23, wherein the first set of one or more conditions is met based on movement of the first portion of the first user.

54. The method of claim 53, wherein the first set of one or more conditions is met based on the movement and a detected location of the first portion of the first user.

55. The method of claim 23, wherein the portion of the representation of the first user is displayed in the extended reality environment having a first amount of opacity while having the first pose, and causing an appearance of the portion of the representation of the first user to be changed in the first manner includes causing an amount of opacity of the portion of the representation of the first user to be changed from the first amount of opacity to a second amount of opacity different from the first amount of opacity.

56. The method of claim 23, wherein the portion of the representation of the first user is displayed in the extended reality environment having a first amount of blur while having the first pose, and causing an appearance of the portion of the representation of the first user to be changed in the first manner includes causing an amount of blur of the portion of the representation of the first user to be changed from the first amount of blur to a second amount of blur different from the first amount of blur.

57. The method of claim 23, wherein causing an appearance of the portion of the representation of the first user to be changed in the first manner includes:
   in accordance with a determination that the change in appearance is a first type of change, causing the appearance of the portion of the representation of the first user to be changed at a first rate of change; and
   in accordance with a determination that the change in appearance is a second type of change different from the first type of change, causing the appearance of the portion of the representation of the first user to be changed at a second rate of change different from the first rate of change.

58. The method of claim 23, wherein the first portion of the first user includes a hand of the first user.

59. The method of claim 23, wherein the first portion of the first user includes a forearm of the first user.

60. The method of claim 23, further comprising:
   in response to receiving a request to display the representation of the first user in the extended reality environment with a respective feature:
      in accordance with a determination that the first data indicates that the representation of the first user should be displayed with the portion of the representation of the first user that corresponds to the first portion of the first user, causing the representation of the first user to be displayed in the extended reality environment with the portion of the representation of the first user and the respective feature; and
      in accordance with a determination that the first data indicates that the representation of the first user should not be displayed with the portion of the representation of the first user that corresponds to the first portion of the first user, causing the representation of the first user to be displayed in the extended reality environment without the respective feature.

61. The method of claim 23, wherein:
   the first portion of the first user includes a first shoulder of the first user; and
   the portion of the representation of the first user includes a representation of the first shoulder.

62. The method of claim 61, further comprising:
   in response to detecting first update data corresponding to a request to update display of the representation of the first user, causing the display of the representation of the first user to be updated, including:
      in accordance with a determination that the first update data indicates a changed appearance of the representation of the first shoulder, causing an appearance of the representation of the first shoulder to be changed without causing an appearance of a representation of a second shoulder to be changed; and
      in accordance with a determination that the first update data indicates a changed appearance of a representation of a second shoulder, causing an appearance of the representation of the second shoulder to be changed without causing an appearance of the representation of the first shoulder to be changed.

63. The method of claim 61, further comprising:
   in response to detecting second update data corresponding to a request to update display of the representation of the first user to include a changed appearance of the representation of the first shoulder and a changed appearance of a representation of a first hand, causing the display of the representation of the first user to be updated, including:
      causing the appearance of the representation of the first hand to be changed at a first point in time after detecting the second update data; and
      causing the appearance of the representation of the first shoulder to be changed at a second point in time after detecting the second update data that is later than the first point in time.

* * * * *